United States Patent
McIlroy et al.

(10) Patent No.: US 11,200,004 B2
(45) Date of Patent: Dec. 14, 2021

(54) COMPRESSION OF DATA FOR A FILE SYSTEM

(71) Applicant: EMC IP Holding Company LLC, Hopkinton, MA (US)

(72) Inventors: Lachlan McIlroy, Newport (AU); Ryan Libby, Seattle, WA (US); Max Laier, Seattle, WA (US); Anton Rang, Houlton, WI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 211 days.

(21) Appl. No.: 16/265,951

(22) Filed: Feb. 1, 2019

(65) Prior Publication Data

US 2020/0249877 A1  Aug. 6, 2020

(51) Int. Cl.
*G06F 3/06* (2006.01)
*G06F 16/174* (2019.01)

(52) U.S. Cl.
CPC .......... *G06F 3/0661* (2013.01); *G06F 3/0608* (2013.01); *G06F 3/0673* (2013.01); *G06F 16/1744* (2019.01)

(58) Field of Classification Search
None
See application file for complete search history.

(56) References Cited

U.S. PATENT DOCUMENTS

| 8,300,823 | B2 * | 10/2012 | Bojinov | G06F 3/0608 380/269 |
| 9,116,858 | B1 * | 8/2015 | Yokoi | H04L 67/06 |
| 10,097,202 | B1 * | 10/2018 | Ki | G11B 20/00007 |

(Continued)

OTHER PUBLICATIONS

Beaulieu, Jonathan. "Adaptive Filesystem Compression for General Purpose Systems" A Thesis Submitted to the Faculty of the Graduate School of the University of Minnesota, [https://conservancy.umn.edu/handle/11299/200153], Jun. 2018, 64 pages.

(Continued)

*Primary Examiner* — Yaima Rigol
(74) *Attorney, Agent, or Firm* — Amin, Turocy & Watson, LLP

(57) ABSTRACT

Compression of data for a file system utilizing protection groups can be implemented and managed. A compression management component (CMC) can control compression of data via inline or post-process compression for storage in protection groups in memory, including determining whether to compress data, determining a compression algorithm to utilize to compress data, and/or determining whether to perform inline and/or post-process compression of data. CMC can generate protection group (PG) metadata for a PG in which compressed data is stored. PG metadata can comprise a logical extent map that describes which logical blocks contain compressed data, a list of cyclic redundancy check values for logical blocks, and a list of compression chunks that store individual metadata regarding individual compressed streams, wherein, for an individual compressed stream, the individual metadata comprises a compression format, compressed size, uncompressed size, and/or starting offset in physical space within the PG.

20 Claims, 12 Drawing Sheets

(56) References Cited

U.S. PATENT DOCUMENTS

| | | | |
|---|---|---|---|
| 2007/0096954 A1* | 5/2007 | Boldt | H03M 7/30 |
| | | | 341/50 |
| 2009/0012982 A1* | 1/2009 | Merchia | H03M 7/30 |
| 2011/0154158 A1* | 6/2011 | Yurzola | G06F 11/1048 |
| | | | 714/758 |
| 2014/0215170 A1* | 7/2014 | Scarpino | G06F 3/0608 |
| | | | 711/161 |
| 2016/0070495 A1* | 3/2016 | Periyagaram | G06F 11/00 |
| | | | 711/159 |

OTHER PUBLICATIONS

Unknown. "Linux Filesystem That Supports On-the-Fly Compression" Toolbox Tech, [https://it.toolbox.com/question/linux-filesystem-that-supports-on-the-fly-compression-061713], dated Jun. 17, 2013, retrieved Oct. 28, 2020, 4 pages.

Sadhasivam, Karthikeyan. "How to Create ZFS Filesystem with File Compression on Linux" The Geek Stuff, [https://www.thegeekstuff.com/2015/11/zfs-filesystem-compression/], dated Nov. 11, 2015, retrieved Oct. 28, 2020, 7 pages.

\* cited by examiner

COMPRESSION OF DATA FOR A FILE SYSTEM

TECHNICAL FIELD

This disclosure relates generally to processing data, e.g., to compression of data for a file system.

BACKGROUND

A file system typically can be employed to maintain files (e.g., electronic files), comprising data (e.g., electronic or digital data), including keeping track of the locations of files and associated data in memory to enable accessing of the files stored in, and retrieval of the files from, the memory. The files, including data in the files, often can be processed in a number of ways when the files are being stored in, or retrieved from, the memory.

The above-described description is merely intended to provide a contextual overview regarding file systems and processing data, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise compressing, by a system comprising a processor, first data in a first compression format, based on a first compression process, to generate first compressed data. The method further can comprise storing, by the system, the first compressed data in a first set of memory locations of a protection group in a memory, wherein the protection group is associated with a set of logical blocks comprising a subset of logical blocks, and wherein the protection group is associated with protection group metadata that indicates the first compressed data is compressed and indicates the subset of logical blocks associated with the first compressed data.

In certain embodiments, the disclosed subject matter can comprise a system that can include a memory that stores computer executable components, and a processor that executes computer executable components stored in the memory. The computer executable components can comprise a compression component that compresses first information in a first compression format, based on a first compression process, to generate first compressed information. The computer executable components also can include a memory component that stores the first compressed information in a first group of memory addresses of a protection group in the memory component, wherein the protection group is associated with a group of logical blocks comprising a subgroup of logical blocks, and wherein the protection group is associated with protection group metadata that indicates the first compressed information is compressed and indicates the subgroup of logical blocks of the protection group associated with the first compressed information.

In still other embodiments, a machine-readable storage medium, comprising executable instructions that, when executed by a processor, facilitate performance of operations. The operations can comprise compressing data in a compression format, based on a compression process, to generate compressed data. The operations also can comprise storing the compressed data in a set of locations of a protection group in a data store, wherein the protection group is associated with a set of logical blocks comprising a subset of logical blocks, and wherein the protection group is associated with protection group metadata that indicates the compressed data is compressed in the compression format and indicates the subset of logical blocks associated with the compressed data.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

DETAILED DESCRIPTION

Figure 1:
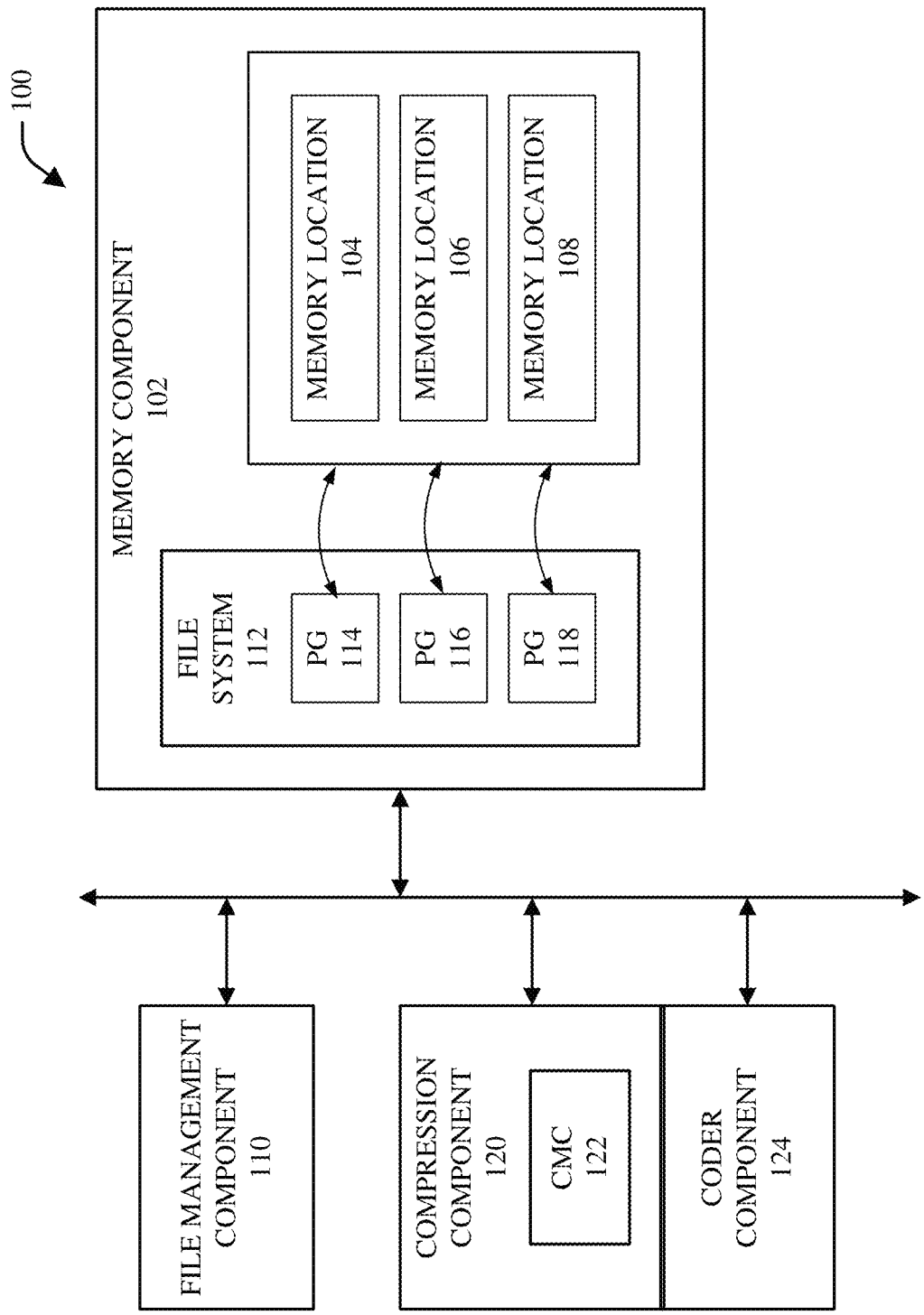
FIG. 1 illustrates a block diagram of an example system that can desirably compress and decompress, and manage compression and decompression of, data associated with protection groups that are associated with a memory, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

A file system typically can be employed to maintain files (e.g., electronic files), including keeping track of the locations of files in memory to enable accessing of the files stored in, and retrieval of the files from, the memory. The files, including data in the files, often can be processed in a number of ways when the files are being stored in, or retrieved from, the memory. For example, the data in the files can be formatted in accordance with a desired format employed by the file system.

Data also can be compressed, using a data compression algorithm, to reduce the amount of data being stored in memory, which can thereby free up memory so that it can be used to store other data. Some compression algorithms can perform transparent or lossless data compression where the compressed data is essentially indistinguishable from the original data (e.g., when the compressed data is decompressed). If data is not compressed when being stored in memory, there can be a higher cost per unit of memory storage (e.g., gigabyte (GB)), as uncompressed data typically can take up more space in memory than compressed data.

To that end, techniques for efficiently compressing data, and managing compression of data, in protection groups in a memory component are presented. A file management component can create and manage a file system in which files, including file data, can be stored in a memory component. The file management component can store and protect data, such as file data, in protection groups in the memory component, wherein storing and protecting data in protection groups can be a unique way of storing and protecting data, as opposed to employing a volume/redundant array of independent disks (RAID) approach to store data. A protection group (also referred to herein as PG) can store a desired amount of data (e.g., 128 kibibytes (kiB) to 2 mebibytes (MiB) of data, such as user data). The protection group can be described (e.g., by the file management component, compression component, or compression management component) by some metadata, such as, for example, a protection level and/or layout of the protection group and data stored therein (e.g., 2× mirroring, 16+4 forward error correction (FEC) protection, . . . ), a physical extent map of the physical blocks of the memory component (e.g., the physical blocks associated with the protection group in the memory component) that store the data associated with the protection group, a list of cyclic redundancy check (CRC) values associated with the protection group, and/or flag, state, and/or versioning information associated with the protection group or associated data. There can be particular (e.g., different) and significant challenges in compressing data for storage and protection in protection groups in the memory component.

The disclosed subject matter can employ a compression management component (CMC) that can desirably (e.g., suitably, acceptably, or optimally) implement and manage compression of data for the file system to facilitate compressing data (e.g., by a compression component) and storing the compressed data in protection groups in the memory component, in accordance with defined compression management criteria. The CMC can manage (e.g., control) compression of data via inline compression (e.g., compression of data as it is being written to the memory component) and/or post-process compression (e.g., compression or re-compression (e.g., using a different compression algorithm) of data after the data has been written to the memory component) for storage in protection groups in the memory component, including determining whether to compress data, determining a compression algorithm, of a set of available compression algorithms, to utilize to compress data (e.g., if it is determined that the data is to be compressed), and/or determining whether to perform inline compression and/or post-process compression of data.

In connection with compressing data, the CMC can generate PG metadata for a protection group in which compressed data is stored, wherein the PG metadata can be stored in the memory component, and wherein respective PG metadata can be associated with respective protection groups. The PG metadata can comprise, for example, a logical extent map that describes which logical blocks contain compressed data, a list of CRC values for the logical blocks, and/or a list of compression chunks that can store individual metadata regarding individual compressed streams, wherein, for an individual compressed stream, the individual metadata can comprise a compression format for the compressed data of the individual compressed stream, a compressed size of the compressed data of the individual compressed stream, an uncompressed size of the uncompressed data associated with the compressed data of the individual compressed stream, and/or a starting offset in a physical space (e.g., physical block(s), or portion thereof) within the protection group in the memory component.

The implementation and management of data compression by the CMC and associated compression component can allow for a desirably flexible application of compression to data, such as file data, associated with the file system. In some embodiments, the compression component (e.g., as controlled by the CMC) can apply a different (or the same, as desired) compression algorithm to different individual compression chunks of data, and the CMC can facilitate storing the different compression chunks of data within the physical address space of a protection group. Accordingly, the disclosed subject matter can efficiently compress data and can pack (e.g., store) compressed data efficiently, as more fully described herein, which can avoid, reduce, or minimize undesirable (e.g., unnecessary or extra) protection overhead associated with the protection group (e.g., in securing the data).

In certain embodiments, the logical extent map generated and managed by the CMC can desirably provide an extra level of indirection, wherein, for example, the CMC can employ a passthrough entry that can enable direct references to the physical extent map, which can store information, such as sparse information (e.g., sparse block information) or a shadow store reference (e.g., as more fully described herein), as well as a typical physical block address associated with the physical extent map.

The techniques employed by the CMC and compression component to desirably compress data that is stored in protection groups in the memory component, as disclosed herein, can enable a desirable (e.g., good, suitable, or optimal) balance between compression effectiveness (e.g., desirable effectiveness in compression of data) while maintaining desirable (e.g., good, suitable, or optimal) random access to the data stored in the protection groups (e.g., all the data and state desired to access a piece of data can be contained inside a protection group, and a prior compressed data stream does not have to be compressed).

These and other aspects and embodiments of the disclosed subject matter will now be described with respect to the drawings.

Referring now to the drawings, FIG. 1 illustrates a block diagram of an example system 100 that can desirably (e.g., efficiently, suitably, or optimally) compress and decompress, and manage compression and decompression of, data associated with protection groups that are associated with a memory, in accordance with various aspects and embodiments of the disclosed subject matter. The system 100 can comprise a memory component 102 that can comprise memory locations, including memory location 104, memory location 106, and memory location 108, wherein data (e.g., uncompressed or compressed data) can be stored in the memory locations (e.g., 104, 106, 108).

The memory component 102 can be associated with (e.g., communicatively connected to) a file management component 110 that can generate and manage a file system 112 in which files, including file data, can be stored in memory locations (e.g., 104, 106, or 108, . . . ) in the memory component 102. The file management component 110 can store and protect data, such as file data, in protection groups, comprising protection group 114, protection group 116, and protection group 118, which can be associated with the memory locations (e.g., 104, 106, or 108, . . . ) in the memory component 102.

For instance, the file management component 110 can embed protection into each individual file of the file system 112. To do this, the file management component 110 can segment files into sections, called protection groups (e.g., 114, 116, 118, . . . ), which can be independently protected by the file management component 110 and other components of the system 100. A protection group (e.g., 114, 116, or 118, . . . ) can track all of the information about how that logical piece of the file is physically stored, and protected, in the memory location(s) (e.g., 104, 106, and/or 108, . . . ) in the memory component 102 (e.g., on-disk). Storing and protecting data in protection groups (e.g., 114, 116, 118, . . . ), by the system 100, can be a unique way of storing and protecting data, as opposed to employing a volume/RAID approach to store data. A protection group (e.g., 114, 116, or 118) can store a desired amount of data (e.g., 128 kiB to 2 MiB of data (or more)), such as, for example, data associated with files. A protection group (e.g., 114, 116, or 118) can be described by various metadata (e.g., generated or managed by the file management component 110 and/or a compression component 120). For instance, the file management component 110 can generate and/or manage certain metadata associated with a protection group (e.g., 114, 116, or 118) and/or data associated therewith, wherein such metadata can comprise, for example, a protection level and/or layout of the protection group and data stored therein (e.g., 2× mirroring, 16+4 FEC protection, . . . ), a physical extent map of the physical blocks of the memory component 102 (e.g., the physical blocks associated with the protection group in the memory component 102) that store the data associated with the protection group, a list of CRC values associated with the protection group, and/or flag, state, and/or versioning information associated with the protection group or associated data.

In some embodiments, the system 100 can comprise a compression component 120, which can comprise or be associated with a compression management component (CMC) 122 that can desirably (e.g., suitable, acceptably, or optimally) implement and manage compression of data and decompression of data for the file system 112 to facilitate compressing data (e.g., by compression component 120) and storing the compressed data in protection groups (e.g., 114, 116, or 118, . . . ) associated with memory locations (e.g., 104, 106, or 108, . . . ) in the memory component 102 and decompressing compressed data (e.g., by the compression component 120) that is stored in the memory locations, in accordance with defined compression management criteria. The CMC 122 can manage (e.g., control) compression of data via inline compression (e.g., compression of data as it is being written to the memory component) and/or post-process compression (e.g., compression or re-compression (e.g., using a different compression process or algorithm) of data after the data has been written to the memory component 102) for storage in protection groups (e.g., 114, 116, or 118, . . . ) in the memory component 102, including determining whether to compress data, determining a compression algorithm, of a set of available compression algorithms, to utilize to compress data (e.g., if it is determined that the data is to be compressed), and/or determining whether to perform inline compression and/or post-process compression of data, among other features of the CMC 122.

In accordance with various embodiments, the CMC 122 can desirably manage compression of data associated with files stored in the memory component 102 associated with the file system 112. The CMC 122 can manage compression of data (e.g., by the compression component 120) of a file to generate respective compression chunks of data that can be stored in a same protection group (e.g., protection group 114) or in different protection groups (e.g., protection groups 114, 116, and/or 118). The compression component 120 (e.g., as managed by the CMC 122) can compress respective portions (e.g., chunks) of data of the file to generate the respective compression chunks of data using the same compression algorithm or different compression algorithms (and/or a portion(s) of the data of the file can be stored in uncompressed form in the memory component 102). The chunk size of a compression chunk of data of a file typically can be relatively and/or significantly smaller (e.g., 8 kiB to 128 kiB (or another desired size)) than the file size (e.g., the amount of data) of the file. The CMC 122 can store or facilitate storing these relatively smaller-sized compression chunks of data of the file in one or more protection groups (e.g., protection groups 114, 116, and/or 118) in the memory component 102 (e.g., in associated memory locations (e.g., 104, 106, or 108, . . . ) in the memory component 102). The relatively smaller size of the compression chunks of data, as compared to the size of the file, can enable desirable and efficient random access to compressed files or desired portions (e.g., compression chunks) of compressed files.

The design of the file system 112 and the protection groups (e.g., protection groups 114, 116, and/or 118), and the functionality and features of the CMC 122 and file management component 110, also can enable desirable and efficient random access of the compression chunks of data (and the underlying data in uncompressed form) from the protection groups of the memory component 102. For instance, the CMC 122, file management component 110, or other system component can read or facilitate reading small portions (e.g., a compression chunk(s) of a set of compression chunks) of a file without having to decompress the entire file. When a certain portion of data of a file is desired, the compression component 120 (e.g., as managed by the CMC 122) can access and retrieve a desired compression chunk of data (e.g., comprising the certain portion of data) of the file from the protection group (e.g., protection group 114) (and associated memory location(s)) in the memory component 102, and can decompress that desired compression chunk of data without having to decompress the entire file (e.g., without having to decompress the other compression chunks of data of the file). As another example, when it is desired to overwrite a particular portion of data of a file, the CMC 122 can access and retrieve a desired compression chunk of data (e.g., comprising the particular portion of data) of the file from the protection group (e.g., protection group 114) (and associated memory location(s)) in the memory component 102, and the compression component 120 (e.g., as managed by the CMC 122) can decompress that desired compression chunk of data without having to decompress the entire file (e.g., without having to decompress the other compression chunks of data of the file) to obtain (e.g., recover) the particular portion of data and enable the particular portion of data to be overwritten or the entire compression chunk of data can be overwritten without decompressing it (if the particular portion of data makes up the entire compression chunk). As still another example, the CMC 122 can operate in conjunction with a snapshot subsystem (e.g., subsystem that can generate and manage snapshots of data or files) of the file system 112 such that storage overhead of a snapshot of a compressed file does not have to involve duplicating all file data of the file in the snapshot, as more fully described herein.

With further regard to the protection groups (e.g., protection groups 114, 116, 118, . . . ), the CMC 122, file management component 110, or another system component can access a protection group (e.g., protection group 114) and its associated data (e.g., compression chunks of data) independently of other protection groups (e.g., protection groups 116 and/or 118). The compression component 120 (e.g., as managed by the CMC 122) can compress respective compression chunks of data independently of each other, and the CMC 122 can store or facilitate storing respective compression chunks of data in respective (e.g., same or different) protection groups (e.g., protection groups 114, 116, 118, . . . ) independently of each other. The CMC 122, file management component 110, or other system component can look up, access, and/or retrieve a compression chunk of data, and/or the compression component 120 can decompress the compression chunk of data, independent of (e.g., without having to access or decompress) the other compression chunks of data in the same protection group (e.g., protection group 114) or the other protection groups (e.g., protection groups 116 and/or 118).

With further regard to inline compression, the CMC 122 can manage inline compression to enable inline compression by either a global default policy that can enable inline compression to be applied to all files (e.g., when the defined compression management criteria is otherwise satisfied) and/or a per-file compression policy that can take precedence over the global default policy, wherein the per-file compression policy can specify whether inline compression can be applied to a particular file associated with the applicable compression policy (e.g., when the defined compression management criteria is otherwise satisfied). The CMC 122 can allow inline compression to be enabled or disabled at any time (e.g., by a user via an interface). In some embodiments, if inline compression is disabled for a file and a write is attempted to a region of the file that is stored in compressed form, the CMC 122 can manage, or facilitate managing, the write such that any compression chunks of data being overwritten, either partially or fully, can be rewritten as uncompressed data and stored in the memory component 102.

Figure 2:
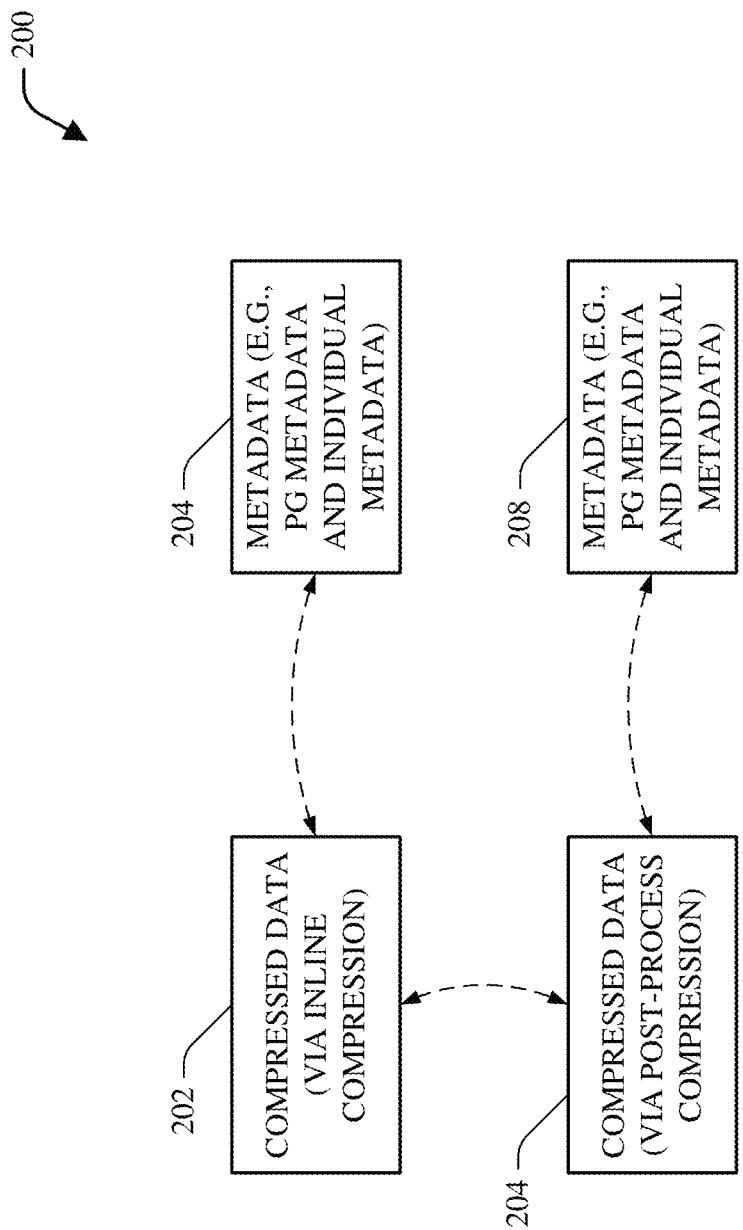
FIG. 2 depicts a block diagram of example inline compression and post-compression processes that respectively can be employed to compress data as it is being written to the memory component or can compress (or re-compress) data after it has initially been written to the memory component, in accordance with various aspects and embodiments of the disclosed subject matter.

Referring to FIG. 2 (along with FIG. 1), FIG. 2 depicts a block diagram of example inline compression and post-compression processes 200 that respectively can be employed to compress data as it is being written to the memory component 102 or can compress (or re-compress) data after it has initially been written to the memory component 102, in accordance with various aspects and embodiments of the disclosed subject matter. In some embodiments, in connection with the writing of data (e.g., file data associated with a file) to the memory component 102, the CMC 122 can determine whether to compress the data as the data is being written to the memory component (e.g., via inline compression), and, if so, can determine which compression algorithm of available compression algorithms that is to be utilized to compress the data, in accordance with the defined compression management criteria. For instance, the file management component 110 and/or CMC 122 can receive the data from a data source (e.g., a user interface, such as a keyboard, a voice interface, or a touchscreen, a mouse, a keypad, . . . ). The CMC 122 can analyze (e.g., evaluate) the data and/or the available compression algorithms Based at least in part on the results of the analysis, the CMC 122 can determine whether the data is to be compressed, via inline compression, and, if so, which compression algorithm of the available compression algorithms is to be used to compress the data, via inline compression, in accordance with the defined compression management criteria. A compression management criterion of the defined compression management criteria can indicate or specify, for example, a throughput or speed criterion (e.g., a minimum throughput or speed threshold level) that is to be satisfied by a compression algorithm in order for it to be desirable (e.g., appropriate, acceptable, or suitable) to use for inline compression to compress the data.

If, based at least in part on the results of the analysis, the CMC 122 determines that none of the available compression algorithms can satisfy applicable compression management criteria (e.g., the compression management criterion), with respect to inline compression, the CMC 122 can determine that no inline compression is to be performed by the compression component 120. As some examples, based at least in part on the analysis results, the CMC 122 can determine that the data is not compressible, can determine that none of the available compression algorithms is able to compress the data with a sufficient throughput or speed to desirably (e.g., suitably or acceptably) compress and write the data to the memory component 102, can determine that none of the available compression algorithms is able to compress the data to a data size that is smaller or sufficiently smaller than the original (e.g., uncompressed) data to justify compressing the data via inline compression, and/or can determine that the data is not to be compressed via inline compression for another reason(s) (e.g., a reason(s), such as disclosed herein), in accordance with the defined compression management criteria.

If, based at least in part on the results of the analysis or evaluation, the CMC 122 determine that compression is to be applied, via inline compression, to compress the data, the CMC 122 can determine that a compression algorithm of the available compression algorithms that can be applied to the data, in accordance with the defined compression management criteria. For instance, the CMC 122 can determine and select a compression algorithm, of the available compression algorithms, that can satisfy (e.g., meet or exceed) the throughput or speed criterion and/or any other applicable compression management criterion. As an example, the CMC 122 can determine and select a compression algorithm, of the available compression algorithms, that can satisfy the throughput or speed criterion and can provide the highest amount of compression (e.g., most reduction in data size) as compared to any other compression algorithm that satisfies the throughput or speed criterion.

The compression component 120 can apply the compression algorithm to the data to compress the data (e.g., via inline compression) to generate compressed data in a compression format associated with the compression algorithm (as depicted at reference numeral 202). The CMC 122 or compression component 120 can facilitate storing the data (if the data was not compressed) or the compressed data in a set of memory locations (e.g., 104, 106, and/or 108) in the memory component 102, wherein the set of memory locations can be associated with a protection group (e.g., protection group 114).

As depicted at reference numeral 204, the CMC 122 also can determine and generate metadata, comprising PG metadata associated with the protection group and individual metadata associated with the data or compressed data, based at least in part on characteristics associated with the protection group (e.g., protection group 114) and characteristics (e.g., size of compressed data, size of uncompressed data, compression format or algorithm, starting offset, . . . ), associated with the data or compressed data, whichever type of data is stored in the set of memory locations (e.g., 104, 106, and/or 108). The PG metadata can comprise, for example, a logical extent map that can describe or identify which logical blocks are taking part in the compression of data (e.g., which logical blocks are associated with compressed data stored in the memory component 102), a list of additional CRC values for the logical blocks, and a list of compression chunks that can store metadata (e.g., individual metadata) regarding individual compressed streams, wherein an individual compressed stream can comprise the compressed data. The logical blocks can be associated with (e.g., mapped or linked to) the set of memory locations (e.g., 104, 106, and/or 108) where the data or compressed data has been stored. The PG metadata also can comprise other types of PG metadata (e.g., a physical extent map of the physical blocks that store the data or compressed data associated with the protection group (e.g., protection group 114), an initial list of CRC values, . . . ) that can describe the protection group, such as more fully described herein. The individual metadata can comprise, for example, information indicating the compression format of the compressed data (or indicating no compression format if the data is not compressed (e.g., via inline compression)), information indicating a compressed size of an individual compressed stream comprising the compressed data (if the data has been compressed), information indicating an uncompressed size of the individual compressed stream comprising the compressed data (if the data has been compressed) or indicating the uncompressed size of the data (which was not compressed), and/or information indicating a starting offset for the individual compressed stream in physical space (e.g., physical block, or portion thereof) in the protection group (e.g., protection group 114). The CMC 122 can store or facilitate storing the metadata, comprising the PG metadata and the individual metadata, in the memory component 102 or other desired storage location (e.g., another data store).

In some instances, when data is being written to the memory component 102, the CMC 122 can determine that the data is not to be compressed, or, during inline compression, the data is to be compressed using a first compression algorithm that does not result in the data being compressed to as small of a size as a second compression algorithm can achieve, wherein the CMC 122 can select the first compression algorithm over the second compression algorithm based at least in part on the applicable compression management criteria (e.g., a throughput or speed criterion). In certain embodiments, after the data or compressed data (e.g., compressed via inline compression) has been stored in the memory component 102, the CMC 122 can determine whether post-process compression is to be performed to compress or re-compress the stored data using a desired compression algorithm, in accordance with the defined compression management criteria. For example, there can be instances where the second compression algorithm can compress data to a smaller size than the first algorithm, but the second compression algorithm does not provide a sufficiently fast enough throughput or speed to use it for inline compression when the data is being compressed and written to the memory component 102, so the CMC 122 selects the first compression algorithm for inline compression to compress the data written to the memory component 102. The CMC 122 can determine that, at a subsequent time, post-process compression can be performed on the stored data using the second compression algorithm (e.g., using a background process).

The CMC 122 can analyze (e.g., evaluate) the stored data (which was stored as uncompressed or compressed data) in the memory component 102 and/or one or more compression algorithms to determine whether the stored data is to be compressed or re-compressed, via post-process compression, using one of the compression algorithms, and, if so, which compression algorithm is to be used to compress or re-compress the stored data, in accordance with the defined compression management criteria. For instance, a compression management criterion can indicate or specify that post-process compression can be performed using a compression algorithm if the size of the compressed data after post-process compression using such compression algorithm is smaller than the size of the stored data, or smaller than the size of the stored data by at least a defined amount.

If, based at least in part on the results of the analysis, the CMC 122 determines that none of the available compression algorithms is able to compress the stored data to a size that is smaller, or sufficiently smaller, than the size of the stored data, in accordance with the applicable compression management criteria, the CMC 122 can determine that no post-process compression is to be performed on the stored data. If, however, based at least in part on the results of the analysis, the CMC 122 determines that there is a compression algorithm of the available compression algorithm that can be applied to the stored data to compress (or recompress) the data (e.g., the uncompressed version of the data) to a size that is smaller or sufficiently smaller than the size of the stored data, the compression management component 122 can determine that the post-process compression is to be performed, using the determined compression algorithm to compress or re-compress the stored data, in accordance with the defined compression management criteria. For example, the CMC 122 can determine and select a compression algorithm, of the available compression algorithms, that can provide the highest amount of compression (e.g., provide the most reduction in data size) as compared to any other available compression algorithm.

The CMC 122 can control the compression component 120 to have the compression component 120 compress or re-compress the stored data using the determined compression algorithm to perform the post-process compression to generate compressed data in a compression format associated with the determined compression algorithm (as depicted at reference numeral 206). For instance, if the stored data initially was not compressed (e.g., via inline compression) when being written to the memory component 102, the compression component 120 can compress the data, based at least in part on the determined compression algorithm, to generate compressed data in the compression format associated with the determined compression algorithm. If the stored data initially was compressed using a (first) compression process (e.g., via inline compression) when being written to the memory component 102, the compression component 120 can compress the data, based at least in part on the determined (second) compression process, to generate (second) compressed data in the (second) compression format. In some embodiments, during post-process compression, the compression component 120 can decompress the stored data (e.g., the (first) compressed data) to generate or recover the uncompressed data, and can apply the (second) compression process to the uncompressed data to generate the (second) compressed data in the (second) compression format.

The CMC 122 or compression component 120 can facilitate storing the (second) compressed data in a (second) set of memory locations (e.g., 104, 106, and/or 108) in the memory component 102, wherein the set of memory locations can be associated with the protection group (e.g., protection group 114). As depicted at reference numeral 208, the CMC 122 can determine and generate (or update) the metadata, comprising the PG metadata (e.g., logical extent map, physical extent map, CRC values, list of compression chunks, . . . ) and the individual metadata (e.g., compression format, compressed size, uncompressed size, starting offset in physical space within the protection group, . . . ), based at least in part on the characteristics associated with the protection group (e.g., protection group 114) and the characteristics associated with the compressed (or re-compressed) data that is associated with (e.g., protected or secured by or in) the protection group, as more fully described herein. The CMC 122 can store or facilitate storing the metadata, comprising the PG metadata and the individual metadata, in the memory component 102 or other desired storage location (e.g., another data store).

The implementation and management of data compression by the CMC 122 and associated compression component 120 can allow for a desirably flexible application of compression to data, such as file data, associated with the file system 112. In some embodiments, the compression component 120 (e.g., as controlled by the CMC 122) can apply a different (or the same, as desired) compression algorithm to different individual compression chunks of data, and the CMC 122 can facilitate storing the different compression chunks of data within the physical address space (e.g., storing the different compression chunks within the same subset of physical blocks associated with a cluster and/or storing two or more of the compression chunks within a same physical block of the subset of physical blocks associated with the cluster) of a protection group (e.g., 114), as more fully described herein. Accordingly, the disclosed subject matter can efficiently compress data and can pack (e.g., store) compressed data efficiently, which can avoid, reduce, or minimize undesirable (e.g., unnecessary or extra) protection overhead associated with the protection group (e.g., in securing the data).

Figure 3:
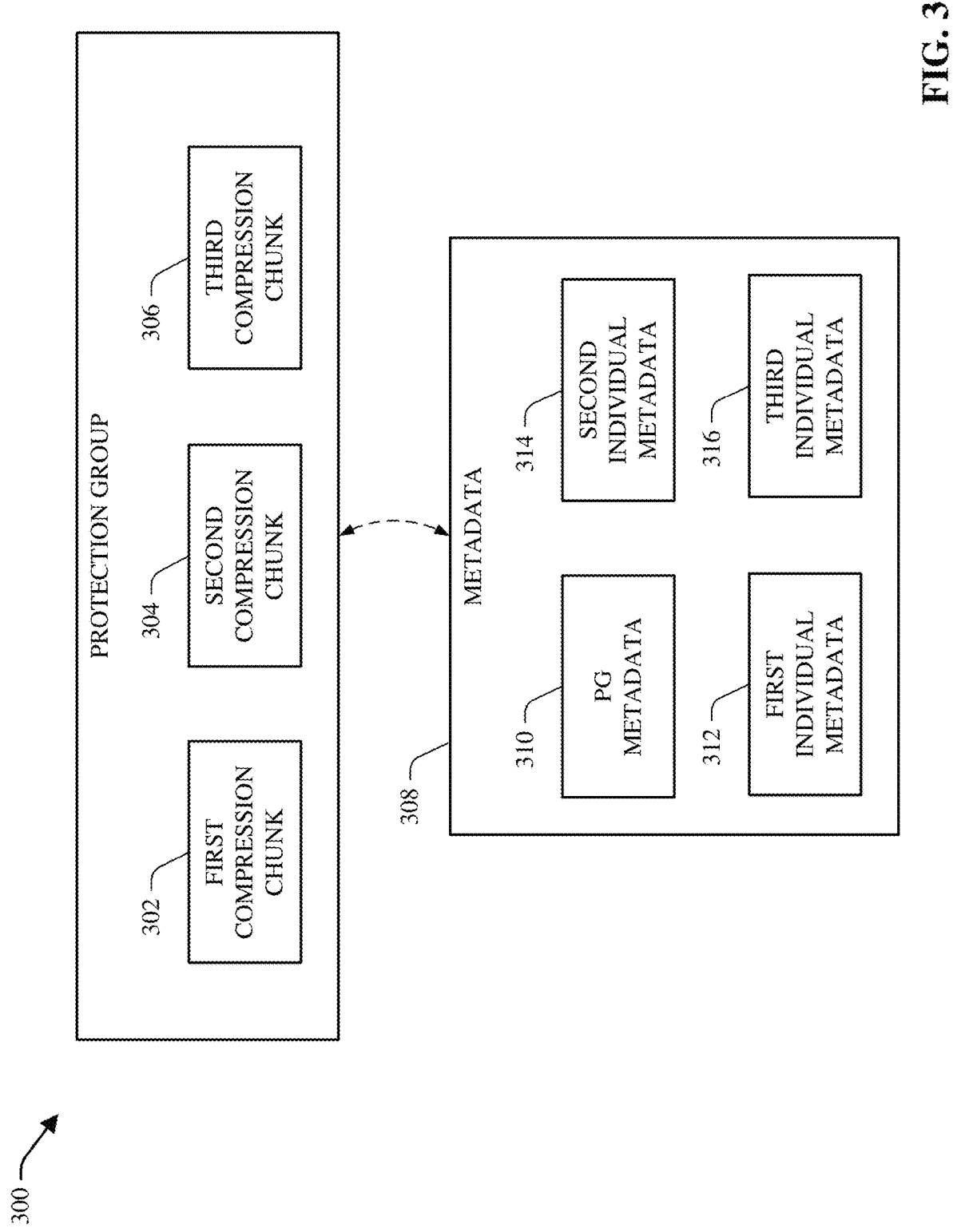
FIG. 3 illustrates a block diagram of an example protection group associated with different compression chunks of data that were compressed using different compression algorithms, in accordance with various aspects and embodiments of the disclosed subject matter.

In that regard, turning to FIG. 3 (along with FIG. 1), FIG. 3 illustrates a block diagram of an example protection group 300 associated with different compression chunks of data that were compressed using different compression algorithms, in accordance with various aspects and embodiments of the disclosed subject matter. In some embodiments, the CMC 122 can determine a first compression format, and associated first compression algorithm, to employ to compress first data, in accordance with the defined compression management criteria. The compression component 120 can compress the first data in the first compression format, based at least in part on the first compression algorithm, to generate a first compression chunk 302 comprising the first compressed data, wherein the first compressed data can be a compressed version of the first data. The first compression chunk 302 can be associated with, and protected and/or secured by, the protection group 300. For instance, the protection group 300 can be associated with a desired number (e.g., one or more) of subsets of memory locations (e.g., 104, 106, and/or 108) of a set of locations of the memory component 102. The CMC 122, the file management component 110, and/or the memory component 102 can store, or facilitate storing, the first compression chunk 302 in a first subset of memory locations associated with the protection group 300.

The CMC 122 also can determine a second compression format, and associated second compression algorithm, to employ to compress second data, in accordance with the defined compression management criteria, wherein the second compression format and associated algorithm can be different from the first compression format and associated algorithm. The compression component 120 can compress the second data in the second compression format, based at least in part on the second compression algorithm, to generate a second compression chunk 304 comprising the second compressed data, wherein the second compressed data can be a compressed version of the second data. The CMC 122, the file management component 110, and/or the memory component 102 can store, or facilitate storing, the second compression chunk 304 in a second subset of memory locations associated with the protection group 300, wherein the protection group 300 can be associated with, and can protect and/or secure, the second compression chunk 304.

The CMC 122 further can determine a third compression format, and associated third compression algorithm, to employ to compress third data, in accordance with the defined compression management criteria, wherein the third compression format and associated algorithm can be different from the first and second compression formats and respectively associated algorithms. The compression component 120 can compress the third data in the third compression format, based at least in part on the third compression algorithm, to generate a third compression chunk 306 comprising the third compressed data, wherein the third compressed data can be a compressed version of the third data. The CMC 122, the file management component 110, and/or the memory component 102 can store, or facilitate storing, the third compression chunk 306 in a third subset of memory locations associated with the protection group 300, wherein the protection group 300 can be associated with, and can protect and/or secure, the third compression chunk 306.

The CMC 122 also can determine and generate metadata 308 for and associated with the protection group 300 and the compression chunks (e.g., 302, 304, 306) associated with the protection group 300. For instance, the CMC 122 can determine and generate the metadata 308, comprising PG metadata 310 (e.g., logical extent map, physical extent map, CRC values, list of compression chunks (e.g., 302, 304, and 306), flag, state, and/or versioning information associated with the protection group 300 or associated compressed data, . . . ), first individual metadata 312 associated with the first compression chunk 302, second individual metadata 314 associated with the second compression chunk 304, and third individual metadata 316 associated with the third compression chunk 306, based at least in part on the characteristics associated with the protection group 300 and the respective characteristics associated with the respective compression chunks (e.g., 302, 304, 306) that are associated with (e.g., protected or secured by or in) the protection group 300, as more fully described herein. The respective individual metadata (e.g., 312, 314, and 316) can comprise, for example, the respective compression formats, compressed sizes, uncompressed sizes, starting offsets in physical space within the protection group 300, etc., associated with the respective compression chunks (e.g., 302, 304, and 306). The CMC 122 can store or facilitate storing the metadata 308, comprising the PG metadata 310, the first individual metadata 312, the second individual metadata 314, and the third individual metadata 316, in the memory component 102 or other desired storage location (e.g., another data store).

With further regard to FIG. 1 and the system 100, in certain embodiments, the logical extent map generated and managed by the CMC 122 can desirably provide an extra level of indirection, wherein, for example, the CMC 122 can employ a passthrough entry that can enable direct references to the physical extent map, which can store information, such as sparse information (e.g., sparse block information) or a shadow store reference (e.g., as more fully described herein), as well as a typical physical block address associated with the physical extent map.

The techniques employed by the CMC 122 and compression component 120 to desirably compress data that is stored in protection groups (e.g., 114, 116, 118, . . . ) in the memory component 102, as disclosed herein, can enable a desirable (e.g., good, suitable, or optimal) balance between compression effectiveness (e.g., desirable effectiveness in compression of data) while maintaining desirable (e.g., good, suitable, or optimal) random access to the data stored in the protection groups (e.g., all the data and state desired to access a piece of data can be contained inside a protection group, and a prior compressed data stream does not have to be compressed).

These and other aspects and embodiments of the disclosed subject matter will now be described with respect to FIG. 1 and other drawings.

As disclosed, the file system 112 can embed protection into each individual file of the file system 112. To accomplish such protection, the file management component 110 can segment files into sections, called protection groups (e.g., 114, 116, 118, . . . ), which can be independently protected by, and can be independently accessed by, the file management component 110, the CMC 122, and other components of the system 100, as more fully described herein. A protection group (e.g., 114, 116, or 118, . . . ) can track all of the information about how that logical piece of the file is physically stored, and protected, in the memory location(s) (e.g., 104, 106, and/or 108, . . . ) in the memory component 102 (e.g., on-disk).

The file system 112 also can utilize clusters, wherein, in accordance with protection group terminology, a cluster can be a division of the logical block space, which can have a desired or specified size and alignment. For instance, a protection group can comprise one or more whole clusters, and a cluster can comprise a subset of the logical block space of a protection group (e.g., a cluster can comprise a subset of the logical blocks of the protection group). The size of a cluster typically can be defined, limited, and/or relatively small as compared to the size of the logical block space. In accordance with various embodiments, a cluster can comprise 16 logical blocks (e.g., 128 KiB), or other desired number (e.g., a number less than or greater than 16) of logical blocks, of the file system 112.

As disclosed, the compression component 120 can compress data to generate compression chunks of data. The compression chunk size of a compression chunk can be the maximum amount of logical file data that can be compressed as a single entity by the compression component 120. When an input/output (I/O) occurs to a compressed region, this also can represent the smallest possible I/O, since it can be desirable (e.g., suitable or necessary) for the I/O to be expanded to include the entire compression chunk.

If there are multiple compression chunks for a single cluster, the CMC 122 can pack those compression chunks together to reduce lost space. (Note that it can be desirable for the compression chunk size to be (e.g., to always be) the same or smaller than the cluster size.) For instance, as disclosed herein, in certain embodiments, the compression component 120 (e.g., as controlled by the CMC 122) can apply different compression algorithms (or the same compression algorithm, as desired) to different individual compression chunks of data, and the CMC 122 can facilitate storing the different compression chunks of data within the physical address space of a protection group (e.g., 114). For example, the CMC 122 can store or facilitate storing the different individual compression chunks in a same subset of physical blocks (e.g., of the memory component 102) associated with a cluster and/or can store or facilitate storing two or more of those different individual compression chunks in a same physical block of the subset of physical blocks associated with the cluster. Accordingly, employing these and other techniques, as disclosed herein, the compression component 102 and/or CMC 122 can efficiently compress data and can pack (e.g., store) compressed data efficiently, which can avoid, reduce, or minimize undesirable (e.g., unnecessary or extra) protection overhead associated with the protection group (e.g., in securing the data).

The disclosed subject matter can employ various compression internal parameters that the CMC 122 can adjust for compression. In some embodiments, one or more of these compression internal parameters can rise up (e.g., bubble up) to the system controls (sysctls) of the file system 112 or other (e.g., customer-invisible) configuration. Other compression internal parameters can be hard-coded or compile-time choices of the CMC 122 or user configuring the system 100.

With regard to compression chunk size, the CMC 122 can divide up the logical space of each file into equal sized chunks (or other desirably sized chunks), which can be referred to as compression chunks. The desirable (e.g., optimal, suitable, or acceptable) chunk size can depend on the I/O in use. A few significant assumptions or determinations can be made regarding compression chunk sizes, including the following assumptions or determinations. For instance, relatively smaller chunk sizes typically can be better for performance with partial reads or writes (e.g., as compared to larger chunk sizes, whereas larger chunk sizes typically can achieve more desirable (e.g., better) compression ratios (e.g., as compared to smaller chunk sizes). For example, 128 kiB chunk sizes can have the added desirability (e.g., simplification) of matching a desirable cluster size that can be employed by the file system 112, which can thereby avoid packing.

Also, compression chunks can be structured to not cross cluster boundaries. As a result, the system 100 does not have to decompress or recompress data in order to change protection levels, perform recovered writes, or otherwise shift protection-group boundaries.

In some embodiments, compression chunks of data can share blocks (e.g., physical blocks in the memory component 102) due to the compressing of the data to form the compression chunks and/or packing of different (e.g., multiple) compression chunks into a same physical block of one (or portion thereof) or more physical blocks associated with a cluster. However, even though compression chunks can share blocks due to the data compression and/or the packing, the system 100 does not have to decompress or recompress one compression chunk because of I/O to another compression chunk.

In certain embodiments, the CMC 122 can employ a single compression chunk size (e.g., 32 kiB, 128 kiB, or other desired size) that can desirably (e.g., reasonably or suitably) balance the streaming and random performance specifications of the file system 112 and memory component 102. In other embodiments, the CMC 122 can employ (e.g., support) multiple (e.g., different) compression chunk sizes. When employing multiple compression chunk sizes, the CMC 122 can enable a user to configure the compression chunk size via input information received from the user via a user interface associated with the CMC 122. For instance, compression chunk size can be included in file-system access pattern settings (e.g., along with other settings, such as settings related to predicting future access patterns), and the CMC 122 can set the compression chunk size based at least in part on the file-system access pattern setting(s) (e.g., setting related to compression chunk size) received from the user via the user interface. For example, a user can desire to set multiple compression chunk sizes, or the CMC 122 can otherwise be configured to utilize multiple compression chunk sizes, wherein a streaming I/O access pattern can use a compression chunk size of 128 kiB, and a random I/O access pattern can use a compression chunk size of 32 kiB.

In some instances, the choice of compression chunk size potentially can change between what is stored in the memory component 102 (e.g., on-disk) and a new overwrite. This can happen, for example, if a user (e.g., customer) changes an access pattern, or the dynamic access pattern settings are further extended, or if something other than access pattern is utilized to select compression chunk size. If the choice of compression chunk size changes between what is stored in the memory component 102 (e.g., on-disk) and a new overwrite, in some embodiments, the CMC 122 and/or file management component 110 can control new write operations (or restripes) to conform to a preferred compression chunk size, in accordance with the defined compression management criteria.

With regard to packing alignment, if there are multiple compression chunks in a cluster, the CMC 122 can glue or pack, or facilitate gluing or packing, the multiple compression chunks of the cluster together in the physical space, as more fully described herein.

Packing the blocks can allow multiple compression chunks to share the same physical block, which can improve compression ratios. However, packing potentially can have a significant downside if and when the compression ratio changes (as it will likely do on every write operation or at least many write operations). Such downside can be increased I/O as subsequent data will have to be shifted. This can be a significant downside, but can be relatively better than using a larger chunk-size; because the I/O is not always increased, and the compression component 120 does not always have to decompress and recompress every byte of data that is read (e.g., compression chunks can be moved around without recompressing).

A relatively basic form of packing can tightly pack each compression chunk right next to the compression chunk before it. However, the disclosed subject matter, employing the CMC 122, can mitigate some of the downsides of packing by adding padding. With padding, overwrites which compress to similar sizes can be writeable without the CMC 122 having to move subsequent compression chunks.

In accordance with various embodiments, with regard to a padding selection (e.g., choice) made by the CMC 122, the CMC 122 can record (e.g., store) that padding selection in the protection group (e.g., protection group 114) so that future reads (e.g., by, or managed by, the CMC 122 and/or the file management component 110) associated with compression chunks of the protection group can properly locate each compression chunk associated with the protection group. In some embodiments, the CMC 122 can employ a padding implementation whereby the CMC 122 can round up the next compression chunk to start at the next boundary of a given alignment. The CMC 122 can employ one or more bits (e.g., for compression chunk metadata) that can be set (e.g., to respective values) to facilitate tracking the packing alignment.

In certain embodiments, the CMC 122 can employ two relatively basic packing options that both can be expressed using a padding alignment, wherein such packing options can include "do not share blocks at all," which can be the same as an alignment of one block (8 kiB), and "do not pad at all," which can be the same as an alignment of one byte (1 byte (B)). In one example embodiment, if compression chunks smaller than 128 kiB are used by the system 100, packing can be used, wherein such packing can be relatively tight (e.g., 1 B alignment). However, it is to be appreciated and understood that the disclosed subject matter can comprise other embodiments where compression chunks can have various sizes, where packing is used or not used, and/or where the packing (if used) can be relatively tight (e.g., 1 B alignment) or less tight (e.g., 8 kiB alignment or other desired alignment level).

There can be instances where data can exhibit incompressible or less desirably compressible data behavior. For instance, if a chunk of data is compressed, but the compressed result does not provide sufficient savings (e.g., the compressed result takes as much or more physical storage than the original uncompressed data would have taken), such data can be deemed to be incompressible. The physical and CPU implications of this can be relevant and can be considered.

A physical implication of incompressible data can be that, when a compression chunk cannot be desirably (e.g., usefully or sufficiently) compressed, the source data for that compression chunk typically is to be written to the memory component 102 in an uncompressed state. Note that with packing, multiple data chunks (e.g., multiple compression chunks of data) can use (e.g., can be stored in) a single block of the memory component 102, so the threshold (e.g., memory saving threshold) that a single compression chunk can be desired to satisfy in order to save memory space can be something other than a full 8 kiB block.

A CPU implication of incompressible data can be that it can cost CPU resources to attempt compression, even if the attempt to compress the data fails or is rejected as not being desirable (e.g., useful or sufficient). However, when a compression attempt fails, the resources of the CPU that were used can be wasted as a result. It can be desirable to avoid such CPU waste where possible, which can lead to the system 100 (e.g., the CMC 122 of the system 100) trying to bypass compressing data, and/or determining that the compressing of data is to be bypassed, at certain times (e.g., under certain conditions), in accordance with the defined compression management criteria.

In accordance with various embodiments, given the CPU resources cost to perform data compression, the CMC 122 can predict when compression of data will not provide sufficient saving of memory, and can bypass compression of data in such instances, in accordance with the defined compression management criteria. For example, the CMC 122 can predict when compression of data will not provide sufficient reduction in the size of the data to justify incurring the cost of utilizing the CPU resources to the perform the data compression, and, based at least in part on the prediction, the CMC 122 can determine that compression of such data is to be bypassed.

To facilitate predicting whether compression of data will result in sufficient saving of memory (e.g., relative to use of CPU resources), the CMC 122 can consider when compression of data has been historically incompressible. For instance, if the compression component 120 had attempted to compress a memory region in the memory component 102, but failed to get a useful (e.g., suitable or acceptable) compression ratio, the CMC 122 can mark the memory region (e.g. the protection group (e.g., 114) or compression chunk) with an incompressible data flag that can influence further attempts to compress data for that protection group or compression chunk. The CMC 122 can use that incompressible data flag to entirely avoid future compression attempts with regard to that memory region, or can use the incompressible data flag as one indicator of a number of indicators that can be evaluated by the CMC 122 to determine whether to compress data associated with that memory region, wherein this can end up reducing how often the CMC 122 attempts to compress data associated with that memory region. Having the CMC 122 consider reduction in attempts to compress data for the memory region, instead of full avoidance of compression data associated with the memory region, typically can be more prudent because of cases like a tar or Powerpoint file, where the compressibility of data can vary over the file, and the varying points can move if the file is updated. In such cases, a permanent disable of data compression for the memory region can be undesirable (e.g., unsuitable or suboptimal).

In addition to individual incompressible memory regions, in certain instances, the contents of an entire file can be incompressible (e.g., due to the file already being in a natively-compressed format). In such instances, the CMC 122 can analyze the file, and based at least in part on the analysis, the CMC 122 can determine or detect that the file can be incompressible, and can determine that compression of the data is not to be performed by the compression component 120. For instance, based at least in part on the analysis, the CMC 122 can determine that the file has already been compressed in a natively-compressed format, and, as a result, the file is incompressible (e.g., no further data compression of the file will be useful). Accordingly, the CMC 122 can determine that compression of the file is not to be performed by the compression component 120.

There also can be instances where a compression chunk contains only a single block of data. If a compression chunk contains only a single block of data, there typically can be no point attempting compression since compressing a single block of data can save no memory space. This generally can include all files that fit in a single 8 kiB block. It also can include files whose final compression-chunk can be a single 8 kiB block, or files with only one non-sparse block written in the protection group (e.g., 114) (or potentially even a cluster). Typically, in such instance, the CMC 122 can detect or determine that there is only a single block of data, and, as a result, can determine that no compression of the single block of data is to be performed by the compression component 120.

It is noted that there can be an exception with regard to compression of a single block of data. In some embodiments, the file system 112 and the memory component 102 can be configured to enable data to be inlined to the Mode. In such configuration, as a result, there can be instances where memory space can be saved by compressing data in sub-8 kiB files. Based at least in part on analysis of the data and/or the system configuration, the CMC 122 can determine when memory space can be sufficiently saved by compressing a single block of data or less, where inlining of data to the Mode is involved, and, if memory space can be sufficiently saved by performing data compression, the CMC 122 can control the compression component 120 to have the compression component 120 compress the single block of data or less.

Another situation where the CMC 122 can determine that compression can be bypassed involves final blocks of data that are in-flight (e.g., in-flight write of data). For instance, with regard to a relatively larger file, the CMC 122 can determine whether to compress any final blocks of data of the file that do not form a full compression chunk, in accordance with the defined compression management criteria. For example, if the CMC 122 determines that the file is not static (e.g., the data is still being changed or added in or to the file), the CMC 122 can determine that the final blocks of data of the file, which do not form a full compression chunk, are not to be compressed, as the data in the file, and, as a result, the non-full compression chunk(s) can still be changed. A significant gain in performance of the system 100 can be achieved by bypassing compression (e.g., unsuitable or unnecessary compression) of such final blocks of data.

If, however, the CMC 122 determines that the file is relatively static, the CMC 122 can determine whether compressing the final blocks of data of the file, which do not form a full compression chunk, will result in sufficient savings in memory space to justify expending the CPU resources, in accordance with the defined compression management criteria. The decision, by the CMC 122, of whether to compress final blocks of data of the file (which do not form a full compression chunk) can be influenced, for example, by, or based at least in part on, whether the write is in the latency path (e.g., bypassing write cache) or whether it is likely to be accessed with more, smaller I/O (such as, e.g., write-cache-disabled, OSYNC, etc.).

With regard to compression algorithms, the compression component 120 can utilize a variety of compression algorithms to facilitate compression data, wherein the compression algorithms can include, for example, LZ4, DEFLATE (or DEFLATE-related algorithms), zlib, Lempel-Ziv-Oberhumer (LZO), an intelligent storage accelerator library (ISA-L) igzip, zstd, Lempel-Ziv-Markov chain algorithm (LZMA) LZMA or LZMA2, and/or other desired compression algorithms. For example, the compression component 120 can utilize LZ4 for software-driven compression and DEFLATE for hardware-driven compression, although other compression algorithms can be used, as desired. Some compression algorithms can provide faster compression and/or decompression, but lower compression rates. As a result, such compression algorithms typically can be more suitable for inline compression. Other compression algorithms can provide very good compression ratios, but can be relatively slow with regard to performing compression and/or decompression. As a result, these compression algorithms typically can be suited to post-processing archive file sets (e.g., post-process compression).

The compression algorithms employed by the compression component 120 can perform transparent or lossless data compression where the compressed data can be essentially indistinguishable from the original data (e.g., when the compressed data is decompressed). For example, the compression algorithms employed by the compression component 120 can satisfy (e.g., meet or exceed) defined compression transparency criteria, wherein the defined compression transparency criteria can be satisfied if it is determined that the compressed data can be indistinguishable or at least sufficiently indistinguishable from the original data (e.g., when the compressed data is decompressed).

Some aspects regarding these example compression algorithms and technologies can include the following. In some embodiments, certain chipsets can use a DEFLATE-compatible compression algorithm, and, as a result, hardware and software compression can work with the same data (e.g., on-disk data) associated with the memory component 102. With regard to zlib (e.g., zlib can be the reference implementation for the DEFLATE standard), the zlib implementation generally has acceptable (e.g., good) compression ratios, but it can be too slow to be used for inline compression (e.g., too slow to be used in high bandwidth inline compression scenarios).

The LZ4 algorithm generally can have good throughput or speed, and in particular can have relatively fast decompression speeds, but at the cost of having relatively worse compression ratios (e.g., as compared to the compression ratios of some other compression algorithms). The LZ4 algorithm generally can be well suited as an inline compression algorithm, for example, for high throughput scenarios.

The ISA-L (e.g., Intel® ISA-L) can include an optimized DEFLATE-compatible algorithm that exhibits relatively good performance and compression ratios, and, accordingly, can be a good general purpose compression algorithm. However, this optimized DEFLATE-compatible algorithm still can be slower at decompression than the LZ4 algorithm.

The LZO algorithm has been enhanced (e.g., optimized) for relatively fast decompression speeds. As compared to zlib, for example, the LZO algorithm generally can have relatively worse compression ratios, similar compression speed, and significantly better decompression speed. The LZO algorithm generally can be acceptable for inline compression.

The ISA-L igzip algorithm can be a relatively highly optimized implementation of a DEFLATE compatible compression algorithm. The ISA-L igzip algorithm can be significantly faster in compressing data than the zlib implementation and the compression ratios from the ISA-L igzip algorithm are generally only slightly worse than the zlib implementation. Given the combination of relatively good speed and relatively good compression ratios, the ISA-L igzip algorithm can be another suitable option of a default compression algorithm, and an algorithm that can be suitable for use in inline compression or post-process compression.

The zstd algorithm generally can be positioned in between the zlib implementation and the LZ4 algorithm with regard to compression performance, and can provide compression ratios that can be comparable to the zlib implementation.

LZMA and LZMA2 generally can offer relatively superior compression ratios, but at the cost of significantly slower compression speed and increased memory storage. Such attributes can make LZMA and LZMA2 generally unsuitable for inline compression.

It is noted that, when decompressing data from disk, it is the compressed data format which can be significant (e.g., important), rather than the compression algorithm used. For instance, the DEFLATE format can be produced by zlib, igzip, other software algorithms, or by hardware. Similarly, the LZ4 format can be produced by either LZ4 or LZ4 hc. As a result, there potentially can be more supported algorithms than data formats.

There can be performance considerations with regard to reading compressed data, which has been compressed and stored in the memory component 102 (e.g., in protection groups in the memory component 102). It can be desirable to have the performance of reading compressed data, and decompressing of compressed data, from the memory component 102 to be comparable to the reading of uncompressed data from memory with the expectation that there can be a relatively slight performance degradation due to the decompression of the compressed data. The CMC 122 can manage the compression of data being stored in the memory component 102 (e.g., and associated with and protected by the protection groups (e.g., 114, 116, 118, . . . ), and decompression of compressed data retrieved from the memory component 102 to provide desirable performance of reading compressed data, and decompressing of compressed data, from the memory component 102 such that it can be comparable to the reading of uncompressed data from memory.

It is noted that, the reduced amount of I/O (e.g., due to compressed data) from the memory component 102 can at least partially offset the overhead of the decompression operations to decompress data. In some embodiments, during decompression of data, the CMC 122 can employ a data prefetch from the memory component 102 that can facilitate mitigating the potential cost of decompression of data. In certain embodiments, the CMC 122 can employ a delayed writeback via the write cache (e.g., the coalescer) to facilitate reducing or minimizing any potential impact of inline compression for buffered writes when the load is low. It is noted that relatively high write loads potentially can exhaust write cache space (e.g., maximum size of the coalescer).

It also is noted that decompression of compressed data being read from the memory component 102 only impacts the first time data is being read from the memory component 102 into the L1-logical cache (not shown in FIG. 1), which can be associated with the memory locations (e.g., 104, 106, 108, . . . ) of the memory component 102. After that, the data can be readily available in uncompressed form, and therefore read performance from that point on can be unaffected by the compression of data (e.g., the previous compression of data stored in the memory component 102). In some embodiments, with a drop-behind feature of the system 100 active, a subsequent read request likely can be satisfied by the L2 cache but it still can be desirable to decompress the data again to get the data (e.g., decompressed data) into the L1-logical cache.

Figure 4:
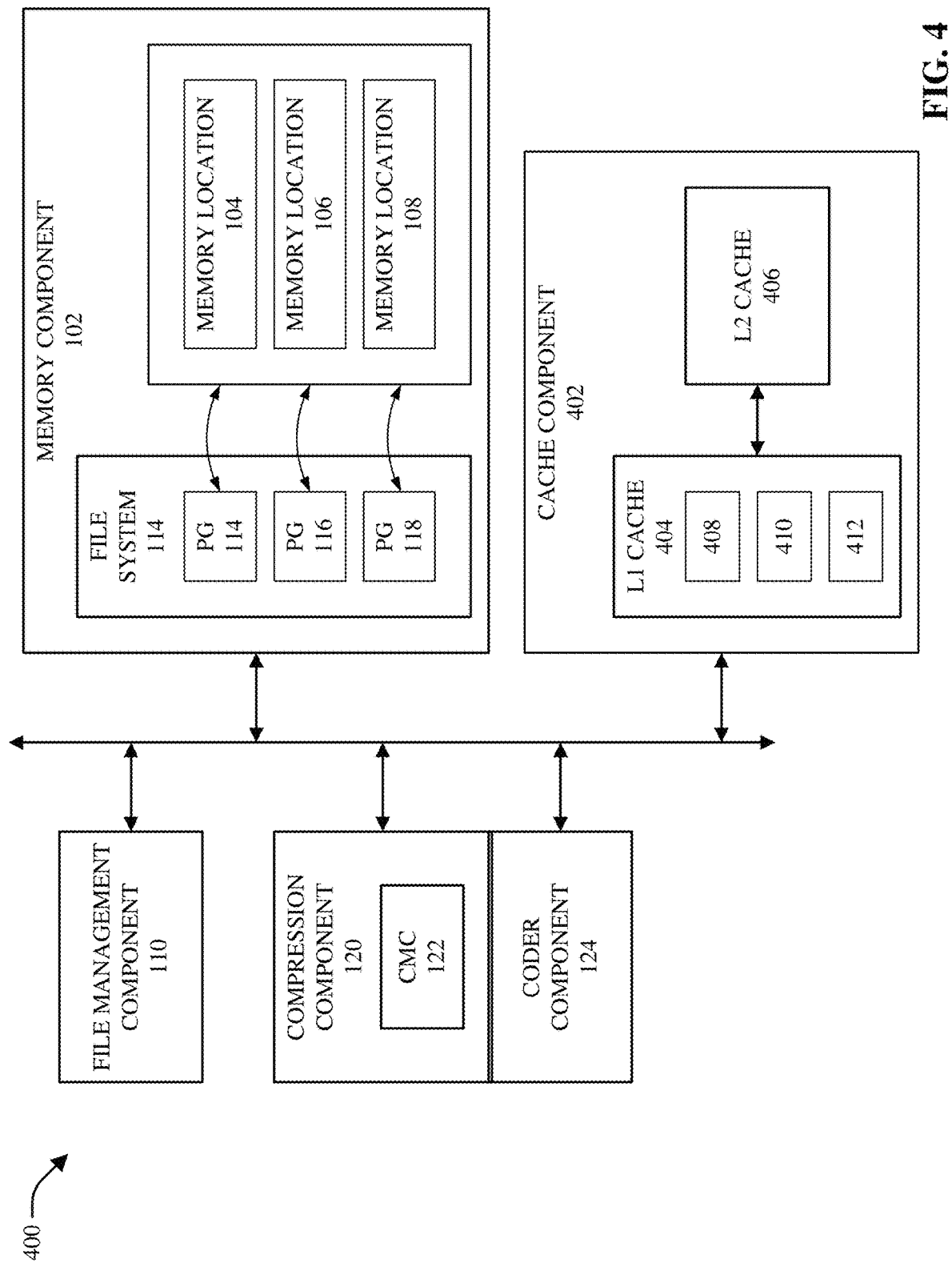
FIG. 4 depicts a block diagram of an example system that can employ caches, wherein a cache can be desirably divided into separate memory address spaces, in accordance with various aspects and embodiments of the disclosed subject matter.

With further regard to caching, referring to FIG. 4 (along with FIG. 1), FIG. 4 depicts a block diagram of an example system 400 that can employ an L1 cache and an L2 cache, wherein the L1 cache can be desirably divided into separate memory address spaces, in accordance with various aspects and embodiments of the disclosed subject matter. The system 400 can comprise the memory component 102, comprising memory locations (e.g., 104, 106, 108, . . . ), the file management component 110, the file system 112, comprising or associated with protection groups (e.g., 114, 116, 118, . . . ), the compression component, and the CMC 122.

The memory component 102, file management component 110, and/or CMC 122 can be associated with (e.g., communicatively connected to) a cache component 402 that can comprise cache memory, which can comprise volatile memory that can be used for data caching purposes. The cache component 402 can comprise an L1 cache 404 and an L2 cache 406. The file management component 110 and/or the CMC 122 can manage the cache component 402, including the L1 cache 404 and the L2 cache 406.

The L1 cache 404 can comprise a set of memory address locations (e.g., memory address spaces) in which information can be stored. In some embodiments, to facilitate supporting compression of data, the L1 cache 404 can be divided into separate subsets of memory address spaces to enable caching of compressed data (e.g., stored or on-disk compressed data) and logical uncompressed data. For example, the L1 cache 404 can be divided into a first subset of memory address spaces 408 that can be utilized to enable the caching of the compressed data and a second subset of memory address spaces 410 that can be utilized to enabling the caching of the logical uncompressed data. For this L1 cache division configuration, the disclosed subject matter (e.g., the CMC 122 and/or file management component 110) can employ or add a bit (e.g., a high bit) to the logical block numbering (LBN) to index the uncompressed L1 cache (e.g., the second subset of memory address spaces 410). The disclosed subject matter (e.g., the CMC 122 and/or file management component 110) also can index the compressed L1 cache (e.g., the first subset of memory addresses 408 of the L1 cache 404) with respect to encoded block numbers (EBNs) associated with compressed data. This indexing of the compressed L1 cache can facilitate performing (e.g., by the compression component 120) decompression and/or compression operations on data (e.g., decompressing compression chunks of data), as more fully described herein. In certain embodiments, the L1 cache 404 can be further divided into a third subset of memory address spaces 412 that can be utilized to cache FEC blocks associated with data.

The file management component 110 and/or the CMC 122 can manage the L1 cache 404 to facilitate enabling data (e.g., uncompressed data) in the second subset of memory address spaces 410 (e.g., data in the uncompressed L1 cache) to be fed from data (e.g., compressed data) in the first subset of memory address spaces 408 (e.g., the compressed L1 cache), which can be fed from memory locations (e.g., 104, 106, and/or 108, . . . ) in the memory component 102 (e.g., fed from disk or other non-volatile memory). One reason for this approach can be because there can be various consumers of the L1 cache 404 that can desire access to both the compressed data (e.g., on-disk data) from the memory component 102 and the logical data. Without compression this can be the same data, but with compression, it can be different content.

For example, reconstruction code utilized by the write engine can desire access to the compressed data (e.g., on-disk data) retrieved from the memory component 102 and stored in the L1 cache 404 (e.g., the first subset of memory address spaces 408) so that data can be reconstructed efficiently without having to decompress it first. Also, other code modules, such as, for example, stripe verification routines, can desire access to the compressed data (e.g., on-disk data), since the stripe verification routines can validate the data against FEC blocks. Users of the L1 cache 404 that can desire logical uncompressed data (e.g., from the second subset of memory address spaces 410) can include the read path for access to file data and various data verification routines that desire (e.g., want) to validate the integrity of file data with CRCs.

Compression can increase the cost of populating the L1 cache 404 from the L2 cache 406, and use of low-latency storage media (e.g., solid state drive (SSD)) can reduce the value of the L2 cache 406. In light of this, cache usage and eviction policies can be considered.

The status quo can be expected to function acceptably for access patterns which access blocks only once (e.g., low temporal locality) or which can be cached well by the client. Repeated access of a single block can suffer, either from a single or multiple initiators. Larger minimum I/O sizes (e.g., due to the compression chunk size) also can decrease the effective cache size if a workload is dominated by small random reads.

In some embodiments, there can be no direct control over the size of L1 cache 404 vs. the L2 cache 406, although the file management component 110 and/or CMC 122 can influence the size of L1 cache 404 vs. the L2 cache 406 indirectly in the system with the following, for example: disabling L1 drop-behind on all-SSD nodes, which can be facilitated by page daemon enhancements to maintain desirable performance of page daemon on high-memory nodes; increase the size of the vnode cache (several settings); and increase the maximum number of data locks that can be cached by a node. In other embodiments, the file management component 110 and/or CMC 122 can have direct control, or at least more direct control, over cache (e.g., 402) usage, for example, via multiple page queues.

With regard to prefetch, in certain embodiments, the prefetch can be configured to be able to read in compressed data. Since reading part of a compressed chunk can result in the entire compression chunk being cached in the cache component 402, it can effectively mean that prefetch requests can be rounded to compression chunk boundaries. The disclosed subject matter can configure prefetch requests to do this rounding of prefetch requests explicitly to prevent redundant prefetch requests. A prefetch request typically will not be complete until the uncompressed data is available in the cache component 402, so it can be desirable for the callback used for prefetch requests to perform the decompression of the compressed data.

In accordance with various embodiments, the disclosed subject matter can utilize shadow stores. Shadow stores can be file system containers that can allow data to be stored in a sharable manner. As such, files in the file system 112 can contain both physical data and pointers, or references, to shared blocks in shadow stores. A shadow store can be, for example, a special file that typically is not directly accessible in the file system namespace. The shadow store can be indirectly referenced by or in other files at particular addresses. A shadow reference or shadow store reference can be a reference from a regular file block associated with a regular file to a shadow store block associated with a shadow store. The system, including the file system 112, file management component 110, and CMC 122, generally can treat shadow stores like any other regular file, and shadow stores can support compression of data.

In some embodiments, the compression component 120 (e.g., as managed by the CMC 122) can compress existing or new shadow stores like any other existing or new regular file. Existing shadow references from files can continue to work since following a shadow reference can be the same as reading data from a file. In other embodiments, the compression component 120 (e.g., as managed by the CMC 122) can compress new shadow stores, or new data written to shadow stores, like any other new regular file or data (e.g., new shadow stores or new data written to shadow stores can be compressed by the compression component 120), however, existing shadow stores will not be converted to a compressed state (e.g., existing shadow stores will not be compressed). In certain embodiments, the CMC 122 can control compression processes associated with shadow stores to allow pre-existing shadow stores to be compressed (e.g., by the compression component 120) based at least in part on a per-file compression policy utilizing a post-process compression operation.

Shadow store reference counts can remain on the logical blocks and not the compressed blocks. The CMC 122 and/or file management component 110 can manage the compression chunks to have the compression chunks not be freed from shadow stores until, with regard to a compression chunk, all reference counts for all logical blocks in that compression chunk are free from external references.

It can be desirable (e.g., suitable or necessary) for the compression policy of a file and the shadow store it references to match each other. The CMC 122 can manage compression operations such that any files that have a compression policy of 'no compression' are not to be deduped or cloned to shadow stores that compress data, and vice versa. In some embodiments, if the compression policy of a file changes, the file management component 110 or CMC 122 can move the file to another shadow store with the same new compression policy.

In certain embodiments, a file can be truncated. If a file is truncated so that the new size is offset into a compression chunk of data, the compression component 120 (e.g., as managed by the CMC 122) can decompress the compression chunk, trim the desired portion of the data from the decompressed data, and recompress the remaining data to form a new (e.g., truncated) compressed chunk, otherwise memory space (e.g., disk space) cannot be released and/or data can undesirably be exposed beyond the end of file. The CMC 122, employing the write engine, can utilize a truncate operation to facilitate handling such file or data truncation.

The disclosed subject matter also can employ other types of operations, such as hole punching operations. Hole punching can be a dataless operation. The file management component 110 or another component (e.g., CMC 122) can handle such hole punching in the write zero operation (e.g., a write zero operation performed by the write engine), for example. This operation can be used to remove the contribution to FEC by data blocks in the range to be punched. The range can be filled with non data type extents such as shadow references, for example. This can be desirable for dedupe to function properly.

In accordance with various embodiments, blocks can be preallocated. For example, a user can request to preallocate blocks to facilitate improving performance or to reserve space resources. By preallocating blocks, the chances of getting a desirable (e.g., good, suitable, or acceptable) on-disk layout can be improved and the issue of having to allocate blocks (including FEC blocks) in the write path can be removed, which can reduce latency and avoid potential no space (e.g., ENOSPC) and disk quota (e.g., EDQUOT) errors.

For a number of reasons, it sometimes can be difficult to determine whether a user has preallocated blocks and/or whether a particular block has been preallocated. For example, after a write to previously preallocated blocks has been performed, the preallocation flag from the extent can be lost or removed, and from that point on, such blocks can look like any other written block. As another example, preallocation also can be used internally to the file system 112 by the coalescer and/or the file management component 110 in order to improve streaming read performance via the better on-disk layout. This can make it difficult to distinguish whether a block had at some point been preallocated by the user (e.g., with posix fallocate(2)).

With regard to preallocated blocks, the disclosed subject matter (e.g., the CMC 122 and/or compression component 120) can be configured to not compress data being written to preallocated blocks of the memory component 102. In other embodiments, the disclosed subject matter (e.g., the coalescer (e.g., the write cache, which can be an intelligent write cache), the CMC 122, and/or the file management component 110) can be configured to not preallocate blocks for which a determination has been made (e.g., by the coalescer, the CMC 122, and/or the file management component 110) that such blocks are going to be utilized, or are expected to be utilized, to compress data.

In certain embodiments, the disclosed subject matter can desirably represent compressed memory addresses in logical space. When data is compressed, it can take up less space in the memory component 102 (e.g., on disk) with the space saved being converted to sparse regions. When reading a file, it can be desirable to know that the sparse space created by compression is not really sparse, but in fact does contain data that can be read.

To address this issue, the disclosed subject matter can represent the logical space of a file differently to what is stored physically on disk. In some embodiments, the file management component 110 and/or CMC 122 can create special block address (baddr) extents that span the logical size of the compression chunk. A special baddr can be set to a specific value (as can be done for sparse and ditto baddrs) that can indicate that the logical block is associated with (e.g., is backed by) compressed data (e.g., compression chunk of data) in an associated physical block(s). The special baddr can have a corresponding address type that can have a compressed data indicator value to indicate compressed data is associated with the logical block.

The special baddr can prevent the compressed extent from being addressed directly. The read path can perform the desired operations to translate a read request for a compressed extent into a request for the actual compressed data and decompress the data before returning it, as more fully described herein. For instance, the CMC 122 and/or the file management component can facilitate managing a read request and read operations to translate the read request for the compressed extent into a request for the actual compressed data and can decompress the data before the read path returns the data to the requestor.

In certain embodiments, the CMC 122 and/or file management component 110 can employ code to utilize the special compression baddr addresses that can represent logical data at particular logical addresses, wherein the logical data can be associated with compressed data in the protection group. Some areas of code (e.g., certain code utilized by the write engine) that examine the extent map can desire to know the actual on-disk layout and not the logical layout. The disclosed subject matter can provide such support as the disclosed subject matter can enable such areas of code (e.g., certain code utilized by the write engine) to know the actual on-disk layout, rather than the logical layout, wherein, for example, these users (e.g., such areas of code) can use a particular interface to access and obtain information regarding the actual on-disk layout, wherein the particular interface can iterate physical extents. For instance, the CMC 122 can employ a desired function that can be configured to compute physical blocks based at least in part on the physical extents in a file, and also can compute logical blocks based at least in part on the logical extents in the file.

With further regard to protection groups that can contain compressed data, the disclosed subject matter can configure or create protection groups that are able to represent compressed data. The disclosed subject matter (e.g., employing the CMC 122) can create compressed protection groups that can look relatively similar to normal protection groups, but compressed protection groups can include a logical overlay that can redirect references to compression chunks of data.

Each protection group (e.g., 114, 116, or 118, . . . ) can represent the same amount of logical data whether or not it is compressed, but depending on compression, can utilize less physical space. The reason for this can be because the disclosed subject matter can tie the protection groups to the logical address space of the file, and the disclosed subject matter can keep the implementation desirably less complex if, for example, the LBN mappings have a direct 1:1 relationship. Having protection groups with a bounded size (e.g., no larger than 2 mebibyte (MiB) logical) also can enable the disclosed subject matter to take bounded data locks, which can be desirable (e.g., important) for files with concurrent accessors.

If, for any reason, it is desired to store a compression chunk in the memory component 102 (e.g., on disk) in uncompressed form, the disclosed subject matter can guarantee to have the logical space available. Each compression chunk can start at the same logical block offset whether it is compressed or not.

In accordance with various embodiments, the disclosed subject matter (e.g., employing the CMC 122) can create compressed protection groups that can comprise the following attributes:

a physical block map that can represent on-disk data, which can be an addr extent vector;

a compression chunk map, which can be a vector of compression chunk entries, wherein each entry can describe where in the physical map a compression chunk can be found and how to decode it;

a logical block map, which can be a layer of indirection allowing either "pass-through" direct references to addresses in the physical map or references to the chunk map;

CRCs for all of logical data, data on disk, and FEC blocks; and an optional bitmap of incompressible blocks, wherein, if compression on a chunk of data fails, it can set the incompressible bit for all blocks in the chunk of data. The disclosed subject matter (e.g., employing the CMC 122) can enable all desired CRCs for logical, physical, and/or compressed and FEC blocks to be stored in the memory component 102 or other desired memory (e.g., data store). Such storage and management of CRCs can allow the CMC 122, file management component 110, or other system component to perform integrity checks on data when the CMC 122, file management component 110, or other system component performs operations on physical data without operating on the associated logical data. For example, such storage and management of CRCs can enable the CMC 122, file management component 110, or other system component to perform (e.g., utilizing CRCs) integrity checks on data (e.g., compressed data) to verify storage media integrity or to move blocks of data within the file system 112 without the compression component 120 (and associated CMC 122) having to decompress and recompress the data.

Figure 5:
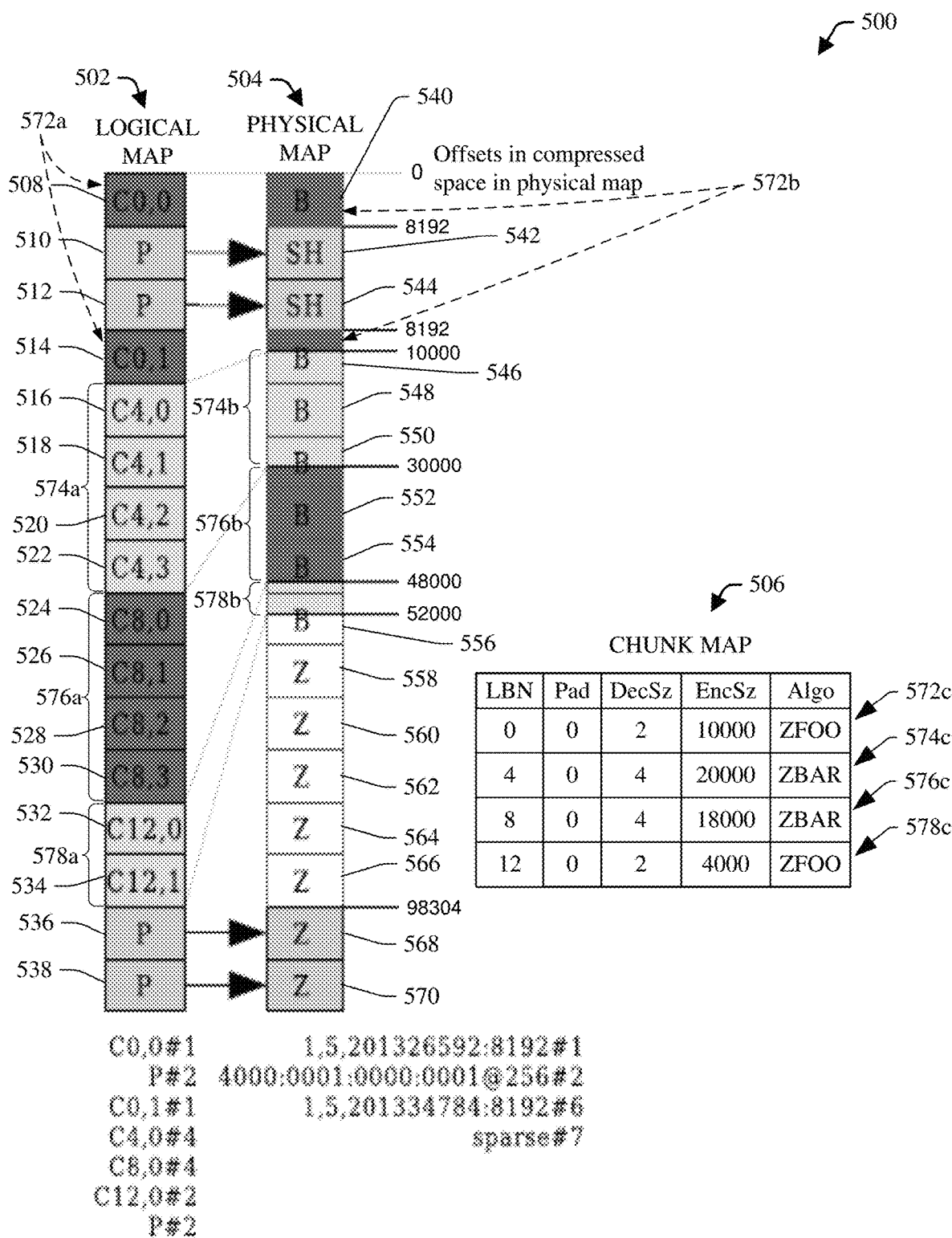
FIG. 5 depicts a diagram of example maps associated with a protection group, the maps comprising a logical map, a physical map, and a chunk map associated with the protection group, in accordance with various aspects and embodiments of the disclosed subject matter.

Referring to FIG. 5 (along with FIGS. 1 and 4), FIG. 5 depicts a diagram of example maps 500 associated with a protection group, the maps comprising a logical map 502 (e.g., logical extent map), a physical map 504 (e.g., physical extent map), and a chunk map 506 associated with the protection group, in accordance with various aspects and embodiments of the disclosed subject matter. The example maps 500 can illustrate how a single cluster with some shadow references and some sparse blocks can be compressed by the compression component 120 (e.g., as managed by the CMC 122) in four chunks of data. In the example maps 500, B can mean baddr; CX,Y can mean compression chunk starting at logical block number (LBN) X, with an offset Y; P can mean pass-through; SH can mean shadow reference; and Z can mean sparse block.

In accordance with the example embodiment of the example maps 500, the logical map 502 can describe how compressed blocks can be found in physical space via the chunk map 506, wherein, for example, C0,1 (508) can represent the logical block at offset 1 in the chunk (e.g., chunk of data) starting at LBN 0. The chunk map 506 can describe where in the compressed portion of the physical space the chunk can be located. As shown in the logical map 502, the logical blocks can comprise logical blocks 508, 510, 512, 514, 516, 518, 520, 522, 524, 526, 528, 530, 532, 534, 536, and 538. As depicted by the physical map 504, the physical blocks can comprise physical blocks 540, 542, 544, 546, 548, 550, 552, 554, 556, 558, 560, 562, 564, 566, 568, and 570. Physical blocks 540, 546, 548, 550, 552, 554, 556, 558, 560, 562, 564, and 566 can represent the compressed portion of the physical space (with relevant offset values in the compressed space counted to the right of the blocks in FIG. 5) and can form one contiguous space (or one per cluster) which can bypass the physical blocks, such as physical block 542 and physical block 544, backing pass-through references, such as, for example, logical block 510 and logical block 512. The format employed for storing chunks of data (e.g., compressed chunks of data), and the generating, utilizing, and managing of the maps 500, by the CMC 122 can allow for the packing of chunks, even across clusters, but does not require chunks to be packed.

As can be observed from the example maps 500, the logical map 502 can be associated with (e.g., mapped or linked to) the physical map 504 and the chunk map 506, and vice versa. The example maps 500, including the exemplary information therein, can illustrate various aspects and features of the disclosed subject matter. For instance, it can be observed that, in the logical map 502, a first compression chunk 572a (C0,0 and C0,1) can comprise logical block 508 (C0,0) and logical block 514 (C0,1), wherein the logical block 508 and logical block 514 can be separated by pass-through (P) logical blocks 510 and 512. The logical block 508 can have an offset of 0 in the logical space, and the logical block 514 can have an offset of 1 in the logical space.

In the physical map 504, it can be seen that the data for the first compression chunk 572a (in the logical space) has been compressed to form the first compression chunk 572b (in the physical space), wherein the first compression chunk 572b can take up all of physical block 540 (e.g., a baddr (B) block) with an offset (e.g., offset in compressed space in the physical map 504) of 0 (e.g., memory space 0), and taking up memory space from 0 to memory space 8192, and part of block 546, wherein the offset for block 546 can be 8192 and the compressed data can be in memory spaces from 8192 to 10000. As also can be seen in the logical map 502 and the physical map 504, the pass-through blocks 510 and 512 can pass directly through to the associated shadow reference (SH) blocks 542 and 544 in the physical map 504. Thus, as can be seen with regard to the first compression chunk 572b (in the physical space), the physical blocks 540 and 546, which can represent a compressed portion of the physical space, can form one contiguous space that can bypass the physical blocks 542 and 544 backing pass-through references. Further, as can be observed with all of the compression chunks (in the physical space), the physical blocks, which can represent a compressed portion of the physical space, can form one contiguous space that can bypass other physical blocks that are backing pass-through references.

The chunk map 506 can comprise corresponding information relating to the first compression chunk (e.g., 572a in the logical space, and 572b in the physical space) with respect to the logical map 502 and physical map 504. For instance, the chunk map 506 can comprise a first set of entries 572c associated with the first compression chunk (e.g., 572a, 572b). The first set of entries 572c can indicate that the LBN is 0, the pad is 0, the decoded size (DecSz) of the chunk (e.g., 572a, 572b) can be 2 blocks, the encoded size (EncSz) of the chunk (e.g., 572a, 572b) can be 10000 memory spaces, and the compression algorithm (Algo) used to compress the data in chunk (e.g., 572a, 572b) can be ZFOO.

A second compression chunk 574a (in the logical space) can comprise four logical blocks, C4,0 (516), C4,1 (518), C4,2 (520), and C4,3 (522), as can be observed in the logical map 502. In the logical space, the second compression chunk 574a can start at logical block 4, wherein logical block 516 (C4,0) can have an offset of 0, logical block 518 (C4,1) can have an offset of 1, logical block 520 (C4,2) can have an offset of 2, and logical block 522 (C4,3) can have an offset of 3.

In the physical map 504, it can be seen that the data for the second compression chunk 574a (in the logical space) has been compressed to form the second compression chunk 574b (in the physical space), wherein the second compression chunk 574b can comprise part of (e.g. the remainder of) physical block 546, starting at offset 10000 (from where the first compression chunk 572b left off in the physical space), all of physical block 548, and part of physical block 550, up to memory space 30000.

In the chunk map 506 with regard to the second compression chunk (e.g., 574a in the logical space, and 574b in the physical space), the chunk map 506 can comprise corresponding information relating to the second compression chunk (e.g., 574a, 574b) with respect to the logical map 502 and physical map 504. For instance, the chunk map 506 can comprise a second set of entries 574c associated with the second compression chunk (e.g., 574a, 574b). The second set of entries 574c can indicate that the LBN for the chunk (e.g., 574a, 574b) is 4, the pad is 0, the decoded size of the chunk (e.g., 574a, 574b) can be 4 blocks, the encoded size of the chunk (e.g., 574a, 574b) can be 20000 memory spaces (e.g., spanning from memory space 10000 to memory space 30000), and the compression algorithm used to compress the data in chunk (e.g., 574a, 574b) can be ZBAR.

A third compression chunk 576a (in the logical space) can comprise four logical blocks, C8,0 (524), C8,1 (526), C8,2 (528), and C8,3 (530), as can be seen in the logical map 502. In the logical space, the third compression chunk 576a can start at logical block 8, wherein logical block 524 (C8,0) can have an offset of 0, logical block 526 (C8,1) can have an offset of 1, logical block 528 (C8,2) can have an offset of 2, and logical block 530 (C8,3) can have an offset of 3.

In the physical map 504, it can be observed that the data for the third compression chunk 576a (in the logical space) has been compressed to form the third compression chunk 576b (in the physical space), wherein the third compression chunk 576b can comprise part of (e.g. the remainder of) physical block 550, starting at offset 30000 (from where the second compression chunk 574b left off in the physical space), all of physical block 552, and part of physical block 554, up to memory space 48000.

In the chunk map 506 with regard to the third compression chunk (e.g., 576a in the logical space, and 576b in the physical space), the chunk map 506 can comprise corresponding information relating to the third compression chunk (e.g., 576a, 576b) with respect to the logical map 502 and physical map 504. For example, the chunk map 506 can comprise a third set of entries 576c associated with the third compression chunk (e.g., 576a, 576b). The third set of entries 576c can indicate that the LBN for the chunk (e.g., 576a, 576b) is 8, the pad is 0, the decoded size of the chunk (e.g., 576a, 576b) can be 4 blocks, the encoded size of the chunk (e.g., 576a, 576b) can be 18000 memory spaces (e.g., spanning from memory space 30000 to memory space 48000), and the compression algorithm used to compress the data in chunk (e.g., 576a, 576b) can be ZBAR.

A fourth compression chunk 578a (in the logical space) can comprise two logical blocks, C12,0 (532) and C12,1 (534), as can be observed in the logical map 502. In the logical space, the fourth compression chunk 578a can start at logical block 12, wherein logical block 532 (C12,0) can have an offset of 0 and logical block 534 (C12,1) can have an offset of 1.

In the physical map 504, it can be seen that the data for the fourth compression chunk 578a (in the logical space) has been compressed to form the fourth compression chunk 578b (in the physical space), wherein the fourth compression chunk 578b can comprise part of (e.g. the remainder of) physical block 554, starting at offset 48000 (from where the third compression chunk 576b left off in the physical space), and part of physical block 556, up to memory space 52000.

In the chunk map 506 with regard to the fourth compression chunk (e.g., 578a in the logical space, and 578b in the physical space), the chunk map 506 can comprise corresponding information relating to the fourth compression chunk (e.g., 578a, 578b) with respect to the logical map 502 and physical map 504. For example, the chunk map 506 can comprise a fourth set of entries 578c associated with the fourth compression chunk (e.g., 578a, 578b). The fourth set of entries 578c can indicate that the LBN for the chunk (e.g., 578a, 578b) is 12, the pad is 0, the decoded size of the chunk (e.g., 578a, 578b) can be 2 blocks, the encoded size of the chunk (e.g., 578a, 578b) can be 4000 memory spaces (e.g., spanning from memory space 48000 to memory space 52000), and the compression algorithm used to compress the data in chunk (e.g., 578a, 578b) can be ZFOO.

As also can be observed from the example maps 500, in particular, the physical map 504, the remainder of physical block 556, beginning at offset 52000, can be a sparse region, and physical blocks 558, 560, 562, 564, and 566 can be sparse blocks (e.g., sparse regions), wherein physical block 566 can end at memory space 98304. The sparse region of physical block 556, and the sparse blocks (e.g., physical blocks 558, 560, 562, 564, and 566) can be the result of the memory space saved due to the compressing of the data associated with the compression chunks (e.g., 572a, 572b; 574a, 574b; 576a, 576b; and 578a, 578b), for example. As further can be observed from the example maps 500, the logical map 502 can comprise pass-through logical blocks 536 and 538, wherein the pass-through logical blocks 536 and 538 can pass directly through to the associated physical blocks 568 and 570, respectively, in the physical map 504, wherein the physical blocks 568 and 570 can be sparse blocks. The offset (in the compressed space in the physical map 504) for the physical block 568 can be 98304, which is where physical block 566 ended.

With further regard to chunk maps (e.g., 506), the CMC 122 can generate and manage the chunk map (e.g., 506), wherein the chunk map can describe each encoded chunk in the protection group (e.g., protection group 114). Each chunk can comprise the following data:

a chunk ID (e.g., start LBN), which can be referenced by the logical map (e.g., 502), wherein the chunk ID can be stored implicitly for each chunk map entry via the coordinate entry in the logical map (e.g., the LBN of the logical map entry less its offset value);

a chunk decoded size in blocks (e.g., 4 bit (b) addresses 128 kibibyte (KiB));

a chunk encoded size in bytes (e.g., 17 b addresses 128 KiB);

a chunk packed (e.g., 1 b), whether this chunk is packed into the trailing space of the same block used by the last chunk;

a chunk offset in the compressed blocks in the physical map (e.g., 504), wherein the chunk offset can be stored implicitly as 0 for the first chunk, and for any subsequent chunks, can be determined and stored (e.g., by the CMC 122) as the offset of the previous chunk, plus the encoded size of the previous chunk, rounded up to block size if the current chunk is not packed; when cross-cluster packing is enabled (which can be tracked with a bit in the protection group), this chunk offset can be from the beginning of all compressed block space in the protection group, otherwise the chunk offset can be from the beginning of the compressed block space only within the cluster; the compressed blocks in the physical map (e.g., 504) can form one logically contiguous space for this purpose (e.g., per protection group or per cluster), bypassing blocks in the physical map which back pass-through references; and chunk encoding (e.g., 6 b), which can represent the compression algorithm used for encoding and decoding.

In some embodiments, this can add up to 28 bits of data per compression chunk entry. In other embodiments, another desired amount of bits per data (e.g., less than 28 bits or more than 28 bits) can be employed per compression chunk entry. For example, if desired, less than 28 bits per compression chunk entry can be utilized by reducing the granularity of the chunk encoded size (e.g., a 16-byte alignment can save 4 bits to reduce the total number of bits of data per compression chunk entry to 24 bits).

In a logical map (e.g., 502), a logical map entry can be an extent of either pass-through or compression chunk references. The CMC 122 can create and manage logical map entries of a logical map (e.g., 502), wherein a logical map entry can have a desired number of bits to encode the extent length, another desired number of bits to encode a reference, and other bits used for other purposes or reserved for future use. For example, the CMC 122 can utilize 8 bits to encode the extent length, 6 bits to encode a reference, and/or a specified number of bits for other purposes or future use.

With regard to pass-through references, a pass-through reference (e.g., pass-through reference 534, or pass-through reference 536) can make a direct reference to the physical map 504 (e.g., a corresponding entry in the physical map 504). The CMC 122 can create and manage non-local block types (e.g., ditto, shadow, or sparse, etc.) to have such non-local block types use a generic pass through mechanism rather than having individual entry types.

In some embodiments, the CMC 122 will not reserve space in the logical map (e.g., 502) to enable a pass-through reference to be offset from the location in the logical map (e.g., 502) in order to rearrange the allocated blocks in the physical map (e.g., 504). In other embodiments, the CMC 122 can allow a pass-through reference to be offset from the location in the logical map (e.g., 502) in order to rearrange the allocated blocks in the physical map (e.g., 504) in turn to minimize the number of FEC blocks utilize. For example, a bit can be utilized for each protection group (e.g., protection group 114) that can represent an alternate mapping scheme that allows pass-through references to utilize such offsets, and can indicate that such alternate mapping scheme is being used, for the maps 500.

Regarding compression chunk references, a logical map entry (e.g., logical map entry 548 relating to a compression chunk), which can be a reference to a compression chunk of data, can make a reference to a compression chunk by referring to the chunk by its start LBN (e.g., X) together with a block offset (e.g., Y) into the decoded chunk. The CMC 122 can derive the chunk start LBN from the logical map entry in the logical map (e.g., 502) by subtracting the offset (e.g., Y) stored in the logical map entry from its own LBN (which in turn can come from its position in the logical map (e.g., 502) plus the start LBN of the protection group (e.g., protection group 114)).

During parsing of the logical map (e.g., 502), a list of chunk start LBNs can thus be evolved or determined. The CMC 122 can utilize the list of chunk start LBNs to assign start LBNs to chunk map entries as they are parsed. The length of the list of chunk start LBNs also can provide the chunk map size. In some embodiments, the LBNs are not explicitly stored on disk in the memory component 102.

In certain embodiments, the CMC 122 can facilitate encoding the offset as a value having a desired number of bits (e.g., a 4-bit number). One purpose of the offset can be to allow a region which is divided in logical space (e.g. by a sparse or shadow block) still to be compressed as a single chunk. Another potential use of the offset can be to allow for a scheme where a chunk can become partially unreferenced.

The disclosed subject matter, employing the CMC 122, can create the memory (e.g., on-disk) representation of a compressed protection group to look similar to the on-disk representation for protection groups that do not include compressed data, except that, for example, the memory representation of the compressed protection group can have additional attributes encoded. In considering what can be desired for the encoding, the disclosed subject matter can take into account what data, including data particularly relating to compressed protection groups, is desired to be stored in the memory component 102 (e.g., on disk). The disclosed subject matter, employing the CMC 122, can take into account, for example, the bits of per-PG state (e.g., four or five bits of per-PG state) that can be desirable (but which can be optional):

whether the PG has compressed extents (which potentially can be implied by the physical extents);
whether cross-cluster packing is or can be enabled, and/or
whether a more complex LBN mapping scheme is being utilized in order to reorder compression chunks into the beginnings of physical clusters and level out block usage across clusters, all in order to reduce or minimize FEC block usage.

The disclosed subject matter, employing the CMC 122, also can take into account the logical map (e.g., 502), the chunk map (e.g., 506), and the CRCs associated with a protection group (e.g., protection group 114) in determining and creating the memory representation of a compressed protection group.

The disclosed subject matter, employing the CMC 122, can provide support for encoding and decoding desired attributes, including attributes associated with compressed protection groups, the logical map (e.g., 502) and the chunk map (e.g., 506), based at least in part on presence of compressed extents. In certain embodiments, the disclosed subject matter can reserve bits for other purposes or future use. In other embodiments, the disclosed subject matter can employ a version scheme for the on-disk representation of a protection group that can allow for additional header space for attributes associated with protection groups, including attributes associated with compressed protection groups, and further can enable desirable modifications or upgrades.

In some embodiments, the disclosed subject matter (e.g., the CMC 122) can utilize a bit (e.g., 1 bit out of 5 available reserve bits) to identify an extent as the physical storage for a compressed logical region, wherein the bit can reside within the extent. If this were done, the presence of any compressed extents in the physical map (e.g., 504) (which can be encoded in an on-disk representation of a protection group) can imply a compressed protection group, and can be used (e.g., by the CMC 122 and/or file management component 110) to identify a protection group as compressed protection group for parsing. The disclosed subject matter, employing the CMC 122, can append additional attributes associated with compression to the encoded form.

In other embodiments, the disclosed subject matter, employing the CMC 122, can utilize available reserved space in the header of an on-disk representation of a protection group to identify compressed protection groups. There can be a limited (e.g., relatively small) amount of reserved space available in the header of such on-disk representation of a protection group that can be used, if desired, to identify compressed protection groups. For instance, that reserved space, which can comprise defined number of bits (e.g., 8 bits), can include 3 bits to represent the dynamic IDI CRC algorithm and 5 bits that can be reserved. In such embodiments, the disclosed subject matter can utilize one or more of the reserved bits to identify compressed protection groups.

For example, a desirable (e.g., good or suitable) use of these reserve bits by the disclosed subject matter (e.g., CMC 122) can be to introduce a version field so that the on-disk representation of a protection group can be upgraded more easily. Four bits can be taken for the version field and one bit can be taken to represent that the protection group has an additional header before the start of the physical extents. The CMC 122 (or other component of the system) can utilize the additional header to store the several bits of state referenced above.

A typical layout of an on-disk representation of a protection group (without regard to compressed protection groups) can be, in order:

a type field that can relate to an on-disk representation of a protection group (e.g., there can be 1 byte for 5 extant types);
protection level (e.g., there can be 2 bytes);
CRC type (e.g., there can be 1 byte, with the bits used as described herein);
variable length vector of extents (e.g., the physical block map (e.g., 504)), wherein the expected number of physical blocks can be derived (e.g., by the file management component 110 and/or CMC 122) from the protection level, and extents can be parsed until the sum of the number of blocks in the parsed extents matches the expected block count; and
variable length vector of CRCs of physical blocks, wherein the expected size can be derived (e.g., by the file management component 110 and/or CMC 122) from the contents of the physical block map.

To facilitate the use of compressed protection groups, the disclosed subject matter, employing the CMC 122, can append the following features or characteristics (e.g., as PG metadata) to the above to produce an enhanced layout of an on-disk representation of a protection group:

variable length logical map (e.g., logical map 502), wherein, as with the physical map (e.g., 504), the expected block count can be derived (e.g., by the file management component 110 and/or CMC 122) from the protection level;
variable length chunk map (e.g., chunk map 506), wherein the number of chunk map entries of the chunk map can match the number of chunks referenced from the logical map (e.g., 502); and
variable length vector of CRCs of compressed logical blocks, wherein the expected size can be the number of logical blocks of a protection group (e.g., protection group 114) which were compressed.

The disclosed subject matter, employing the CMC 122, can encode logical map entries for the logical map (e.g., 502) and chunk map entries for the chunk map (e.g., 506), as desired, to include the respective information regarding the logical map entries and the chunk map entries. For example, the CMC 122 can encode a logical map entry that includes information regarding the logical extent (e.g., logical extent is compressed or pass-through), an offset of the block in chunk decoded space, an extent block length, and/or other information. The CMC 122 can encode a chunk map entry that comprises information regarding, for example, a decoded size of the data in blocks, an encoded size of the data in bytes, an offset padded to the block boundary, a compression algorithm used to compress the data, and/or other information desired by a decoder (e.g., decoder component of the coder component 124) or compression component 120 (e.g., which can be associated with the coder component 124).

In still other embodiments, the disclosed subject matter can employ a distinct value in a version type field that can relate to an on-disk representation of a protection group (e.g., protection group 114) that can allow upfront identification of a protection group as compressed (e.g., as comprising compressed data). As with other embodiments disclosed herein, this can enable the system (e.g., CMC 122, file management component 110, . . . ) to parse non-compressed protection groups and compressed protection groups unambiguously. Employing such distinct value in this version type field also can make it relatively easier to implement in-memory to on-disk transformations, and vice versa.

The CMC 122, file management component 110, and/or another system component can store information regarding protection groups, including compressed protection groups, as btree leaf records for a btree, wherein the on-disk representation of the protection groups can satisfy the constraints of the btree representation. For example, the memory (e.g., on-disk) representation of the PG metadata for protection groups (e.g., 114, 116, 118, . . . ) can be structured to be in accordance with the data space available for PG metadata in the btree representation.

The compression scheme for protection groups of the disclosed subject matter can support compression blocks up to a desired defined size. In some embodiments, the compression scheme for protection groups of the disclosed subject matter can support compression blocks sizes up to 128 KiB, although, in other embodiments, the compression scheme for protection groups of the disclosed subject matter can support compression blocks sizes that can be greater than 128 KiB. The compression block size can be a parameter to the encoder (e.g., encoder component of a coder component 124, which can be associated with compression component 120). The file system 112 can employ a slightly different concept, a compression chunk size. The compression chunk size can be some desired number of file system logical blocks up to a defined maximum number (e.g., 16 logical blocks). In some embodiments, this can be the minimum unit for a read or write operation. It is noted that the compression block size and chunk size normally can be equal, however, since, in some embodiments, the minimum chunk size can be one 8-KiB block, it can be possible for a chunk to represent multiple compression blocks.

The file system of the disclosed subject matter, employing the CMC 122, can allow compression chunks to cross cluster boundaries in physical space. In certain embodiments, the file system of the disclosed subject matter can be configured to not have compression chunks cross cluster boundaries in logical space. With regard to compression chunks crossing cluster boundaries in physical space, the CMC 122 or other system component can utilize a width-changing restripe to repack compressed chunks, and desirably a compression chunk does not have to be fully decompressed and recompressed in order for a compression chunk to be able to cross cluster boundaries in physical space. In some embodiments, the CMC 122 can set a bit in the protection group (e.g., protection group 114) that can reflect whether a compression chunk(s) is packed across clusters. Cross-cluster packing can allow for enhanced compression ratios, wherein, for example, a compression ratio of up to 256:1 can be achieved.

In some embodiments, the disclosed subject matter can be implemented without enabling the rearrangement of the layout of pass-through addresses and leveling the physical usage of compression chunks across clusters, for example, to achieve a desired reduction or minimization of FEC usage. In other embodiments, the disclosed subject matter, employing the CMC 122, can enable rearrangement of the layout of pass-through addresses and leveling the physical usage of compression chunks across clusters to achieve a desired reduction or minimization of FEC usage. The disclosed subject matter can add cross-cluster packing and FEC leveling together in order to enhance or maximize storage efficiency.

As disclosed, the compression component 120 (e.g., as managed by the CMC 122) can compress different chunks of data of a file, to generate different compression chunks, using different compression algorithms, wherein the different compression chunks can be stored in a desired protection group (e.g., protection group 114). In some embodiments, the CMC 122 and/or component (e.g., compression component 120) can record the chunk encoding to facilitate enabling different compression chunks in the file to be compressed using different compression algorithms. As compared to merely storing the encoding in the Mode, this feature can be utilized, for example, to support one-pass transcoding (e.g., by the encoder of or associated with compression component 120).

In some embodiments, the CMC 122 or other system component can record the chunk encoding inline in a header in the compressed data, for example, in order to save space in the PG metadata. In other embodiments, the CMC 122 or other system component can record the chunk encoding in the PG metadata. This can enable system components (e.g., CMC 122, compression component 120, and/or file management component 110, . . . ) to know the chunk encoding information before the data is read.

Certain client code, which can use the logical interface to iterate PG blocks and extents, can use the logical map (e.g., 502), can resolve a pass-through address, and can construct a special logical block address that can indicate logical data associated with compressed data in the physical space, as more fully described herein. Other client code, which only uses the physical layout, does not have to examine the logical map (e.g., 502) at all. There are only a few pieces of core code that have to examine the chunk map (e.g., 506), for example, for the read path and the write engine.

The CMC 122 and other system components can support all the attributes. In some embodiments, the CMC 122 and other system components can support and/or manage all fields, except for the incompressible field. In other embodiments, the CMC 122 and other system components can support and/or manage all fields, including the incompressible field with regard to incompressible compression chunks.

The disclosed subject matter, employing the CMC 122, can generate and manage a mapping between the logical space and compressed space, such as described herein. As the mapping can be variable, determining exactly which EBNs store a compression chunk for a given LBN, and vice versa, can be performed (e.g., can only be performed) in the context of a protection group (e.g., protection group 114, 116, or 118). The CMC 122 or other component of the disclosed subject matter can provide a function that can be utilized to map the LBN to the compression chunk descriptor of the compression chunk. The compression chunk descriptor can describe which EBNs store the encoded data, at what offsets the EBNs or encoded data are located, and what encoding (e.g., encoding and/or compression algorithm) was utilized to encode the data. An example representation of a compression chunk descriptor can comprise information that can indicate, specify, or relate to the encoded or remapped block numbers, the logical block numbers represented, the byte size of the compression chunk, a byte offset of the compression chunk in the first EBN, a number of LBNs in the logical block numbers represented, the encoding and/or decoding algorithm(s), and/or other desired information. In certain embodiments, if space efficiency is an issue or for another desired reason, the disclosed subject matter (e.g., CMC 122 or other system component) can generate, utilize, and/or manage bitmaps for the arrays (e.g., mapping of LBN to compression chunk descriptor).

It is noted that, mapping from EBN back to LBN can be more complex. A single EBN can be part of multiple compression chunks due to packing. The disclosed subject matter, utilizing the CMC 122, can determine and enumerate all such compression chunks associated with a single EBN. This can be useful in cases of corruption in order to determine the affected LBNs associated with certain compression chunks.

With further regard to CRCs, as disclosed herein, CRCs can be utilized and associated with protection groups, with particular CRCs being employed for protection groups comprising compressed data. The file management component 110 and/or CMC 122 can generate CRCs for data blocks just before the blocks of data are written to the memory component 102 (e.g., written to disk). As a result, the CRCs are on the data that is written to the memory component 102, which can mean the CRCs can be on the compressed form of the data.

The CMC 122, file management component 110, and/or other system components can utilize data block CRCs in various locations, for example, to verify the content of disk blocks, L1 buffers, and/or data received from other nodes. The checks can be performed at various levels where the data involved may or may not be compressed. For example, the disclosed subject matter can use CRCs for FEC reconstruction, which can be performed on compressed data stored in the memory component 102 (e.g., the on-disk compressed data). The disclosed subject matter also can desire to validate the logical data to ensure its integrity too.

As a result, the CMC 122, file management component 110, and/or other system component can generate CRCs for both the compressed data stored in the memory component 102 and the logical uncompressed data, and can store the CRCs together in the protection group (e.g., protection group 114) associated with such data. The CRC map (e.g., generated and managed by the CMC 122 and/or file management component 110) already can consume a significant portion of the data for each protection group. Adding CRCs for both logical and on-disk data can further increase this usage, however, this can be implemented and supported by the disclosed subject matter, and the count of compressed blocks can be less than the count of logical blocks.

With regard to CRCs associated with compressed data, due in part to the nature of decompression that can be desired to read and process the data from the memory component 102, it can be desirable to validate, and the disclosed subject matter can validate, the integrity of that data before and/or while such data is being consumed. The disclosed subject matter (e.g., the CMC 122 or file management component 110) can employ any of a number of CRC-related techniques and strategies to facilitate such validation of the integrity of data, and can generate and check IDI CRCs for both logical and physical data, as described herein.

In some embodiments, the disclosed subject matter, employing the CMC 122 and file management component 110, can generate, determine, and/or use CRC logical data associated with compressed data in a same or similar way as normally can be performed with regard to data that is not compressed. This can be desirable (e.g., suitable, appropriate, or acceptable) as such an approach can integrate well with the L1 IDI checks and with CRC-based dedupe (e.g., in a form used with regard to uncompressed data). However, such approach potentially can mean processing data twice, processing once for compression or decompression of the data and processing once to determine (e.g., calculate) the CRC. The disclosed subject matter (e.g., the CMC 122 or file management component 110) can perform, arrange performing, and/or facilitate performing the second pass through the data (e.g., second processing of the data to determine the CRC) temporally (e.g., within a defined amount of time of the first pass to compress or decompress the data) to facilitate reducing or minimizing the cost associated with such additional processing (unless such additional processing is not able to be performed temporally).

In other embodiments, if the compression algorithm being utilized has a built-in CRC mechanism, the disclosed subject matter (e.g., the CMC 122 or file management component 110) can use the built-in CRC mechanism to facilitate generating CRCs, or otherwise the disclosed subject matter can checksum the compressed chunk and can add that checksum to a header structure. It is noted that, in the checksum approach, the data also will be processed twice. Most, or all, compression algorithms are capable of producing their own CRCs though. The disclosed subject matter can utilize the CRC built in to the compression algorithm by enabling it, for example, when initializing a compression stream or at another appropriate time. It is noted that this can reduce or minimize additional CPU costs for CRCs over logical data, however, it also can remove some uniformity in file system CRC availability for logical data, which can increase complexity for IDI and for a CRC-based dedupe.

The CRC-related strategy implemented by the disclosed subject matter (e.g., the CMC 122 or file management component 110) can combine the logical data CRC checks with physical data CRC checks before decompression of data. An alternative that can be employed by the disclosed subject matter can be to not check the physical data CRCs unless an error is encountered or discovered in decompression of data. The tradeoff between these two approaches can be happy-path decompression performance versus protection against bugs in the decompressors when they are presented with invalid data. Historically, decompressors have had corruption bugs in such scenarios. Therefore, for more desirable (e.g., best) system integrity, the disclosed subject matter can verify the compressed data integrity before decompression of the data.

In still other embodiments, the disclosed subject matter (e.g., the CMC 122 or file management component 110) can validate just the CRCs on the compressed data blocks before decompressing them, and not check the logical data integrity at all. This can protect the file system 112 from bugs in the decompressor and potentially can offer desirable performance, but does so without guaranteeing logical integrity. In system implementations where stronger logical integrity checks can be desired, this approach can be less suitable than, for example, the other approaches described herein.

It is noted that, when a physical block CRC fails, that can indicate that reconstruction of data from good blocks of data is to be performed by the disclosed subject matter (e.g., the CMC 122 or file management component 110), if such reconstruction can be performed, or, if data reconstruction is not performed or not able to be performed, the disclosed subject matter can indicate an error (e.g., communicate or present an error message) with regard to the failed physical block and associated data. When a logical CRC fails after decompression, but the associated physical CRCs succeed, that can indicate corruption of the compressed chunk (which potentially could have occurred between compression and write, or potentially being due to a decompression bug in the decompressor). In such case when a logical CRC fails after decompression, reconstruction of the data will not be useful, and the disclosed subject matter (e.g., the CMC 122 or file management component 110) can indicate an error has occurred with regard to the failed logical CRC or associated data (e.g., can communicate or present an error message regarding such error).

With regard to FEC protection, the disclosed subject matter (e.g., CMC 122, or encoder or associated compression component 120) can determine (e.g., compute) FEC blocks based at least in part on the compressed data stored in the memory component 102 (e.g., the on-disk compressed data). This approach can be employed so that a restripe operation does have to decompress data in order to recompute FEC blocks. Also, a protection group reconstruction process will not have to decompress data to verify the protection group (e.g., protection group 114). This can prevent or mitigate compression from affecting rebuild times associated with the file system.

In some embodiments, the FEC blocks themselves will not be compressed. It is noted that it is likely that FEC blocks generated from compressed data are incompressible anyway, given the nature of the input data.

With regard to protection group transfers, the disclosed subject matter (e.g., CMC 122 or file management component 110) can utilize a protection group transfer code to transfer ownership of all of the blocks in a protection group (e.g., protection group 114) from one file to another file (or from one snapshot version to another snapshot version). This approach can work whether the protection group (e.g., protection group 114) contains compressed extents or not. Also, the disclosed subject matter can perform a protection group transfer involving a protection group (e.g., protection group 114) associated with compressed data (e.g., protection group that contains compressed extents) without having to decompress the data first or recompressing the data again.

It is noted that it can be desirable (e.g., suitable or needed) for protection group transfer code associated with shadow stores to examine each block in a protection group (e.g., protection group 114) to decide how to construct a replacement protection group for a source file. It can be desirable for the protection group transfer code associated with shadow stores to be able to understand compressed extents and handle them specifically, but the protection group transfer code associated with shadow stores does not have to read the data from those compressed extents. With further regard to protection group transfers associated with shadow stores, in some instances it can be desirable to iterate and examine the logical block addresses during the transfer in order to construct appropriate replacement addresses, which can belong to the source file of the transfer.

In some embodiments, the disclosed subject matter (e.g., CMC 122 or file management component 110) can use file metatree transfers to transfer an entire file metatree from one Mode to another Mode, such as, for example, to copy-on-write (COW) a file that is being truncated to zero length. A file metatree can be an instance of a btree associated with a regular file (e.g., a file containing data) that stores protection groups as tree records. The content of the file metatree is typically not relevant at this stage and the presence of any compressed extents will not prevent such metatree transfer. The disclosed subject matter (e.g., CMC 122 or file management component 110) can desirably COW the Mode compression policy so that the Mode compression policy follows the compressed data in connection with the metatree transfer.

In accordance with various embodiments, the disclosed subject matter (e.g., CMC 122) can employ compression buffer control to facilitate desirable compression and decompression of data. A compression application programming interface (API) typically can desire contiguous virtual memory regions, for both the input and output, and for both compression and decompression. This can mean copying memory between scattered and contiguous regions. The disclosed subject matter (e.g., CMC 122 and/or associated compression component 120) can copy memory between scattered and contiguous memory regions at a layer just above the compression API, wherein such copying likely can be performed in conjunction with certain other operations (e.g., IDI CRC computation) that can benefit from cache locality.

In order to decompress a compression chunk, it can be desired for the desired data (e.g., on-disk data) in the memory component 102 to be present in initiator memory, normally in EBN-indexed L1-on-disk buffers. The data can be found in the cache (e.g., cache component 402) or read from a participant. It can be desirable for all on-disk data from a compression chunk to be present before beginning decompression operations. This can reduce logic complexity and can be desired by decompression algorithms that do not support incremental decompression operations. It can come at the potential expense of latency in some cases and of performing extraneous work by reading and verifying on-disk data not required by the higher level logical operation in cases where the tail of the logical data is not required.

In some embodiments, the disclosed subject matter (e.g., compression component 120 and associated CMC 122) can perform decompression of data in both the write path (or portion thereof) associated with the write engine and in the read path. During decompression, the CMC 122 (or other component, such as the file management component 110) can construct a scatter-gather list representing the compressed data. This list can be backed by L1-on-disk buffers. Even though the compressed data can come from buffers, it may not be well-aligned due to packing of multiple compression chunks into physical blocks. Fortunately, and unlike the compression operations, decompression algorithms typically do not specify or benefit from any particular alignment. As a result, the disclosed subject matter (e.g., compression component 120 and associated CMC 122) can map the buffer pages to form a contiguous virtual memory region. In certain embodiments, the disclosed subject matter can utilize certain mapping optimizations for relatively small compression chunks (particularly those that do not cross 4 KiB page boundaries, but also for those that do not cross block boundaries).

The output memory can come from L1-logical buffers (e.g., of or associated with the L1 cache 404). The disclosed subject matter (e.g., compression component 120 and/or associated CMC 122) can borrow and map their pages. In some cases, the decoded data can be redundant. For instance, the disclosed subject matter potentially can have some, but not all, of the L1-logical buffers for a compression chunk already cached, or some buffers can be about to be completely overwritten. In those cases, the disclosed subject matter (e.g., compression component 120 and/or associated CMC 122) can instead allocate and map temporary pages in order to avoid other unnecessary work (it is noted that a verify check can still be available to check that the decoded data is correct).

The disclosed subject matter (e.g., compression component 120 and/or associated CMC 122) can call the decompression routine with contiguous virtual memory (VM) regions for the input and output. At that point, the disclosed subject matter can hold high level file system locks, such as, for example, logical Mode number (LIN) lock and data locks. In some embodiments, the disclosed subject matter also can hold L1 buffer locks. Afterward, the disclosed subject matter (e.g., compression component 120 and/or associated CMC 122) can discard or tear down any temporary virtual memory mappings created during the decompression process, and can perform IDI verification on the L1-logical buffers.

With regard to compression of data, the disclosed subject matter can perform compression of data in the write engine, and the sources of data can be more disparate (e.g., as compared to decompression of data). For example, the sources of data can be whatever is passed into the write engine via a parameter(s) (e.g., a parameter(s) that can be backed by disparate sources of data, such as a scatter-gather list) overlaid on the buffer data from any blocks which were only partially written. The buffers can be well-aligned, however, the write data usually may not be well-aligned. The write engine (e.g., via the compression component 120 and/or as managed by the CMC 122) can construct a scatter-gather list suitable for consumption by, for example, a specified function that can produce well-aligned data in VM pages as well as CRCs. The disclosed subject matter (e.g., compression component 120 and/or associated CMC 122) can map pages in order to provide contiguous VM for use by the compression function employed by the compression component 120.

There can be a special case for offline compression. In that case, the disclosed subject matter (e.g., compression component 120 and/or associated CMC 122) can perform a "preserving" operation (e.g., an operation that does not make logical changes to a file), and all data can be expected to come from buffers and be well-aligned. In that case, the disclosed subject matter can map the various L1-logical buffer pages into contiguous VM.

The disclosed subject matter (e.g., compression component 120 and/or associated CMC 122) can call the compression function. If the CMC 122 determines that compression of data will not save memory space (e.g., will not save sufficient memory space), in accordance with the defined compression management criteria, the CMC 122 can trigger a fallback path where the data can be written out normally (e.g., without compression) by the compression component 120 or file management component 110, and the CMC 122 can record the blocks of data as being incompressible. If the data is able to be desirably compressed, the compression function (e.g., as utilized by the compression component 120 and managed by the CMC 122) can produce output (e.g., compressed data) into another contiguous VM region. This VM region can be backed by pages that can be allocated just for this purpose (which is to say that these pages will not have been stolen from buffers, as during decompression). After compression, the disclosed subject matter (e.g., compression component 120 and/or associated CMC 122) can discard or tear down any temporary VM mappings created during the compression process.

In some embodiments, the write engine does not write through L1 (e.g., L1 cache 404). As a result, the inputs or outputs of compression do not have to be swapped into L1-logical or L1-on-disk buffers, respectively (in contrast with decompression swapping into L1-logical buffers). This can reduce the complexity of some dependencies associated with the write engine. However, writing through the L1 (e.g., L1 cache 404) can be desirable for performance reasons. Therefore, in certain embodiments, the disclosed subject matter can swap the compression buffers into L1 (preferably at least into L1-logical buffers) in order to enhance system performance (e.g., compression performance) and/or support other features of the disclosed subject matter. Whether or not any pages are swapped into L1 buffers, there can be leftover pages, and the disclosed subject matter can free such leftover pages at the end of the portion of the write path associated with the write engine.

The disclosed subject matter can enhance the write engine, including associated code, to desirably support file system compression. The write engine, including the portion of the write path associated with the write engine, generally can be divided into four main phases:

1. construct COW: whether copy-on-write to a previous snapshot is to be performed can be determined (e.g., by file management component 110), and either a PG transfer can be performed or data can be read from a first snapshot version in preparation for a write to a second snapshot version;
2. layout: for each write operation, the old layout can be parsed and the new layout can be determined (e.g., by file management component 110); this only can determine the protection levels, nodes, and drives to use, it does not actually allocate blocks;
3. plan: for each write operation, the write engine plan can be built (e.g., by file management component 110), wherein the write engine plan can be a directed acyclic graph of commands, expressing their dependencies; and
4. execute: the commands from the plans can be executed in dependency order (e.g., by the file management component 110).

To enhance the write engine, the disclosed subject matter can enhance COW construction, the plan for the write engine, and/or the execution of commands to facilitate desirable file system compression. For instance, the disclosed subject matter can comprise certain commands that can be executed, certain dependencies that can be added to the plan, and COW can be enhanced (e.g., improved or optimized) to avoid recompression cycles, to facilitate desirable file system compression.

In accordance with various embodiments, the disclosed subject matter can employ certain commands, such as a decode (decompress) command, a decode control command, an encode (compress) command, and a pack command, that respectively can support compression and decompression in the write engine. The disclosed subject matter (e.g., compression component 120 and/or CMC 122) can employ the decode (decompress) command to transform data from the compressed encoding (e.g., on-disk encoding), for example, the compressed data as stored in the memory component 102, to the uncompressed logical representation of the data. This decode command can depend, at least in part, on the read or reconstruct of all of the on-disk blocks in a compression chunk. The disclosed subject matter can configure any other commands that depend on read or reconstruct to also depend on the decode, either directly or via a dummy read command. In some embodiments, the disclosed subject matter (e.g., compression component 120 and/or CMC 122) can be enabled to execute this command from an offload queue of or associated with the write engine.

Each decode command can have an associated decode control command. The disclosed subject matter (e.g., CMC 122) can utilize the decode control command, for example, to allow decompression and reads of on-disk data to be bypassed in cases where all of the desired (e.g., necessary or wanted) logical data from a compression chunk is already present in the cache (e.g., cache component 402). This can be expected to be the case in a write after a prefetch, read, or write operation.

Determining whether logical data is cached (e.g., in the cache component 402) can involve waiting on buffer locks, which is something the write engine typically only does in the execute phase, and not in the plan phase. In order to maintain this, in certain embodiments, the disclosed subject matter can employ the decode control command to acquire L1-logical buffers (e.g., of the L1 cache 404) for the compression chunk, and can check the status of such buffers. If all of the desired blocks are already cached in such buffers, the disclosed subject matter (e.g., CMC 122) can indicate that the corresponding decode command can be bypassed to bypass the decompression operation with regard to the compression chunk, and can facilitate bypassing any on-disk reads which were only desired for the decode operation (though some on-disk reads can still be desired for reconstruction or repacking).

In terms of dependencies, the disclosed subject matter can be configured to make the on-disk reads and the decode command depend on the decode control command. That way, in connection with the decode control command, the disclosed subject matter (e.g., CMC 122) can determine whether the corresponding decode command can be bypassed and the decode control command can have an opportunity to take effect before the read or decode commands run.

It is noted that, in some embodiments, the decode control command can block on prefetch buffers, which can take a certain amount of time to complete, while there may be other useful work to be performed in the write operation (e.g., by the write engine). In certain embodiments, the disclosed subject matter (e.g., CMC 122) can trigger an asynchronous wait or other function that can enable the write engine execution to not be blocked to allow other useful work to be performed in the write operation, during the time associated with the decode control command blocking on prefetch buffers. For example, the disclosed subject matter can trigger an asynchronous wait or other function that can requeue the decode control command and mark the decode control command as not runnable (or having some kind of dependency) until the prefetch completes.

The disclosed subject matter (e.g., compression component 120 and/or CMC 122) can utilize the encode (compress) command to transform data from the uncompressed logical representation of the data to compressed data (e.g., the on-disk encoding of data). This encode command can depend on any corresponding read, such that the write iterator for the logical block can be fully valid. The encode command does not depend on allocation or FEC commands, instead write and FEC commands can depend on the encode command (indirectly via the pack command) The disclosed subject matter (e.g., compression component 120 and/or CMC 122) also can employ the encode command to generate the logical block CRC with regard to the logical blocks associated with the compression operation, and to set the incompressible bits when compression of data fails or is otherwise not performed.

In certain embodiments, if zero-block detection is implemented, the encode command can be a good place to implement it. In certain embodiments, the disclosed subject matter (e.g., compression component 120 and/or CMC 122) can compare the logical block CRC against the known zero block CRC and can double check the data content (e.g., to facilitate ensuring against a CRC collision). If the CMC 122 determines that the logical block has zero data, the CMC 122 can flag the logical block as having zero data, and, accordingly, the compression component 120 will not feed the logical block to the compression algorithm, but rather, the CMC 122 or compression component 120 can convert such logical block to a sparse block. In such implementation, to facilitate enabling it to fit into the write engine without compression enabled, in some embodiments, in a non-compression scenario, the FEC command can detect zero blocks (e.g., near CRC generation). Similar to the decode command, with regard to the encode command, the disclosed subject matter (e.g., compression component 120 and/or CMC 122) can be enabled to execute the encode command from an offload queue associated with and/or utilized by the write engine.

The disclosed subject matter (e.g., compression component 120 and/or CMC 122) can employ the pack command to determine whether block allocations and/or frees can be desired (e.g., suitable or needed) as a result of compression of the data and to construct the data iterator as desired (e.g., as suitable or necessary) for consumption by the write and FEC generation commands In some embodiments, the pack command can be a per-cluster command, which can allow for desirably looser cross-cluster dependencies. In other embodiments, the pack command can be a per-protection group command, which can be desirable for cross-cluster packing.

The pack command can depend on all of the encode commands for the cluster or protection group (e.g., protection group 114). Data write commands can depend on the corresponding pack command. FEC commands can depend on all pack commands for the protection group.

Since compression can reduce the requisite number of on-disk blocks in a data-dependent manner, the allocation command can either depend on the pack command, or a pessimistic allocation can be performed by the disclosed subject matter (e.g., CMC 122 or compression component 120), which can be followed by a refund (if any refund is to be provided). The former approach (e.g., the allocation command depending on the pack command) can likely result in less total work for the system and better allocation contiguity, whereas the latter approach (e.g., pessimistic allocation) can avoid adding a dependency to the allocation.

During a partial overwrite, when compressed data is packed in an old layout, it can be possible that on-disk data will have to be read even if the logical data is not modified, in order to repack. Whether or not there is to be a read of the on-disk data in such instances cannot be determined until pack (e.g., until the pack command is executed). In some embodiments, the disclosed subject matter (e.g., CMC 122 or compression component 120) can generate potentially unnecessary read or reconstruct commands and have them depend on the pack command. The disclosed subject matter (e.g., CMC 122 or compression component 120), in connection with executing the pack command, can prune a read or reconstruct command(s) if it determines such read or reconstruct command(s) is unnecessary.

The disclosed subject matter (e.g., CMC 122, compression component 120, and/or file management component 110) can perform repacking, for example, when the size of an earlier compression chunk changes. The disclosed subject matter also can utilize the pack command to facilitate repacking, although it is noted that there can be some potential complications to this repacking process. In some embodiments, the disclosed subject matter can avoid repacking by not packing compressed data from multiple compression chunks into the same block, however, doing so can potentially limit the maximum compression ratio. During pack, the CMC 122 can make a dynamic choice to pad, for example, whenever the CMC 122 determines that the pad will not cause the use of an extra block, in accordance with the defined compression management criteria.

In order to write a compression chunk to the memory component 102 (e.g., to disk), the disclosed subject matter can desire a complete set of data for that section of the file. This also can hold true when overwriting an existing compressed chunk of data whether it be with another compressed chunk or with uncompressed data. The write I/O path, which can be utilized by and/or associated with the write engine, can accept write requests as a file-system object list which can comprise one or more file-system object entries, each covering a different part of the file. The file-system object entries can be byte range buffers with no specific alignment or length constraints. It also can be possible that there are gaps between file-system object list entries.

It can be desirable for the disclosed subject matter (e.g., CMC 122, compression component 120, and/or file management component 110), when executing a chunk fill operation, to iterate through the file-system object list and determine which of the file's logical compression chunks are being modified and ensure that all of the desired data is available for each of those compression chunks. The disclosed subject matter (e.g., CMC 122, compression component 120, and/or file management component 110), when executing the chunk fill operation, can query the L1 cache (e.g., L1 cache 404) or read additional data from the memory component 102 (e.g., from disk) to fill out the compression chunks (if any desired data was missing). The disclosed subject matter can provide or support such functionality, for example, by incorporating and implementing commands for decode control (e.g., decode and decompress control), read into L1-on-disk (e.g., read data from memory component 102 and transfer such data to L1-on-disk of the L1 cache 404), and decode (e.g., decode and decompress) for any modified compression chunk.

For sections of the file that are within the end of file, the disclosed subject matter (e.g., CMC 122, compression component 120, and/or file management component 110) can check to see if the corresponding block contains real data, and if it does, the disclosed subject matter can read and/or map such real data in to the current write operation. If there are blocks in the compression chunks that are not covered by the file-system object list and these blocks correspond to sparse regions, the disclosed subject matter does not have to add buffers to the write operation for these sparse regions.

If the file-system object list partially covers a block that is currently a sparse region, the disclosed subject matter (e.g., CMC 122 or file management component 110) can map the remainder of the block with zeroes. If the file-system object list partially covers a block that is beyond end of file, the disclosed subject matter (e.g., CMC 122 or file management component 110) can map the remainder of the block with zeroes.

The disclosed subject matter (e.g., CMC 122 or file management component 110), in connection with executing the chunk fill operation, can create a new file-system object list that can be a combination of entries inherited from the original write request and new entries added for the parts that have been filled, via either the decode control command or decode command. The disclosed subject matter (e.g., CMC 122 or file management component 110) can insert an iterator for this new file-system object list into the safe write information structure, which can be consumed by the rest of the code associated with or implemented by the write engine. If the original file-system object list completely covers a set of compression chunks where it is not desired (e.g., necessary) to fill any data, the disclosed subject matter (e.g., CMC 122 or file management component 110) does not have to create a new file-system object list, or create the corresponding decode control, read, and decode commands. If a new filled file-system object list is desirable in connection with a write operation associated with the write engine, and the disclosed subject matter fails in any way to create this new filled file-system object list, the write operation can fail.

With regard to the chunk compress operation, the disclosed subject matter (e.g., CMC 122 and compression component 120) can perform a chunk compress operation to take a set of compression chunks and attempt to compress each chunk of data. In executing the chunk compress operation, the disclosed subject matter (e.g., CMC 122 and compression component 120) can feed data to a per-chunk encode command, which can be executed by the disclosed subject matter. From there, the disclosed subject matter can feed the results to a per-cluster or per-protection group pack command for execution of the per-cluster or per-protection group pack command on the input data by the disclosed subject matter. The encode, pack, and worst-case block allocation and write commands all can be pre-created during plan.

Given that the input data can be in a file-system object list, the disclosed subject matter (e.g., CMC 122 and/or compression component 120) can support feeding the employed compression algorithm from a file-system iterator. In other embodiments, the disclosed subject matter (e.g., CMC 122 and/or compression component 120) can copy the desired data out of the file-system object entries and into a temporary memory buffer.

During execution of the chunk compress operation, the disclosed subject matter (e.g., CMC 122 and/or compression component 120) can create another (e.g., new) file-system object list and can use that file-system object list as the target for the compressed chunks. If a compression chunk fails to compress or if the CMC 122 determines that the savings from the compression are not sufficient enough to bother with compression on the data (e.g., in accordance with the defined compression management criteria), the disclosed subject matter (e.g., CMC 122 and/or compression component 120) can inherit the file-system object entries for that compression chunk from the original file-system object list and incorporate such file-system object entries for that compression chunk in to the new file-system object list.

At this stage, and if any compression chunk is not being fully written, the disclosed subject matter (e.g., CMC 122 and/or compression component 120) can record (e.g., in a data store, such as memory component 102) which logical blocks within the compression chunk have been included and compressed into the compression chunk. This can be performed so that, when the compression chunk is decompressed, the disclosed subject matter (e.g., CMC 122 and/or compression component 120) can know where to place the uncompressed data obtained from decompressing the compressed data of the compression chunk.

It also can be desirable to know where the compressed chunk will be written into the protection group (e.g., protection group 114). This can be a function of the pack command, so it typically is not known until that stage of execution. As long as the compression process saved memory space or it was decided to not use compression on the data, there always can be sufficient memory space in the protection group layout of the protection group to store the data. The disclosed subject matter (e.g., CMC 122 and/or compression component 120) can write the compression data within the set of physical blocks overlaid by the set of logical compressed blocks. In some embodiments, the disclosed subject matter can perform this on a per-cluster basis; and, in other embodiments, the disclosed subject matter can perform this on a per-PG basis with cross-cluster packing, such as more fully described herein.

After packing is performed, once the number of desired (e.g., necessary or wanted) blocks in the memory component 102 (e.g., on-disk blocks) is known, it can be desirable for the disclosed subject matter (e.g., CMC 122) to know block allocation. The disclosed subject matter (e.g., CMC 122 or file management component 110) can either prune an allocation command(s) or allow an allocation command(s) to run as desired. The disclosed subject matter (e.g., CMC 122 or file management component 110) can record (e.g., in a data store, such as the memory component 102) any block frees, as desired. The disclosed subject matter can return blocks to the preallocation store, rather than to the free store.

In some embodiments, if for any reason the chunk compress operation fails, the disclosed subject matter (e.g., CMC 122, file management component, and/or other system component) can fall back to writing out uncompressed data.

With regard to reconstruction and verification (e.g., reconstruction and verification implemented by the write engine), the disclosed subject matter (e.g., CMC 122 and/or compression component 120) can employ certain code (e.g., certain code utilized by the write engine) that has support to reconstruct blocks based at least in part on FEC and also verify the CRCs of on-disk blocks (e.g., blocks of the memory component 102). It uses the L1 cache 404 to access the on-disk data from remote nodes. A potential problem with this can be that the L1 cache can be used to store both compressed (L1-on-disk) and uncompressed (L1-logical) data. For write operations associated with or performed by the write engine that operate on raw on-disk data, the CMC 122 can redirect cache lookups associated with such write operations to reference the appropriate location(s) of the desired data (e.g., raw on-disk data) in the L1 cache. Because some elements of a PG stripe may be compressed and some may not be, this means that reconstruction potentially can operate on a mixture of L1-on-disk and L1-logical buffers, even while all will represent on-disk data. In some embodiments, the disclosed subject matter (e.g., CMC 122 and/or compression component 120) can try-lock the buffers in the L1 cache 404 in stripe order and use anonymous buffers in the L1 cache on try-lock failure.

With regard to a write operation associated with or performed by the write engine, it is noted that the write operation typically is the only operation that is fed real data to be written to the memory component 102 (e.g., written to disk). If compression is enabled, it can be desirable for the write operation to utilize the chunk fill and chunk compression stages.

With regard to the write zero operation associated with or performed by the write engine, the disclosed subject matter (e.g., CMC 122, compression component 120, and/or file management component 110) can utilize the write zero operation to convert a set of file blocks into sparse blocks. The write zero operation typically can be used by operations that desire to insert shadow references and desire to remove the contribution to FEC from any existing data blocks.

In some instances, a write zero operation can be employed to convert a block that contains compressed data, and, in such instances, it can be desirable for the disclosed subject matter (e.g., the CMC 122) to move any compressed data that is desired to be preserved to an alternate storage location. To accomplish this, the disclosed subject matter (e.g., the CMC 122 and/or compression component 120) can read or facilitate reading in the compressed chunk, decompressing the data (e.g., compressed data), removing the data (e.g., uncompressed data) for the block being converted, recompress the data, and write the recompressed data back out at the same time as converting the original block to a sparse block.

The write zero operation can be able to leverage the chunk fill stage (with a no initial data condition) and also the chunk compress stage. The disclosed subject matter can mark or flag blocks being converted to sparse blocks as sparse blocks so that such sparse blocks can be avoided when writing the compressed chunk back to the memory component 102 (e.g., to disk). That is, the encode command (e.g., the disclosed subject matter when utilizing the encode command) can know to bypass sparse blocks.

In alternative embodiments, the disclosed subject matter (e.g., the CMC 122 and/or compression component 120) can set the extent type in the LBN mapping table and leave the compressed chunk alone. The information in the LBN mapping table can override whatever information exists in the protection group (e.g., protection group 114). This can reduce the complexity of the write zero operation considerably, but potentially can leave redundant data in the memory component 102 (e.g., on disk). Too much redundant data in the memory component 102 can negate or reduce the storage savings due to compression of data. It is noted that, if an entire stripe is converted this way, the FEC blocks for that stripe typically cannot be removed.

The disclosed subject matter (e.g., CMC 122, compression component 120, and/or file management component 110) can use a particular allocation operation (e.g., an allocation operation implemented by the write engine) to preallocate on-disk blocks, including data and FEC blocks, for example, as more fully described herein. Preallocations typically do not modify the file data logically, e.g., preallocations typically do not punch zeros, they only can hint that the file system is to reserve space (e.g., so as to fail early for quota violations and free space exhaustion, and potentially to reduce the latency and improve the on-disk layout of a later overwrite).

It therefore can be possible that a user-requested preallocation over a compressed chunk can be treated as a directive to decompress, as the preallocation can indicate an intention to reserve an amount of memory space (e.g., disk space) in the memory component 102 for the worst case. However, if it were implemented this way, this can inhibit compression of the corresponding block during encode. On the other hand, since preallocation always can be treated as only a hint, it also can be possible to ignore cases where preallocation intersects compressed blocks.

Taking into account these considerations, in some embodiments, the disclosed subject matter (e.g., CMC 122 and/or file management component 110) can ignore or disregard preallocation over compressed regions (e.g., memory regions containing compressed chunks of data) in the memory component 102. In other embodiments, the disclosed subject matter (e.g., CMC 122 and/or file management component 110) can decompress compressed data of compressed regions, in response to user preallocation requests to preallocate blocks (e.g., on-disk blocks) in the memory component 102.

In certain embodiments, the disclosed subject matter (e.g., CMC 122 and/or file management component 110) can utilize a truncate operation, which can be performed by or associated with the write engine, to remove any logical data blocks that are entirely beyond the end of the file, for example, if the file size is being reduced or to zero regions of the file beyond the old file size that are now exposed if the file size is being increased. Since this truncate operation can work on logical blocks, it can be desirable for the truncate operation to be configured to, and the disclosed subject matter can configure the truncate operation to, understand how to handle compressed chunks of data. If the truncate operation is reducing the file size to a compression chunk boundary, the CMC 122 can eliminate entire compression chunks beyond the file size.

If the new file size is inside a logical file block, the CMC 122 can zero the remainder of that logical file block. If the new file size is inside a compression chunk, the disclosed subject matter (e.g., CMC 122 and/or compression component 120) can read the compression chunk from the memory component 102, decompress the compression chunk to generate or recover uncompressed data, remove the redundant logical blocks that are entirely beyond the new file size, recompress the chunk of data (e.g., using a desired compression algorithm), and write the compressed chunk (e.g., the recompressed chunk of data) back to the memory component 102 (e.g., to disk). In accordance with various embodiments, the truncate operation can leverage the chunk fill and chunk compression stages to accomplish this.

In some embodiments, the CMC 122 can enable decompression (e.g., automatic decompression) of compressed data. To facilitate automatic decompression of compressed data, the disclosed subject matter can configure the file data read path of the system (e.g., system 100 or system 400) to read entire compression chunks, decompress the compression chunks, and save the result (e.g., decompressed data) into the cache component 402. As with a regular read path, a goal of the compressed read path can be to use prefetch effectively in order to keep the latency path relatively short. With effective prefetch, including pre-decompression of data, the latency path can be a check of the L1 cache 404 (e.g., L1-logical cache of the L1 cache 404) for a valid cached buffer.

On a cache miss of the L1 cache 404, the CMC 122 can consult the protection group (e.g., protection group 114) to determine if the LBN is compressed. If it is determined that the LBN is not compressed, the read operation can continue as before, e.g., reading directly into the L1 cache 404. The L1-on-disk cache range typically will not be used for non-compressed data due to the additional costs of moving data between cache ranges.

When the LBN is compressed and not already mapped into the L1 cache 404, the CMC 122 or file management component 110 can initiate an operation to read the entire compression chunk into the L1 cache 404. In some instances, this operation can involve multiple L1-logical and L1-on-disk buffers.

This request can first lock the L1-logical buffers of the L1 cache 404 for the LBNs in the compression chunk in ascending order. The list of buffers that are to be locked (e.g., that will be populated with data) can be provided by the compression chunk block map, which can be generated and updated by the CMC 122.

Some of the buffers, but not all, for the compression chunk can contain cached data. This can happen, for example, if some of the buffers are individually invalidated. If this is the case, it can still be desirable to lock the buffers, but it is not necessary to populate them. The CMC 122 or file management component 110 still can read or facilitate reading the entire compression chunk and decompress the compressed data of the compression chunk to obtain the missing blocks.

As an enhancement, in some embodiments, the decompression process by the compression component 120 can desirably bypass work for some blocks which are or may not be used (e.g., due to previous presence in cache or to overwrite). In those cases, revalidating a buffer can be redundant (although it will not cause corruption, as the ifs does not use a dirty buffer to write data).

If the LBN of the read request is not the first block in the compression chunk, the buffer for that LBN can be released first (e.g., by the cache component 402) and reacquired in order. When the buffer for the read LBN is reacquired, the CMC 122 or file management component 110 can check again to see if the buffer contains cached data since the state of the buffer may have changed. As an enhancement, in certain embodiments, the CMC 122, file management component 110, or cache component 402 can try-lock the L1-logical buffers of the L1 cache 404 behind the primary LBN of the read, and only on try-lock failure, can release it. When all the buffers from the L1 cache 404 have been locked, the CMC 122 or file management component 110 can check the existing L1-on-disk cache for any data (e.g., on-disk data) that can be used by the compression chunk. This can avoid having to go any further.

As can be done with the L1 cache 404, the CMC 122 or file management component 110 can lock all the buffers corresponding to the on-disk compressed data for this compression chunk. For any desired on-disk blocks that are not mapped into the existing L1-on-disk cache, an asynchronous fetch of the remote block can be issued (e.g., by the cache component 402, CMC 122, or file management component 110).

After all requests have been issued for the data blocks, the CMC 122 and/or file management component 110 can wait for the requests to complete. When the requests are completed, the desired data (e.g., on-disk data) can now be in the existing L1-on-disk cache buffers of the L1 cache 404. The cache component 402 can combine the data from the buffers from the existing L1-on-disk cache of the L1 cache 404 and feed it (e.g., communicate or transfer it) to the decompression routine associated with the compression component 120. The output from the decompression routine performed by the compression component 120 can be written directly to buffers from the L1 cache 404, or can be discarded for any already-valid buffers. When this is complete, the L1 buffers of the L1 cache 404 can be released (e.g., by the cache component 402 or compression component 120) except for the buffer from the uncompressed L1 cache associated with the original LBN, which still can be used to satisfy the read request.

With regard to a reconstructed read, reconstruction can operate on data, such as on-disk data, so that the read reconstruction and verification paths can be configured, instructed, or taught to use the L1-on-disk cache of the L1 cache 404 for compressed LBNs. A consequence of this can be that reconstruction can use a mixture of L1-on-disk and L1-logical buffers of the L1 cache 404, since not all of the blocks in a stripe can be compressed. This potentially can impose a relatively complicated buffer lock ordering, however, to avoid dealing with such issue, the cache component 402 or other component of the system 400 can try-lock the buffers of the L1 cache 404 in stripe order and use anonymous buffers on try-lock failure.

The disclosed subject matter (e.g., the file management component 110 and/or CMC 122) also can effectively integrate or use dedupe functions alongside with compression and decompression functions. In some embodiments, the disclosed subject matter (e.g., the file management component 110 and/or CMC 122) can support and implement dedupe operations, for example, by having the data decompressed (e.g., by the compression component 120) during the sampling and sharing phases of the dedupe process. The compression component 120 can decompress data before the file management component 110 calculates SHA 1 checksums, for example. The file management component 110 can employ a dedupe system call that can be utilized to read and compare data (e.g., decompressed data). Also, the compression component 120 can recompress data (e.g., via inline compression) when written to a shadow store.

The dedupe process also can PG transfer a compressed protection group from the source file into a shadow store. This can save not only a data write operation but also the compression overhead.

The file management component 110 also can employ dedupe sampling that can use CRCs to smart filter candidate blocks to sample. The dedupe system call also can use CRCs as block matching criteria. In some embodiments, the dedupe process also can be configured to enable the dedupe process to retrieve logical uncompressed CRCs, rather than compressed CRCs.

In some embodiments, the disclosed subject matter can employ cloning techniques to clone files or other data. For instance, the disclosed subject matter (e.g., file management component 110) can clone or facilitate cloning a source file that already contains shadow references. The disclosed subject matter (e.g., file management component 110) also can clone or facilitate cloning a source file that does not have shadow references, for example, by copying the data from the source file to the shadow store or by using PG transfers from the source file to the shadow store. PG transfers can work to clone a source file even if the source file contains compressed data. When cloning a source file that contains compressed data, the compressed data does not have to be decompressed or recompressed, so there can be no chance of a performance regression in this case.

In some instances, the disclosed subject matter (e.g., file management component 110) can clone or copy blocks of data from a source file to the shadow store. In such instances, if the blocks of data are compressed data, the compression component 120 (e.g., as managed by the CMC 122) can decompress the compressed data on read from the source file and can recompress the data to generate compressed data on write to the shadow store. The disclosed subject matter can configure the clone functions to understand compressed extents in the logical extent map and handle them as data blocks to facilitate performing cloning operations on blocks of compressed data when cloning or copying blocks of data from a source file to the shadow store.

With regard to snapshot data, the compression component 120 (e.g., as managed by the CMC 122) can compress snapshot data inline using a desired compression algorithm. For instance, the compression component 120 (e.g., as managed by the CMC 122) can compress snapshot data inline using the same code that inline compresses to a current version of the file.

Regarding COW, the disclosed subject matter (e.g., CMC 122, compression component 120, and/or file management component 110) can employ multiple paths and techniques for COW. For instance, the disclosed subject matter can perform a decompress-recompress, which can occur using the code flow of COW. The disclosed subject matter also can COW entire compression chunks.

The disclosed subject matter, employing snapshot COW code, can operate on logical uncompressed data and can be configured to support compression in the decompress-recompress scheme. For instance, the snapshot COW code can be configured to understand compressed extents in the logical extent map and handle them as data blocks that are to be COWed. As an example, the disclosed subject matter (e.g., the CMC 122 and/or file management component 110) can incorporate or add logical block addresses associated with compressed data, and can process logical block addresses associated with compressed data and logical block addresses associated with non-compressed data in a same or similar manner to each other when determining which blocks are to be COWed between snapshot versions.

For the decompress-recompress technique, the disclosed subject matter can have snapshot granularity on logical blocks and not compression chunks. To COW a block from a first snapshot version to a second snapshot version, the compression component 120 (e.g., as managed by the CMC 122) can decompress the data from the first snapshot version and can recompress the data to the second snapshot version. This can mean that part of a compression chunk can be in the second snapshot version and the rest can be references (e.g., special or specified addresses) to the first snapshot version. In some embodiments, to read a single compression chunk from a snapshot (e.g., a particular snapshot version), the disclosed subject matter can decompress multiple compression chunks from one or more other (e.g., subsequent) snapshot versions.

In other embodiments, it can be more efficient for the disclosed subject matter (e.g., file management component 110 and/or CMC 122) to copy the compressed data from the first snapshot version to the second snapshot version. In such embodiments, the disclosed subject matter (e.g., file management component 110 and/or CMC 122) can COW the entire compression chunk. This potentially can cause the snaps to consume more memory (e.g., disk) space, depending on whether this is only enabled when already COWing the entire chunk, or for any write that intersects a part of a chunk. If the write to the first snapshot version covers the entire compression chunk, the disclosed subject matter (e.g., file management component 110 and/or CMC 122) can transfer the blocks from the first snapshot version to the second snapshot version without even having to perform a copy operation, which can potentially benefit the non-compressed data path as well.

In certain embodiments, the disclosed subject matter (e.g., file management component 110 and/or CMC 122) can COW desired data (e.g., on-disk data of the memory component 102) without decompressing the data by having the COW read such data into a separate file-system object for such data and plumbing that into certain code utilized by the write engine. Such code utilized by the write engine can ensure that the data does not overlap with any other logical data, and can feed the data directly to the pack command.

With further regard to APIs, the disclosed subject matter can employ a desired API in connection with compression and decompression of data, as well as for other desired functions. With particular regard to compression algorithms, different compression algorithms can have different specifications (e.g., requirements) for initialization, destruction, compression of data, and decompression of data. It can be desirable to present a common API to the rest of the kernel, and the disclosed subject matter can be configured to present a common API to the rest of the kernel.

In accordance with various embodiments, the different compression algorithms can have different specifications, which can comprise, for example, it can be desirable for compress and decompress functions to not perform memory allocations; it can be desirable for compress and decompress functions to not sleep; it can be desirable for certain set up and tear down operations, which are determined or deemed to be expensive, to be amortized across as many compress and decompress operations as possible; for compression operations, the caller can choose between several available compression algorithms; and/or, for decompression operations, it can be desirable for the caller to know how the data was compressed and call the relevant (e.g., corresponding) decompression algorithm. The first two specifications (e.g., compress and decompress functions not performing memory allocations; compress and decompress functions not sleeping) can ensure that these compress and decompress functions can operate (e.g., run) at full speed and can be called from any context, including with non-sleeping locks held.

It is noted that not all compression algorithms can support memory allocation (malloc) with variable flags. For some code, the memory allocation flags can be fixed at compile time. Changing that code to pass malloc flags to all the allocation functions (and through all their callers) would involve major changes to contributed code. In some embodiments, the disclosed subject matter (e.g., file management component 110 and/or CMC 122), in implementing set up and tear down functions, can call malloc with a wait or sleep parameter, which can mean that the set up function potentially can sleep. To amortize the cost of the set up operation, the disclosed subject matter (e.g., file management component 110 and/or CMC 122) can cache structures that are no longer desired (e.g., required) for potential reuse, which can be accomplished, for example, using uniform memory access (UMA) or desired caching code, which can be used inside the API.

The disclosed subject matter (e.g., file management component 110 and/or CMC 122) can check contexts to ensure (e.g., guarantee) that a context passed to a particular compression or decompression algorithm is valid for that algorithm and for the operation to which the context is being passed.

The context obtained from a get context function only can be used by one compress or decompress operation at a time. That is, it can be desirable, and the disclosed subject matter can be configured, to not use the result of the get context function on multiple threads unless it can be guaranteed that only one thread at a time is using the result. When a context is no longer desired, the disclosed subject matter can release the context by calling a put context function.

Obtaining and freeing a context can incur some overhead. The disclosed subject matter (e.g., the caller employed by the disclosed subject matter) can be configured to, when possible, use the result from get context function for multiple calls to compress or decompress data, before calling the put function. It also can be desirable to not share contexts between algorithms (e.g., compression algorithms, decompression algorithms), and the disclosed subject matter (e.g., the file management component 110, CMC 122, and/or associated functions) can be configured to not share contexts between algorithms. The disclosed subject matter (e.g., the file management component 110, CMC 122, and/or associated functions) further can be configured to not use a context for compression operations for decompression operations, and vice versa, as violations of this rule can raise an assert.

It is noted that some hardware-based compression/decompression code can have a limited number of slots. Given that it can be desirable for compress operations and decompress operations to not sleep for synchronous calls, the disclosed subject matter can be configured to reserve hardware slots by using the get context function. In that case, a context is held for a long period, other calls to the get context function can potentially be starved. Unavailable hardware slots can present a return code (e.g., an EBUSY code) indicating such slot is busy or unavailable.

Regarding logging in connection with the API, the disclosed subject matter (e.g., the file management component 110, CMC 122, and/or associated functions) can perform almost all logging from this API using a logging framework that can employ a log channel relating to data compression. The disclosed subject matter typically can log an error when there is a request for a compression or decompression algorithm that is not available, unless the caller suppresses the error message. For tracing purposes, the disclosed subject matter can log most functions at the debug level.

The disclosed subject matter (e.g., the file management component 110, CMC 122, and/or associated functions) can perform almost all logging from glue modules that register with this API using the logging framework, which can employ a dedicated logging channel that can be specific to the glue module. The disclosed subject matter can log unexpected return codes from registration, set up, tear down, compression, and/or decompression as errors. For tracing purposes, the disclosed subject matter can log most functions at the debug level.

There can be some code (e.g., code that can be used for debugging kernel module operations) that does not use a dedicated logging channel, but can instead use a generic kernel logging facility. This can follow existing kernel conventions for module operations.

In some embodiments, the disclosed subject matter can employ three separate layers for the compression API. For example, with regard to the API, the disclosed subject matter can be configured to employ structure and functions that can comprise three layers of code with calls between multiple layers. Layer 1 can be one or more compression modules. In some embodiments, layer 1 can comprise glue modules that can translate a generic compression API (e.g., an abstract compress/decompress API) into the API of the actual compression code (e.g., the API of the ZLIB implementation). Layer 2 can be a generic-compression-API management API (also referred to herein as a management API) with regard to registration and/or to find a particular compression code. Layer 3 can be a caller that desires to use a compress or decompress routine via the generic compression API. The disclosed subject matter can be configured to have calls between these layers to have some identification to specify or indicate which compression algorithm is being used.

The disclosed subject matter (e.g., file management component 110 and/or CMC 122) can have each compression algorithm register itself with the rest of the kernel, for example, by registering with the management API. The disclosed subject matter (e.g., file management component 110 and/or CMC 122) can employ a registration layer that can be called by the compression code to make itself available, and also can be called by consumers of compression code to obtain access. The disclosed subject matter (e.g., file management component 110 and/or CMC 122) can have each compression algorithm register itself with the rest of the kernel at boot or module load time.

The disclosed subject matter can be configured to have the compression algorithms not do any locking on the compression algorithm structure, as that can be the responsibility of the compression registration code. Once a compression algorithm has registered itself, its functions can be called at any time until it deregisters (e.g., unregisters) itself with a call to the management API. The management API can drain existing requests before returning success (e.g., a success message or indicator) to the deregister request and deregistering the compression algorithm.

When there are algorithm specific tunable parameters, the disclosed subject matter (e.g., file management component 110, CMC 122, and/or associated functions) can pass those parameters as part of the algorithm name. For example, zlib.level 1 can ask for zlib compression with level 1.

Typically, these functions do not take or utilize chunk size, packing alignment, or various other parameters. Those parameters generally only have meaning above the compression code, by the time the data is passed to compress or decompress such data, there merely can be an input and output buffer with associated sizes.

In some embodiments, the disclosed subject matter can employ input and output buffers that can be contiguous in virtual address space. In certain embodiments, the disclosed subject matter can be configured such that scatter/gather is not supported by the compression algorithms In other embodiments, the disclosed subject matter can be configured to provide scatter/gather support inside the compression algorithms.

Figure 6:
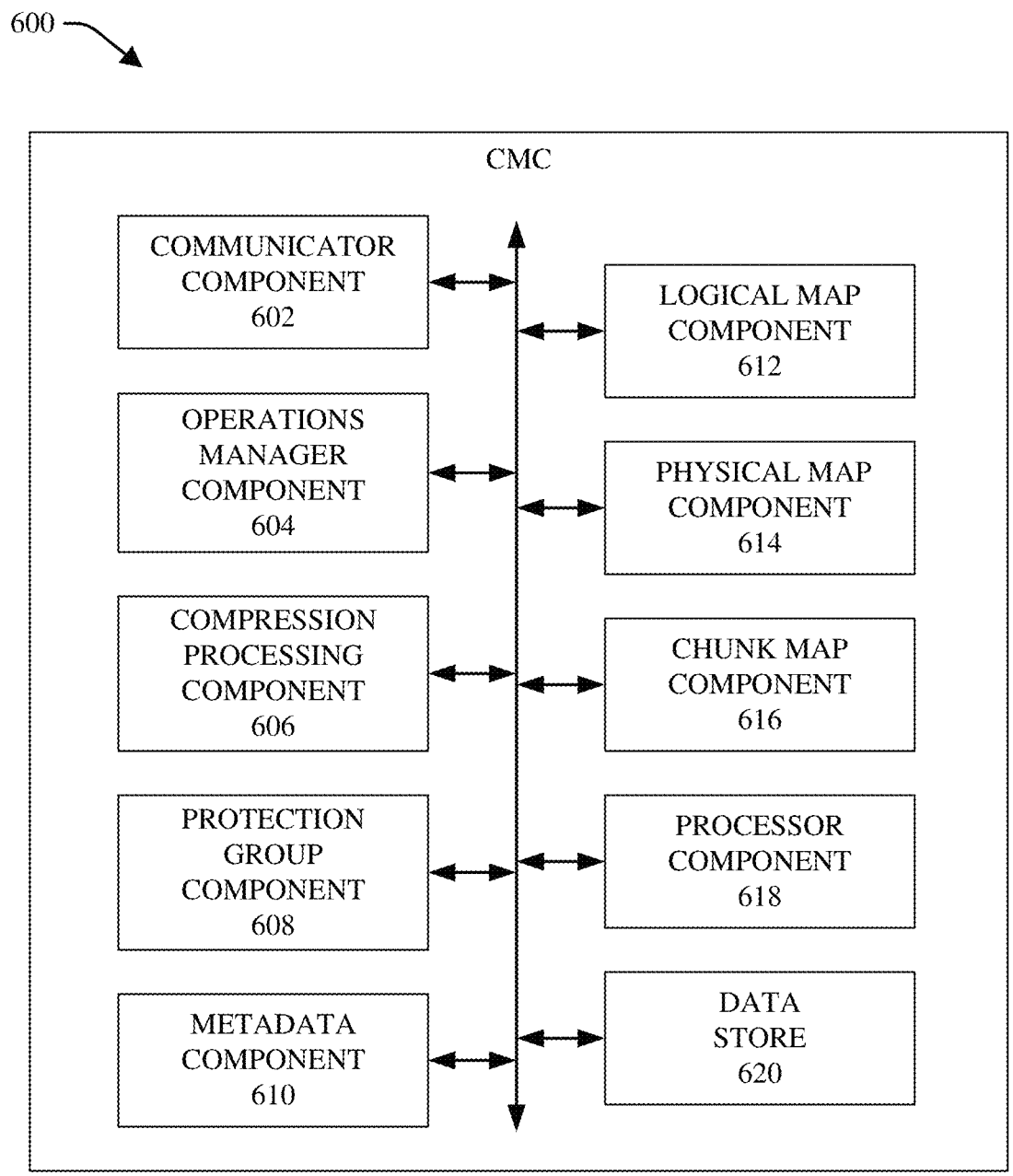
FIG. 6 depicts a block diagram of example compression management component, in accordance with various aspects and embodiments of the disclosed subject matter.

FIG. 6 depicts a block diagram of an example compression management component (CMC) 600, in accordance with various aspects and embodiments of the disclosed subject matter. The CMC 600 can comprise, for example, a communicator component 602, an operations manager component 604, a compression processing component 606, a protection group component 608, a metadata component 610, a logical map component 612, a physical map component 614, a chunk map component 616, a processor component 618, and a data store 620.

The communicator component 602 can transmit information from the CMC 600 to another component(s), device(s), function(s), and/or user(s), and/or can receive information from the component(s), device(s), function(s), and/or user(s). For instance, the communicator component 602 can receive data and/or information relating to the data to facilitate analysis of the data that can be utilized to determine whether the data is to be compressed, decompressed, and/or otherwise processed, and/or to determine which compression or decompression algorithm to use if the data is to be compressed or decompressed. The communicator component 602 also can transmit information relating to compression or decompression of data, including, for example, instructions relating to the compression or decompression of data.

The operations manager component 604 can control (e.g., manage) operations associated with the CMC 600. For example, the operations manager component 604 can facilitate generating instructions to have components of the CMC 600 perform operations, and can communicate respective instructions to respective components (e.g., communicator component 602, compression processing component 606, protection group component 608, . . . , processor component 618, and data store 620) of the CMC 600 to facilitate performance of operations by the respective components of the CMC 600 based at least in part on the instructions, in accordance with the defined compression management criteria and compression management algorithm(s) (e.g., compression management algorithms as disclosed, defined, recited, or indicated herein by the methods, systems, and techniques described herein). The operations manager component 604 also can facilitate controlling data flow between the respective components of the CMC 600 and controlling data flow between the CMC 600 and another component(s) or device(s) (e.g., compression component, file management component, memory component, file system, coder component, . . . ) associated with (e.g., connected to) the CMC 600.

The compression processing component 606 can facilitate compressing data and decompressing data (e.g., compressed data) using desired compression and decompression algorithms, such as described herein, as well as compression management algorithms that can facilitate controlling the compression of data and decompression of data. The compression processing component 606 can utilize, execute, and/or call various functions of the disclosed subject matter, such as described herein, to facilitate such compressing of data and decompressing of data. The compression processing component 606 also can analyze data and/or other information (e.g., compression algorithms, preferences of users relating to compression or decompressing data, . . . ) to facilitate determining whether data can be compressed, the amount of uncompressed data, the amount of compressed data (if compressed), the amount of memory space saved by compressing data, the amount of time or resources that will be employed if data is compressed, which compression algorithm to employ to compress data, which decompression algorithm to employ to decompress compressed data, and/or other determinations, decisions, or selections relating to data compression or decompression, in accordance with the defined compression management criteria.

The protection group component 608 can facilitate management of respective compressed data in respective protection groups. The protection group component 608 can track and maintain information regarding which compressed data is associated with which protection group, which compressed data (e.g., which compression chunks) are associated with a protection group, and/or other desired information to can be utilized by the CMC 600 to manage compression of data (and decompression of data) and storage of compressed data in protection groups respectively associated with memory locations of the memory component.

The metadata component 610 can generate metadata, including PG metadata associated with protection groups, and individual metadata associated with individual compressed streams (e.g., individual compression chunks), that can be utilized to enable protection group functionality and compression functionality with respect to compressed data. The PG metadata can comprise, for example, a logical extent map that can describe or identify which logical blocks are being utilized in the compression of data (e.g., which logical blocks are associated with compressed data stored in the memory component), a list of additional CRC values for the logical blocks, and a list of compression chunks that can store metadata (e.g., individual metadata) regarding individual compressed streams. The PG metadata also can comprise other types of PG metadata (e.g., a physical extent map of the physical blocks that store the data or compressed data associated with the protection group, an initial list of CRC values, ... ) that can describe the protection group. The individual metadata can include, for example, information indicating the compression format of the compressed data (or indicating no compression format if the data is not compressed), information indicating a compressed size of an individual compressed stream comprising the compressed data (if the data has been compressed), information indicating an uncompressed size of the individual compressed stream that comprises the compressed data (if the data has been compressed) or indicating the uncompressed size of the data (which was not compressed), and/or information indicating a starting offset for the individual compressed stream in physical space (e.g., physical block, or portion thereof) in the protection group.

The logical map component 612 can generate, update, and manage a logical map that can be utilized to map the logical space associated with the memory component, and can indicate or describe which blocks are being utilized for compression of data, and can describe how compressed blocks can be found in the physical space of the memory component via the chunk map. The logical map can comprise, for example, information that can indicate the logical blocks associated with compressed data, the number of logical blocks associated with a compression chunk of data, offsets for the respective logical blocks, which logical blocks are associated with pass-through references, and/or other desired information. The logical block map can be associated with the physical map and chunk map.

The physical map component 614 can generate, update, and manage a physical map that can be utilized to map the physical space, including the compressed physical space, associated with the memory component, and can indicate or describe which physical blocks, or portions thereof, are being utilized to store compressed data. The physical map can comprise, for example, information that can indicate the physical blocks, or portions thereof, associated with compressed data (e.g., wherein compressed data is stored), the number of physical blocks, or portion thereof, and/or amount of physical space associated with a compression chunk of data, respective offsets (in physical space) for the respective compression chunks of data, the encoded size of the compression chunk of data, which physical blocks, or portion thereof, are sparse blocks or comprise sparse regions, which physical blocks are associated with pass-through references (e.g., shadow reference, a sparse block associated with a pass-through reference, or other type of pass-through reference), and/or other desired information. The physical block map can be associated with the logical map and chunk map.

The chunk map component 616 can generate, update, and manage a chunk map that can be utilized to map compression chunks of data stored in the memory component. The chunk map can describe where in the compressed portion of the physical space the chunk can be located. The chunk map can comprise respective information relating to respective compression chunks of data that are stored in the physical space of the memory component. For instance, the chunk map can comprise respective sets of entries (e.g., chunk map entries) associated with respective compression chunks of data stored in the physical space. For each compression chunk, a set of entries in the chunk map can indicate, for example the LBN of the compression chunk, the pad (e.g., the amount of padding) of the compression chunk, the decoded size of the compression chunk (e.g., in the logical space), the encoded size of the compression chunk (e.g., in the physical space), the compression algorithm utilized to compress the data in the compression chunk, and/or other desired information. The chunk block map can be associated with the logical map and physical map.

The processor component 618 can work in conjunction with the other components (e.g., communicator component 602, operations manager component 604, compression processing component 606, protection group component 608, ... , and data store 620) to facilitate performing the various functions of the CMC 600. The processor component 618 can employ one or more processors, microprocessors, or controllers that can process data, such as information relating to files, file systems, compressing data, compression chunks of data, decompressing data, protection groups, metadata (e.g., PG metadata, individual metadata), logical maps, physical maps, chunk maps, parameters, traffic flows, policies, defined compression management criteria, algorithms (e.g., compression management algorithms, compression algorithms, decompression algorithms), protocols, interfaces, tools, and/or other information, to facilitate operation of the CMC 600, as more fully disclosed herein, and control data flow between the CMC 600 and other components (e.g., memory component, file management component, file system, coder component, network devices of the communication network, data sources, applications, ... ) associated with the CMC 600.

The data store 620 can store data structures (e.g., user data, metadata), code structure(s) (e.g., modules, objects, hashes, classes, procedures) or instructions, information relating to files, file systems, compressing data, compression chunks of data, decompressing data, protection groups, metadata (e.g., PG metadata, individual metadata), logical maps, physical maps, chunk maps, parameters, traffic flows, policies, defined compression management criteria, algorithms (e.g., compression management algorithms, compression algorithms, decompression algorithms), protocols, interfaces, tools, and/or other information, to facilitate controlling operations associated with the CMC 600. In an aspect, the processor component 618 can be functionally coupled (e.g., through a memory bus) to the data store 620 in order to store and retrieve information desired to operate and/or confer functionality, at least in part, to the communicator component 602, operations manager component 604, compression processing component 606, protection group component 608, metadata component 610, logical map component 612, physical map component 614, chunk map component 616, and data store 620, etc., and/or substantially any other operational aspects of the CMC 600.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 7-10. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 7:
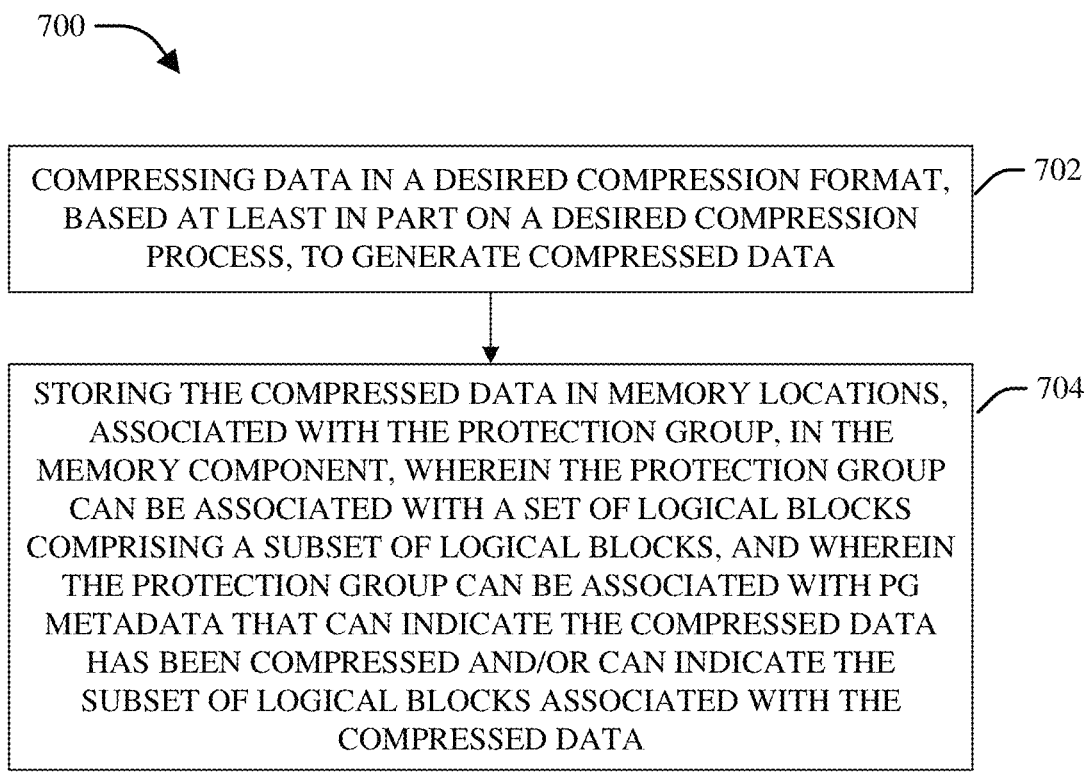
FIG. 7 illustrates a flow chart of an example method that can compress data for storage in a protection group in a memory component, in accordance with various aspects and embodiments of the disclosed subject matter.

FIG. 7 illustrates a flow chart of an example method 700 that can compress data for storage in a protection group in a memory component, in accordance with various aspects and embodiments of the disclosed subject matter. The method 700 can be employed by, for example, a system comprising the file management component, compression component, CMC, processor component (e.g., of or associated with the compression component and CMC), and/or data store (e.g., of or associated with the compression component, CMC, and/or processor component).

At 702, data can be compressed in a desired compression format, based at least in part on a desired compression process, to generate compressed data. With regard to data being stored in a protection group in a memory component, the CMC can determine a desired compression process (e.g., desired compression algorithm), if any, to utilize to compress data that is to be stored in memory locations in the protection group in the memory component, in accordance with the defined compression management criteria (e.g., a compression management criterion (or criteria) relating to data throughput or speed, an amount or level of data compression, and/or other criterion), as more fully described herein. The compression component can compress the data in the desired (e.g., selected, suitable, and/or optimal) compression format, based at least in part on the desired compression process, to generate the compressed data.

At 704, the compressed data can be stored in memory locations, associated with the protection group, in the memory component, wherein the protection group can be associated with a set of logical blocks comprising a subset of logical blocks, and wherein the protection group can be associated with PG metadata that can indicate the compressed data has been compressed and/or can indicate the subset of logical blocks associated with the compressed data. The CMC, the file management component, and/or the memory component can store, or facilitate storing, the compressed data in the memory locations in the memory component, wherein the memory locations can be associated with the protection group associated with the set, including the subset, of logical blocks, and wherein the protection group can be associated with the PG metadata, which can indicate the compressed data has been compressed and/or can indicate the subset of logical blocks associated with the compressed data.

Figure 8:
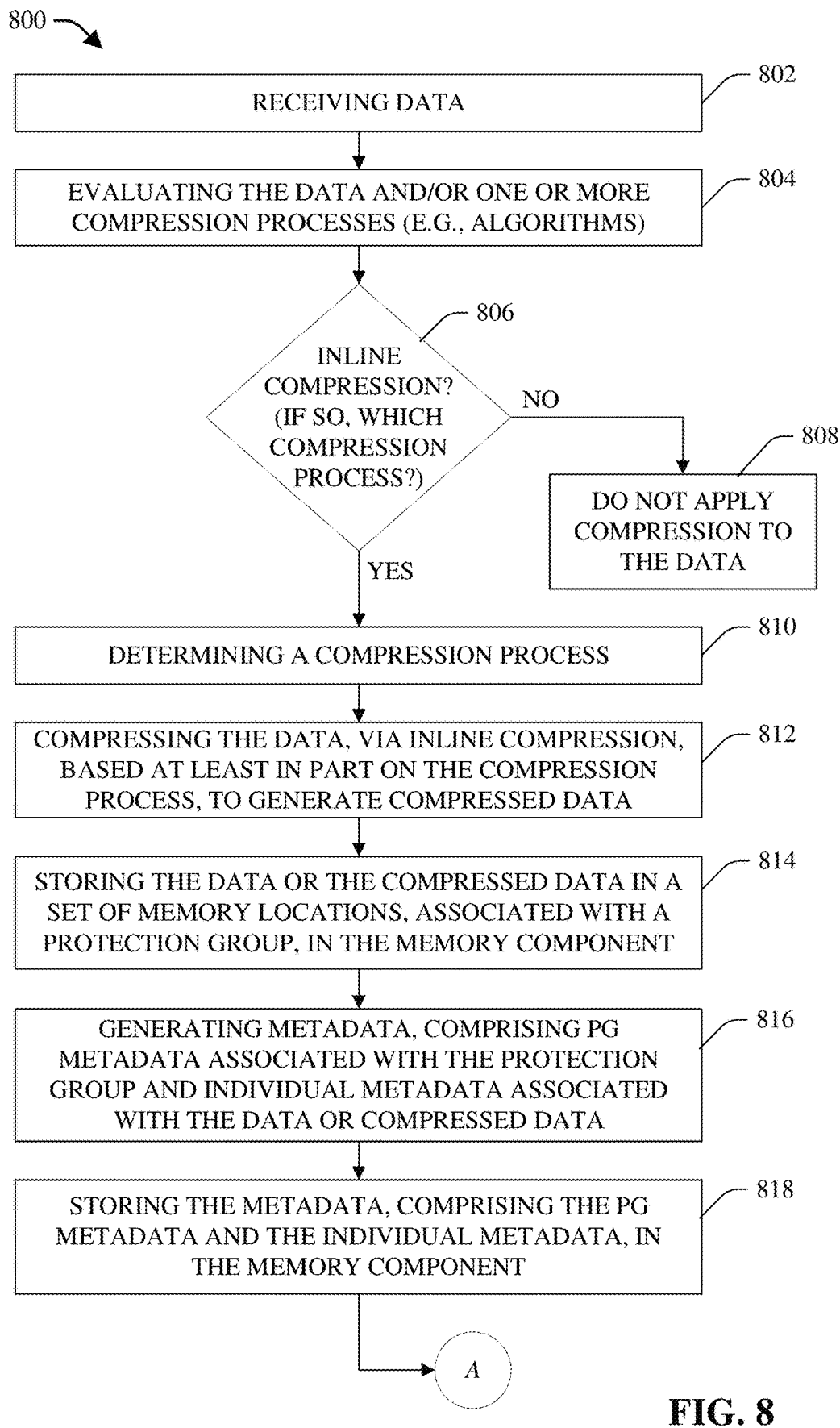
FIG. 8 presents a flow chart of an example method that can desirably compress data, and manage the compression of data, via inline compression, for storage in a protection group in a memory component, in accordance with various aspects and embodiments of the disclosed subject matter.

FIG. 8 presents a flow chart of an example method 800 that can desirably compress data, and manage the compression of data, via inline compression, for storage in a protection group in a memory component, in accordance with various aspects and embodiments of the disclosed subject matter. The method 800 can be employed by, for example, a system comprising the file management component, compression component, CMC, processor component (e.g., of or associated with the compression component and CMC), and/or data store (e.g., of or associated with the compression component, CMC, and/or processor component).

At 802, data can be received. The file management component and/or CMC can receive data, such as, for example, data associated with a file in connection with storing the data in the file system.

At 804, the data and/or one or more compression processes can be evaluated. At 806, a determination can be made regarding whether the data is to be compressed, via inline compression, and, if so, the compression process of the available compression processes that is to be utilized to compress the data. The CMC can evaluate the data and/or one or more available compression processes to determine whether the data is to be compressed, via inline compression, using one of the available compression processes (e.g., compression algorithms), and, if so, which compression process is to be used to compress the data, via inline compression (e.g., as the data is being written to the memory component), in accordance with the defined compression management criteria. For instance, a compression management criterion can indicate or specify a throughput or speed criterion (e.g., a minimum throughput or speed threshold level) that is to be satisfied by a compression process in order to be used for inline compression to compress the data.

At 808, in response to determining that no compression is to be applied to the data, via inline compression, based at least in part on the evaluation, no compression is applied to the data. Based at least in part on the results of the evaluation, if the CMC determines that none of the available compression processes can satisfy the applicable compression management criteria, with respect to inline compression, the CMC can determine no inline compression is to be performed. At this point, the method 800 can proceed to reference numeral 814 with regard to storing the data.

If, at 806, it is determined that compression is to be applied, via inline compression, to the data based at least in part on the evaluation, at 810, a compression process can be determined. In response to determining that compression is to be applied, via inline compression, to the data based at least in part on the results of the evaluation, the CMC can determine that the compression process that can be applied to the data via inline compression, in accordance with the defined compression management criteria. For instance, the CMC can determine and select a compression process, of the available compression processes, that can satisfy (e.g., meet or exceed) the throughput or speed criterion and/or any other applicable compression management criterion (e.g., determine and select a compression process, of the available compression processes, that can satisfy the throughput or speed criterion and/or provides the highest amount of compression (e.g., most reduction in data size) as compared to any other compression process that satisfies the throughput or speed criterion).

At 812, the data can be compressed, via inline compression, based at least in part on the compression process, to generate compressed data in a compression format associated with the compression process. Via inline compression, the compression component can apply the compression process to the data to compress the data and thereby generate the compressed data in the first compression format.

At 814, the data or the compressed data can be stored in a set of memory locations, associated with a protection group, in the memory component. The CMC or compression component can facilitate storing the data (if the data was not compressed) or the compressed data in the set of memory locations in the memory component, wherein the set of memory locations can be associated with the protection group.

At 816, metadata, comprising PG metadata associated with the protection group and individual metadata associated with the data or compressed data, can be generated. The CMC can determine and generate the metadata, comprising the PG metadata and the individual metadata, based at least in part on the characteristics associated with the protection group and the characteristics associated with the data or compressed data.

The PG metadata can comprise, for example, a logical extent map that can describe or identify which logical blocks are taking part in the compression of data (e.g., which logical blocks are associated with compressed data stored in the memory component), a list of additional CRC values for the logical blocks, and a list of compression chunks that can store metadata (e.g., individual metadata) regarding individual compressed streams. The logical blocks can be associated with (e.g., mapped or linked to) the set of memory locations where the data or compressed data has been stored. The PG metadata also can comprise other types of PG metadata (e.g., physical extent map of the physical blocks that store the data or compressed data associated with the protection group, initial list of CRC values, . . . ) that can describe the protection group, such as more fully described herein. The individual metadata can comprise, for example, information indicating the compression format of the compressed data (or indicating no compression format if the data is not compressed (e.g., via inline compression)), information indicating a compressed size of an individual compressed stream comprising the compressed data (if the data has been compressed), information indicating an uncompressed size of the individual compressed stream comprising the compressed data (if the data has been compressed) or indicating the uncompressed size of the data (which was not compressed), and/or information indicating a starting offset for the individual compressed stream in physical space in the protection group.

At 818, the metadata, comprising the PG metadata and the individual metadata, can be stored in the memory component. The CMC can store or facilitate storing the metadata, comprising the PG metadata and the individual metadata, in the memory component or other desired storage location (e.g., another data store). At this point, the method 800 can end or can proceed to reference point A, wherein, in some embodiments, method 900 can proceed from reference point A.

Figure 9:
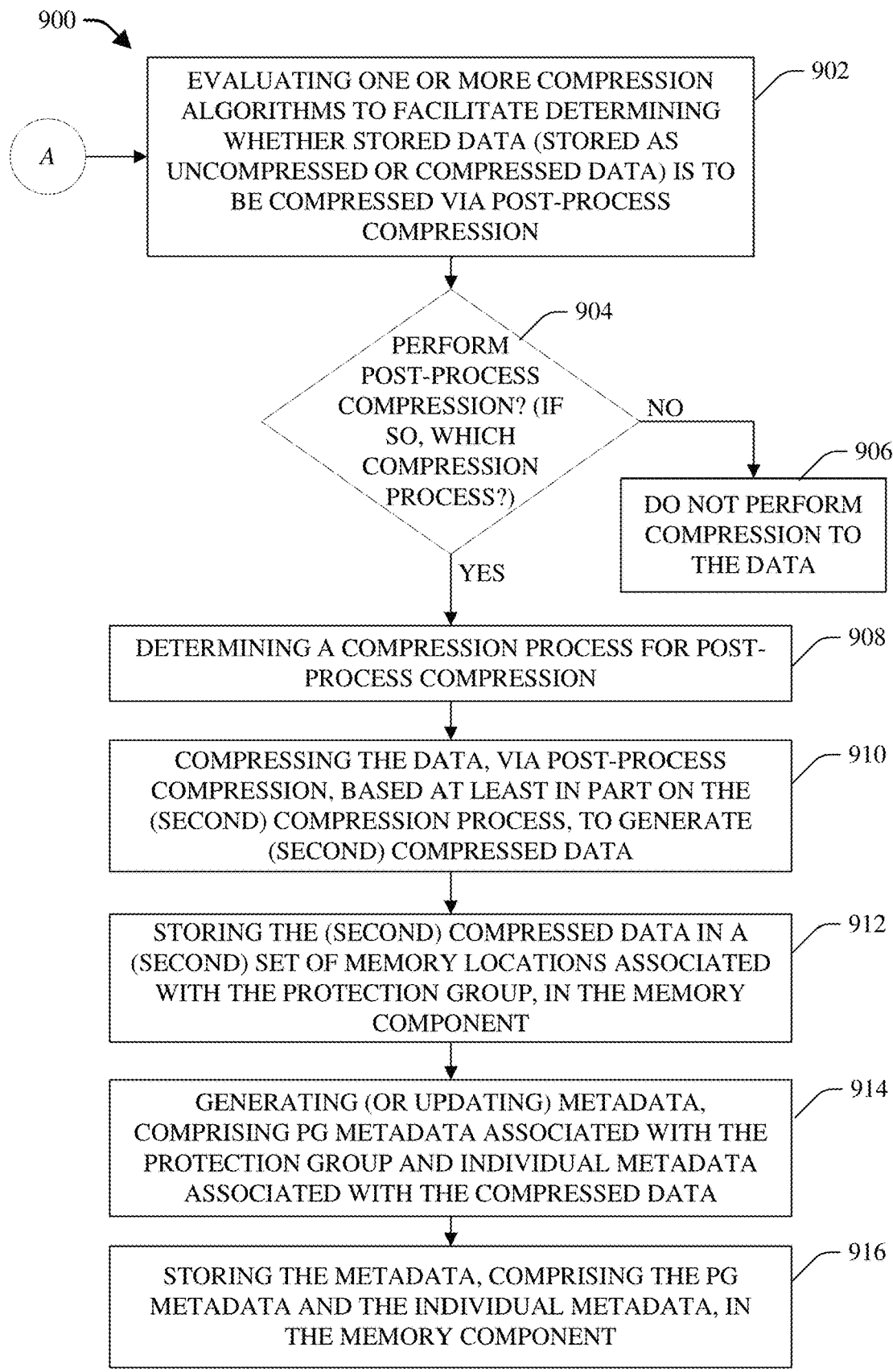
FIG. 9 illustrates a flow chart of an example method that can desirably compress data, and manage the compression of data, via post-process compression, for storage in a protection group in a memory component, in accordance with various aspects and embodiments of the disclosed subject matter.

FIG. 9 illustrates a flow chart of an example method 900 that can desirably compress data, and manage the compression of data, via post-process compression, for storage in a protection group in a memory component, in accordance with various aspects and embodiments of the disclosed subject matter. The method 900 can be employed by, for example, a system comprising the file management component, compression component, CMC, processor component (e.g., of or associated with the compression component and CMC), and/or data store (e.g., of or associated with the compression component, CMC, and/or processor component). In some embodiments, the method 900 can proceed from reference point A (at the end of method 800).

At 902, one or more compression algorithms can be evaluated to facilitate determining whether stored data (stored as uncompressed or compressed data) is to be compressed via post-process compression. At 904, a determination can be made regarding whether post-process compression is to be performed on the stored data, and, if so, which compression process, of the available compression processes, it to be applied to the stored data, in accordance with the defined compression management criteria. The CMC can evaluate the stored data (stored as uncompressed or compressed data) and/or one or more compression processes to determine whether the stored data is to be compressed, via post-process compression, using one of the compression processes (e.g., compression algorithms), and, if so, which compression process is to be used to compress the data, via post-process compression, in accordance with the defined compression management criteria. For instance, a compression management criterion can indicate or specify that post-process compression can be performed using a compression process if the size of the compressed data after post-process compression is smaller than the size of the stored data, or smaller than the size of the stored data by at least a defined amount.

At 906, in response to determining that no post-process compression is to be performed, based at least in part on the evaluation, no post-process compression is performed on the stored data. The CMC can determine that no post-process compression is to be performed on the stored data, for example, if none of the available compression processes is able to compress the data to a size that is smaller, or sufficiently smaller, than the size of the stored data, based at least in part on the applicable compression management criteria. If the CMC determines that no post-process compression is to be performed, based at least in part on the results of the evaluation, at this point, the method 900 can end.

However, if, at 904, it is determined that post-process compression is to be performed on the stored data (uncompressed data or compressed data) based at least in part on the evaluation, at 908, a compression process for post-process compression can be determined. In response to determining that post-process compression is to be performed on the stored data based at least in part on the results of the evaluation, the CMC can determine a compression process of the available compression processes that can be applied to compress (or re-compress) the data, in accordance with the defined compression management criteria. For instance, the CMC can determine and select a compression process (e.g., a second compression process), of the available compression processes, that can satisfy (e.g., meet or exceed) the applicable compression management criterion (e.g., determine and select a compression process, of the available compression processes, that can provide the highest amount of compression (e.g., provide the most reduction in data size) as compared to any other available compression process)).

At 910, the data can be compressed, via post-process compression, based at least in part on the (second) compression process, to generate (second) compressed data in a (second) compression format associated with the (second) compression process. The compression component can compress (or re-compress) the data, via post-process compression, based at least in part on the (second) compression process, to generate (second) compressed data in the (second) compression format. For instance, if the stored data initially was not compressed when being written to the memory component (e.g., via inline compression), the compression component can compress the data, based at least in part on the compression process, to generate compressed data in the compression format. If the stored data initially was compressed using a (first) compression process when being written to the memory component (e.g., via inline compression), the compression component can compress the data, based at least in part on the (second) compression process, to generate (second) compressed data in the (second) compression format. In some embodiments, during post-process compression, a decompression component can decompress the stored data (e.g., the (first) compressed data) to generate or recover the uncompressed data, and, the compression component can apply the (second) compression process to the uncompressed data to generate the (second) compressed data in the (second) compression format.

At 912, the (second) compressed data can be stored in a (second) set of memory locations associated with the protection group, in the memory component. The CMC or compression component can facilitate storing the (second) compressed data in the (second) set of memory locations in the memory component, wherein the set of memory locations can be associated with the protection group.

At 914, metadata, comprising PG metadata associated with the protection group and individual metadata associated with the compressed data, can be generated (or updated). The CMC can determine and generate (or update) the metadata, comprising the PG metadata (e.g., logical extent map, physical extent map, CRC values, list of compression chunks, . . . ) and the individual metadata (e.g., compression format, compressed size, uncompressed size, starting offset in physical space within the protection group, . . . ), based at least in part on the characteristics associated with the protection group and the characteristics associated with the compressed data, as more fully described herein.

At 916, the metadata, comprising the PG metadata and the individual metadata, can be stored in the memory component. The CMC can store or facilitate storing the metadata, comprising the PG metadata and the individual metadata, in the memory component or other desired storage location (e.g., another data store). At this point, the method 900 can end.

Figure 10:
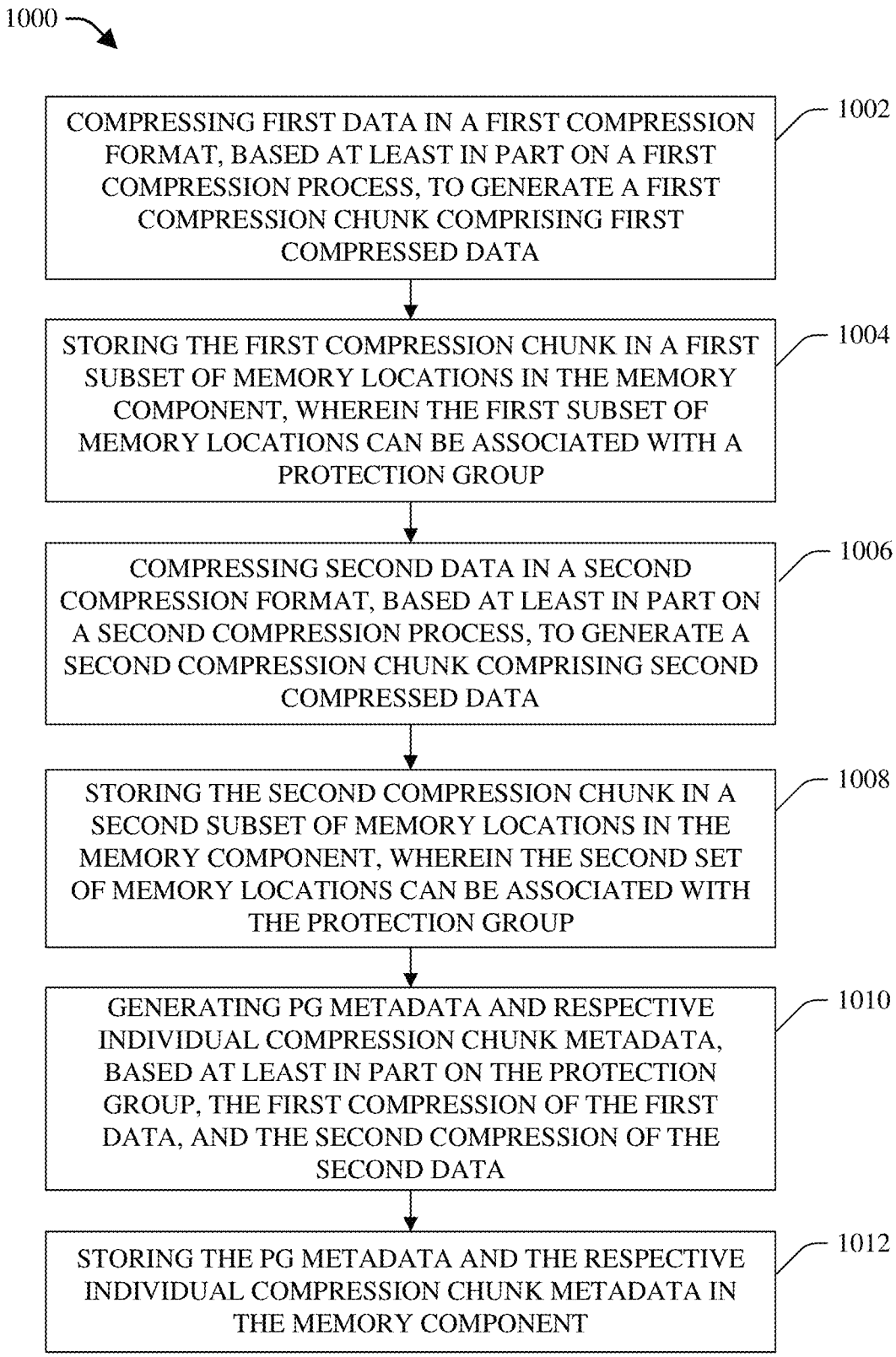
FIG. 10 depicts a flow chart of an example method that can desirably compress respective chunks of data, and manage the compression of respective chunks of data, using respective compression processes (e.g., algorithms), for storage in a protection group in a memory component, in accordance with various aspects and embodiments of the disclosed subject matter.

FIG. 10 depicts a flow chart of an example method 1000 that can desirably compress respective chunks of data, and manage the compression of respective chunks of data, using respective compression processes (e.g., algorithms), for storage in a protection group in a memory component, in accordance with various aspects and embodiments of the disclosed subject matter. The method 1000 can be employed by, for example, a system comprising the file management component, compression component, CMC, processor component (e.g., of or associated with the compression component and CMC), and/or data store (e.g., of or associated with the compression component, CMC, and/or processor component).

At 1002, first data can be compressed in a first compression format, based at least in part on a first compression process, to generate a first compression chunk comprising first compressed data. The CMC can determine the first compression format, and associated first compression process (e.g., first compression algorithm), to employ to compress the first data, in accordance with the defined compression management criteria. The compression component can compress the first data in the first compression format, based at least in part on the first compression process, to generate the first compression chunk comprising the first compressed data, wherein the first compressed data can be a compressed version of the first data.

At 1004, the first compression chunk can be stored in a first subset of memory locations in the memory component, wherein the first subset of memory locations can be associated with a protection group. The protection component can be associated with a desired number (e.g., one or more) of subsets of memory locations of a set of locations of the memory component. The CMC, the file management component, and/or the memory component can store, or facilitate storing, the first compression chunk in the first subset of memory locations associated with the protection group.

At 1006, second data can be compressed in a second compression format, based at least in part on a second compression process, to generate a second compression chunk comprising second compressed data. The CMC can determine the second compression format, and associated second compression process (e.g., second compression algorithm), to employ to compress the second data, in accordance with the defined compression management criteria. The compression component can compress the second data in the second compression format, based at least in part on the second compression process, to generate the second compression chunk comprising the second compressed data, wherein the second compressed data can be a compressed version of the second data.

At 1008, the second compression chunk can be stored in a second subset of memory locations in the memory component, wherein the second set of memory locations can be associated with the protection group. The CMC, the file management component, and/or the memory component can store, or facilitate storing, the second compression chunk in the second subset of memory locations associated with the protection group.

At 1010, PG metadata and respective individual compression chunk metadata can be generated, based at least in part on the protection group, the first compression of the first data, and the second compression of the second data, in accordance with the defined compression management criteria. The CMC can generate the PG metadata and the respective individual compression chunk metadata of the respective (e.g., the first and second) compression chunks based at least in part on respective information relating to the protection group, the first compression of the first data, and the second compression of the second data, in accordance with the defined compression management criteria. The PG metadata relate to the protection group, and the respective individual compression chunk metadata can relate to the respective compression chunks (e.g., respective chunks of compressed data).

The PG metadata can comprise, for example, a logical extent map that describes which logical blocks contain compressed data, a list of CRC values for the logical blocks, and/or a list of compression chunks that can store individual metadata regarding individual compressed streams. In some embodiments, the PG metadata also can include, for example, the protection level and/or layout of the protection group and data stored therein, the physical extent map of the physical blocks of the memory component (e.g., the physical blocks associated with the protection group in the memory component) that store the data associated with the protection group, other CRC values associated with the protection group, and/or flag, state, and/or versioning information associated with the protection group or associated data.

The respective individual compression chunk metadata can comprise, for each individual compression chunk (e.g., individual compression stream), a compression format for the compressed data of such individual compression chunk, a compressed size of the compressed data of such individual compression chunk, an uncompressed size of the uncompressed data associated with the compressed data of such individual compression chunk, and/or a starting offset in a physical space (e.g., physical block(s), or portion thereof) within the protection group associated with the memory component.

At 1012, the PG metadata and the respective individual compression chunk metadata can be stored in the memory component. The CMC can store or facilitate storing the PG metadata and the respective individual compression chunk metadata of the respective compression chunks in the memory component and/or another desired data storage location(s) (e.g., a data store).

Figure 11:
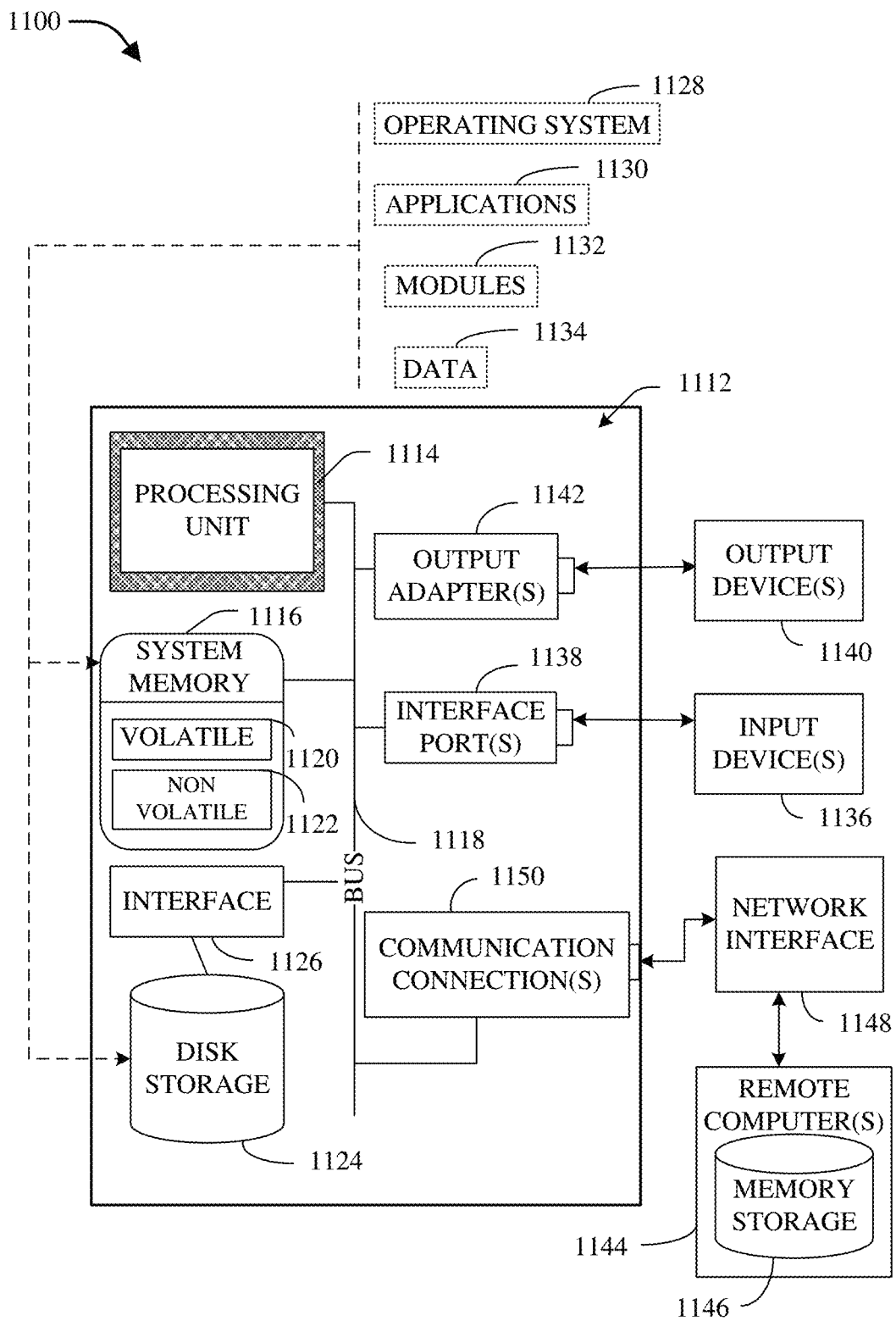
FIG. 11 is a schematic block diagram illustrating a suitable operating environment.
Figure 12:
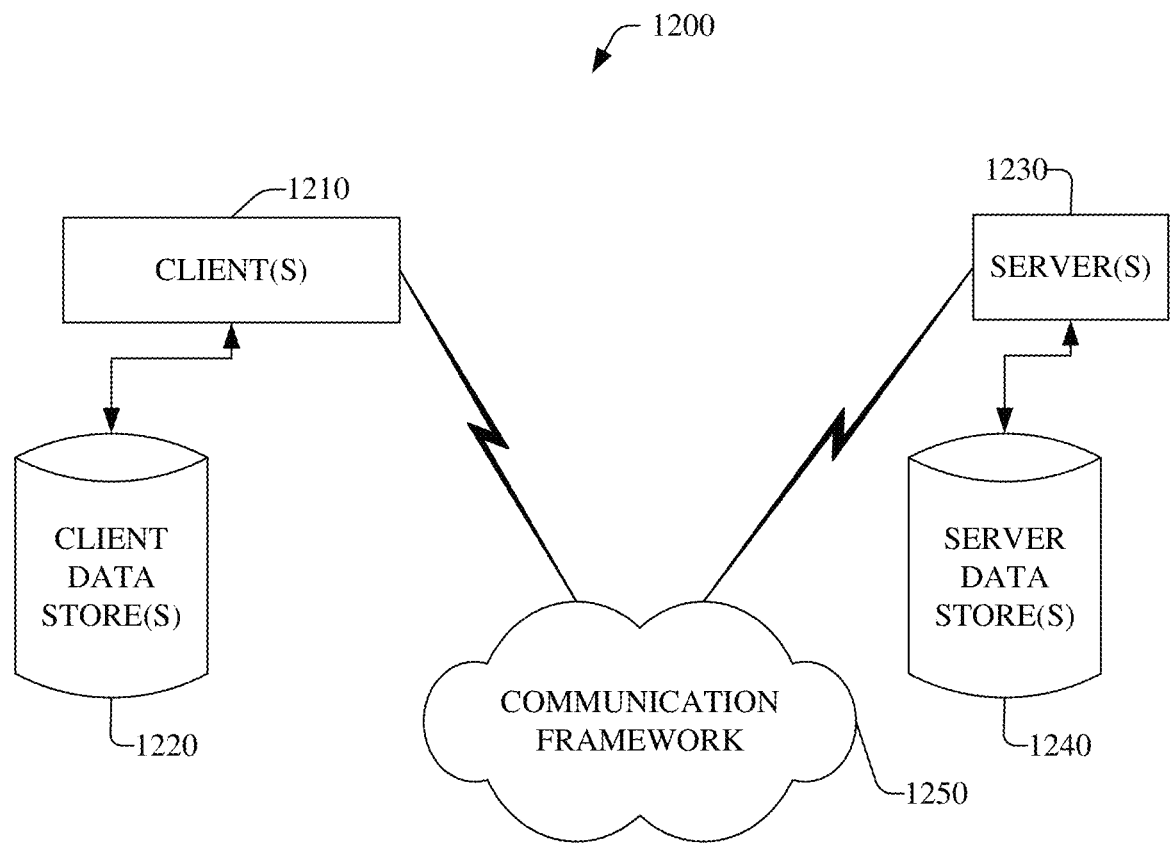
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., mobile phone, electronic tablets or pads, laptop computers, PDAs, . . . ), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

With reference to FIG. 11, a suitable environment 1100 for implementing various aspects of this disclosure includes a computer 1112. The computer 1112 includes a processing unit 1114, a system memory 1116, and a system bus 1118. It is to be appreciated that the computer 1112 can be used in connection with implementing one or more of the systems, components, or methods shown and described in connection with FIGS. 1-10, or otherwise described herein. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 also includes removable/non-removable, volatile/non-volatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

FIG. 11 also depicts software that acts as an intermediary between users and the basic computer resources described in the suitable operating environment 1100. Such software includes, for example, an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored, e.g., in system memory 1116 or on disk storage 1124. It is to be appreciated that this disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 (e.g., computing system) with which the subject matter of this disclosure can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Furthermore, the terms "user," "consumer," "customer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., compression component, compression management component, file management component, memory component, encoder or encoder component, decoder or decoder component, processor component, data store, . . . ), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:

compressing, by a system comprising a processor, first data of a file in a first compression format, based on a first compression process, to generate first compressed data;

compressing, by the system, second data of the file in a second compression format, based on a second compression process, to generate second compressed data; and storing, by the system, the first compressed data of the file in a first set of memory locations of a first protection group in a memory and the second compressed data of the file in a second set of memory locations of the first protection group in the memory, wherein the file is segmented across the first protection group and a second protection group, wherein third data of the file is stored in a third set of memory locations of the second protection group in the memory, wherein the first protection group is associated with a set of logical blocks comprising a subset of logical blocks, and wherein the first protection group is associated with protection group metadata that indicates the first compressed data is compressed and indicates the subset of logical blocks is associated with the first compressed data.

2. The method of claim 1, further comprising:

receiving, by the system, the first data, wherein the compressing of the first data comprises: in response to the receiving of the first data, compressing the first data of the file in the first compression format via inline compression as the first data is being written to the first protection group in the memory.

3. The method of claim 1, further comprising:

determining, by the system, whether to compress the first data based on a first data size associated with the first data and a second data size associated with the first compressed data; and in response to determining that the second data size is smaller than the first data size, determining, by the system, that the first data is to be compressed in the first compression format.

4. The method of claim 1, further comprising:

determining, by the system, whether to compress the third data in the first compression format based on a first data size associated with the third data and a second data size associated with third compressed data that is able to be generated by compressing the third data; and in response to determining that the second data size is larger than or equal to the first data size, determining, by the system, that the third data is not to be compressed in the first compression format.

5. The method of claim 1, further comprising:

determining, by the system, that the first compression format is to be utilized over a third compression format to compress the first data via inline compression as the first data is being written to the first protection group in the memory, in accordance with a data throughput criterion related to writing the first data to the first protection group in the memory via the inline compression, wherein the first compression format is determined to satisfy the data throughput criterion and the third compression format is determined to not satisfy the data throughput criterion.

6. The method of claim 5, further comprising:

determining, by the system, that the third compression format is to be utilized over the first compression format to compress the first data via a post-process compression based on a compression criterion that indicates the third compression format is able to compress the first data to a second data size that is smaller than a first data size to which the first compression format compressed the first data, wherein the post-process compression is performed after the first data has been compressed via the inline compression.

7. The method of claim 6, further comprising:

in response to the determining that the third compression format is to be utilized over the first compression format to compress the first data via the post-process compression, retrieving, by the system, the first compressed data from the first protection group in the memory;

decompressing, by the system, the first compressed data, based on a first decompression process that inversely corresponds to the first compression process, to generate the first data;

compressing, by the system, the first data in the third compression format via the post-process compression, based on a third compression process, to generate third compressed data; and storing, by the system, the third compressed data in a fourth set of memory locations of the first protection group in the memory.

8. The method of claim 6, wherein the compressing of the first data in the third compression format via the post-process compression is performed as a background process.

9. The method of claim 1, wherein the compressing of the first data of the file in the first compression format, based on the first compression process, to generate the first compressed data comprises compressing the first data of the file in the first compression format, based on the first compression process, to generate a first compression chunk comprising the first compressed data;

wherein the compressing of the second data of the file in the second compression format, based on the second compression process, to generate the second compressed data comprises compressing the second data of the file in the second compression format, based on the second compression process, to generate a second compression chunk comprising the second compressed data;

wherein the subset of logical blocks is a first subset of logical blocks, wherein the subset of logical blocks comprises the first subset of logical blocks and a second subset of logical blocks, and wherein the method further comprises:

storing, by the system, the first compression chunk in the first set of memory locations of the first protection group in the memory; and storing, by the system, the second compression chunk in the second set of memory locations of the first protection group in the memory, wherein the protection group metadata indicates the first compressed data is compressed in the first compression format and the first subset of logical blocks is associated with the first compressed data, and indicates that the second compressed data is compressed in the second compression format and that the second subset of logical blocks is associated with the second compressed data.

10. The method of claim 1, wherein the compressing of the first data of the file in the first compression format, based on the first compression process, to generate the first compressed data comprises compressing the first data of the file in the first compression format, based on the first compression process, to generate a first compression chunk comprising the first compressed data, wherein the file comprises a set of compression chunks, comprising the first compression chunk and a second compression chunk, wherein the second compression chunk comprises the second compressed data in the second compression format, and wherein the method further comprises:

storing, by the system, the first compression chunk in the first set of memory locations and the second compression chunk in the second set of memory locations of the first protection group in the memory, wherein, a first data size of the first compression chunk is smaller than a second data size of the file, wherein the first compression chunk of the first protection group is able to be decompressed without decompressing the second compression chunk of the first protection group associated with the file, and wherein the first compression chunk is able to be randomly accessed from the first protection group in the memory.

11. The method of claim 1, wherein the first subset of logical blocks contains the first compressed data, and wherein the method further comprises:

generating, by the system, a logical extent map that identifies the first subset of logical blocks that contains the first compressed data; and storing, by the system, the protection group metadata, comprising map data of the logical extent map, in the memory.

12. The method of claim 11, wherein the logical extent map comprises no passthrough entry or at least one passthrough entry, wherein the at least one passthrough entry enables at least one direct reference to a physical extent map that stores information comprising at least one of a shadow reference, a sparse block reference, or a defined physical block address of the memory.

13. The method of claim 1, further comprising:

generating, by the system, the protection group metadata comprising a list of compression chunks that store individual metadata regarding individual compression streams stored in the first protection group, wherein the individual compression streams comprise an individual compression stream that includes the first compressed data, wherein the individual metadata comprises first metadata associated with the first compressed data, and wherein the individual metadata comprises at least one of a compression format of the individual compression stream, a compressed size of the individual compression stream, an uncompressed size associated with the individual compression stream, or a starting offset for the individual compression stream in a physical space within the first protection group in the memory; and storing, by the system, the protection group metadata in the memory.

14. A system, comprising:

a memory that stores computer executable components; and a processor that executes computer executable components stored in the memory, wherein the computer executable components comprise:

a compression component that compresses first information of a file in a first compression format, based on a first compression process, to generate first compressed information, and compresses second information of the file in a second compression format, based on a second compression process, to generate second compressed information; and a memory component that stores the first compressed information of the file at a first group of memory addresses of a first protection group in the memory component, and the second compressed information of the file at a second group of memory addresses of the first protection group in the memory component, wherein the file is associated with the first protection group and a second protection group, wherein third information of the file is stored at a third group of memory addresses of the second protection group in the memory, wherein the first protection group is associated with a group of logical blocks comprising a subgroup of logical blocks, and wherein the first protection group is associated with protection group metadata that indicates the first compressed information is compressed and indicates the subgroup of logical blocks of the first protection group is associated with the first compressed information.

15. The system of claim 14, wherein the computer executable components further comprise:

a compression management component that determines whether to compress the first information based on a first amount of information associated with the first information and a second amount of information associated with the first compressed information, and, in response to determining that the second amount of information is less than the first amount of information, determines that the first information is to be compressed in the first compression format, and wherein the compression management component determines whether to compress the third information based on a third amount of information associated with the third information and a fourth amount of information associated with third compressed information that is able to be generated by compressing the third information based on the first compression format, and, in response to determining that the fourth amount of information is greater than equal to the third amount of information, determines that the third information is not to be compressed in the first compression format.

16. The system of claim 14, wherein the computer executable components further comprise:

a compression management component that determines that the first compression format is to be implemented, instead of a third compression format, to compress the first information via inline compression as the first information is being written to the first protection group in the memory component, in accordance with a data throughput criterion related to writing the first information, via the inline compression, to the first protection group in the memory component, and wherein the first compression format is determined to satisfy the data throughput criterion and the third compression format is determined to not satisfy the data throughput criterion.

17. The system of claim 16, wherein the compression management component determines that the third compression format is to be implemented, instead of the first compression format, to compress the first information via a post-process compression based on a compression criterion that indicates the third compression format is able to compress the first information to a second amount of information that is smaller than a first amount of information to which the first compression format compressed the first information, wherein the post-process compression is performed after the first information has been compressed via the inline compression, and wherein, via the post-process compression, the first compressed information is decompressed to recover the first information, the compression component compresses the first information in the third compression format, based on a third compression process, to generate third compressed information, and the memory component stores the third compressed information at a fourth group of memory addresses of the first protection group in the memory component.

18. The system of claim 14, wherein the subgroup of logical blocks contains the first compressed information, and wherein the computer executable components further comprise:

a compression management component that generates a logical extent map that specifies the subgroup of logical blocks that contains the first compressed information and stores the protection group metadata, comprising map information relating to the logical extent map, in the memory component.

19. A non-transitory machine-readable medium, comprising executable instructions that, when executed by a processor, facilitate performance of operations, comprising:

compressing first data of a file in a first compression format, based on a first compression process, to generate first compressed data of the file;

compressing second data of the file in a second compression format, based on a second compression process, to generate second compressed data of the file; and storing the first compressed data of the file in a first set of locations of a first protection group in a data store and the second compressed data of the file in a second set of locations of the first protection group in the data store, wherein the file is associated with the first protection group and a second protection group, wherein third data of the file is stored in a third set of locations of the second protection group in the data store, wherein the first protection group is associated with a set of logical blocks comprising a subset of logical blocks, and wherein the first protection group is associated with protection group metadata that indicates the first compressed data is compressed in the first compression format and indicates the subset of logical blocks is associated with the first compressed data.

20. The non-transitory machine-readable medium of claim 19, wherein the subset of logical blocks contains the first compressed data, and wherein the operations further comprise:

generating a logical extent map that specifies the subset of logical blocks that contains the first compressed data; and storing the protection group metadata, comprising map data of the logical extent map, in the data store.

* * * * *